(12) United States Patent
Ogura

(10) Patent No.: US 12,395,727 B2
(45) Date of Patent: Aug. 19, 2025

(54) INFORMATION PROCESSING APPARATUS, INFORMATION PROCESSING SYSTEM, INFORMATION PROCESSING METHOD, AND PROGRAM

(71) Applicant: FUJIFILM CORPORATION, Tokyo (JP)

(72) Inventor: Erina Ogura, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 169 days.

(21) Appl. No.: 18/475,220

(22) Filed: Sep. 27, 2023

(65) Prior Publication Data
US 2024/0022810 A1 Jan. 18, 2024

Related U.S. Application Data

(63) Continuation of application No. PCT/JP2022/005750, filed on Feb. 14, 2022.

(30) Foreign Application Priority Data

Mar. 30, 2021 (JP) .................. 2021-058614

(51) Int. Cl.
H04N 23/60 (2023.01)
G06T 3/40 (2006.01)
(Continued)

(52) U.S. Cl.
CPC ............... *H04N 23/64* (2023.01); *G06T 3/40* (2013.01); *G06T 5/50* (2013.01); *G06V 10/761* (2022.01);
(Continued)

(58) Field of Classification Search
CPC .... H04N 23/64; H04N 23/632; H04N 23/631; H04N 23/633; H04N 23/635;
(Continued)

(56) References Cited

U.S. PATENT DOCUMENTS 10,187,567 B2 * 1/2019 Giger .................. G01S 17/08
12,069,224 B2 * 8/2024 Kaneko ................ G06T 19/003
(Continued)

FOREIGN PATENT DOCUMENTS

JP 2004-061784 A 2/2004
JP 2006-319470 A 11/2006
(Continued)

OTHER PUBLICATIONS

Extended European Search Report dated Aug. 6, 2024, issued in corresponding EP Patent Application No. 22779590.3.
(Continued)

*Primary Examiner* — Yogesh K Aggarwal
(74) *Attorney, Agent, or Firm* — SOLARIS Intellectual Property Group, PLLC

(57) ABSTRACT

A processor of an information processing apparatus acquires a live view image and a pre-captured image based on a main-captured image, sets an imageable signal indicating that main imaging is determined to be executable based on at least one of a distance measurement result or a captured image, and outputs screen data. The live view image is displayed in a live view region included in a screen. A guide view region included in the screen includes a wide view region and a guide region. The pre-captured image is displayed in the wide view region. Guide information is displayed in the guide region. The processor outputs the screen data as data in which the screen includes an imaging instruction reception region in a case in which the imageable signal is set, and outputs a main imaging instruction signal in a case in which an imaging instruction is received by the imaging instruction reception region.

20 Claims, 56 Drawing Sheets

(51) Int. Cl.
  *G06T 5/50* (2006.01)
  *G06V 10/74* (2022.01)
  *H04N 23/63* (2023.01)
(52) U.S. Cl.
  CPC . *H04N 23/632* (2023.01); *G06T 2207/20221* (2013.01)
(58) Field of Classification Search
  CPC ...... H04N 23/695; H04N 23/698; G06T 3/40; G06T 5/50; G06T 2207/20221; G06V 10/761; G03B 17/18; G03B 37/02; G03B 2206/00; G03B 15/00
  See application file for complete search history.

(56) References Cited

U.S. PATENT DOCUMENTS

| | | | | |
|---|---|---|---|---|
| 2007/0081081 A1* | 4/2007 | Cheng | ................ | G06T 3/4038 386/E5.072 |
| 2012/0026364 A1* | 2/2012 | Kuma | ................ | H04N 23/45 348/222.1 |
| 2012/0300051 A1 | 11/2012 | Daigo et al. | | |
| 2021/0004005 A1* | 1/2021 | Lin | ................ | G05D 1/0016 |
| 2022/0141441 A1 | 5/2022 | Kaneko | | |

FOREIGN PATENT DOCUMENTS

| | | |
|---|---|---|
| JP | 2008-098754 A | 4/2008 |
| JP | 2009-232276 A | 10/2009 |
| JP | 2012-029245 A | 2/2012 |
| JP | 2013-013050 A | 1/2013 |
| JP | 2015-119400 A | 6/2015 |
| WO | 2021/014775 A1 | 1/2021 |

OTHER PUBLICATIONS

International Search Report issued in International Application No. PCT/JP2022/005750 on May 10, 2022.

Written Opinion of the ISA issued in International Application No. PCT/JP2022/005750 on May 10, 2022.

* cited by examiner

INFORMATION PROCESSING APPARATUS, INFORMATION PROCESSING SYSTEM, INFORMATION PROCESSING METHOD, AND PROGRAM

CROSS-REFERENCE TO RELATED APPLICATIONS

This application is a continuation application of International Application No. PCT/JP2022/005750, filed on Feb. 14, 2022, the disclosure of which is incorporated herein by reference in its entirety. Further, this application claims priority under 35 USC 119 from Japanese Patent Application No. 2021-058614, filed on Mar. 30, 2021, the disclosure of which is incorporated herein by reference in its entirety.

BACKGROUND

1. Technical Field

The technology of the present disclosure relates to an information processing apparatus, an information processing system, an information processing method, and a program.

2. Related Art

JP2012-029245A discloses an imaging apparatus including a first imaging unit that images a subject and outputs a signal according to the imaging result, a second imaging unit that images the subject at a wider angle than the first imaging unit and outputs a signal according to the imaging result, and a notification information output unit that outputs notification information according to a relationship between an imaging range of the first imaging unit and a position of a specific subject based on the output signal of the second imaging unit in a case in which the specific subject included in the subject is out of the imaging range of the first imaging unit.

JP2013-013050A discloses an imaging apparatus including a first imaging optical system that acquires a first subject image, a second imaging optical system that can acquire a second subject image on a telephoto side of the first subject image acquired by the first imaging optical system, a first imaging unit that converts a video signal of the first subject image acquired by the first imaging optical system into first image data, a second imaging unit that converts a video signal of the second subject image acquired by the second imaging optical system into second image data, a display unit that displays the first subject image based on the first image data and the second subject image based on the second image data, and a controller that displays an imaging range of the second subject image on the first subject image displayed on the display unit with a display frame.

JP2009-232276A discloses an imaging apparatus including an imaging unit that captures a subject image and continuously performing imaging processing such that a part of adjacent imaging ranges overlaps to generate a plurality of captured images. The imaging apparatus includes a display unit that continuously displays a subject image captured by the imaging unit as a live view image, a motion detection unit that detects motion of the live view image in at least one direction, an instruction unit that instructs a start of imaging processing, a display control unit that performs control to display a movement mark that moves according to the motion detected by the motion detection unit on the live view image after the start instruction instructed by the instruction unit, and a movement target mark including a movement target position of the movement mark and indicating a predetermined region near the movement target position, and a determination unit that determines whether or not imaging is possible based on time conversion of a predetermined physical quantity associated with the motion of the apparatus main body in the positioned state in a case in which the movement mark is positioned within the predetermined region indicated by the movement target mark. The imaging apparatus permits the start instructed by the instruction unit in a case in which the determination unit determines that the imaging is possible, and performs the imaging processing.

SUMMARY

One embodiment according to the technology of the present disclosure provides an information processing apparatus, an information processing system, an information processing method, and a program that can cause an imaging apparatus to execute imaging at a good timing as compared with a case in which a timing determined without using either the distance measurement result or the captured image is notified as an imaging timing.

A first aspect according to the technology of the present disclosure is an information processing apparatus comprising a processor, and a memory connected to or built in the processor, in which the processor acquires a live view image obtained by imaging an imaging scene by an imaging apparatus having a distance measurement function and a pre-captured image based on a main-captured image obtained by executing main imaging by the imaging apparatus, sets an imageable signal indicating that the main imaging is determined to be executable based on at least one of a distance measurement result obtained by the distance measurement function or a captured image obtained by imaging with the imaging apparatus, and outputs screen data for displaying a screen including a live view region and a guide view region on a first display, the live view image is displayed in the live view region, the guide view region includes a wide view region and a guide region, the pre-captured image is displayed in the wide view region, guide information that is capable of specifying an image region corresponding to the live view image displayed in the live view region within the wide view region is displayed in the guide region, and the processor outputs the screen data as data in which the screen includes an imaging instruction reception region of a display aspect for notifying that the main imaging is executable, in a case in which the imageable signal is set, and outputs a main imaging instruction signal indicating an instruction to cause the imaging apparatus to execute the main imaging for the imaging scene indicated by the live view image, in a case in which an imaging instruction is received by the imaging instruction reception region.

A second aspect according to the technology of the present disclosure is the information processing apparatus according to the first aspect, in which the pre-captured image is an image indicating a scene wider than the imaging scene indicated by the live view image displayed in the live view region.

A third aspect according to the technology of the present disclosure is the information processing apparatus according to the second aspect, in which the pre-captured image is a composite image obtained by joining a plurality of the main-captured images into a panoramic image.

A fourth aspect according to the technology of the present disclosure is the information processing apparatus according to the third aspect, in which the screen includes a composite image confirmation view region in which the wide view region is enlarged together with the composite image.

A fifth aspect according to the technology of the present disclosure is the information processing apparatus according to the fourth aspect, in which the screen includes a real space area of an imaging region indicated by the composite image.

A sixth aspect according to the technology of the present disclosure is the information processing apparatus according to any one aspect of the first aspect to the fifth aspect, in which the processor outputs a distance measurement result acquisition instruction signal indicating an instruction to cause the imaging apparatus to acquire the distance measurement result.

A seventh aspect according to the technology of the present disclosure is the information processing apparatus according to the sixth aspect, in which the distance measurement result acquisition instruction signal includes a signal indicating an instruction to cause the imaging apparatus to measure a distance between a first imaging target, which is imaged by the imaging apparatus, and the imaging apparatus as one of the distance measurement results.

An eighth aspect according to the technology of the present disclosure is the information processing apparatus according to any one aspect of the first aspect to the seventh aspect, in which the imageable signal is generated on condition that an angle formed by a first imaging target surface imaged by the imaging apparatus and a predetermined surface included in the imaging apparatus is a facing angle at which the first imaging target surface and the imaging apparatus face each other.

A ninth aspect according to the technology of the present disclosure is the information processing apparatus according to the eighth aspect, in which the imaging apparatus has an image sensor, and the predetermined surface is a surface corresponding to an imaging surface of the image sensor.

A tenth aspect according to the technology of the present disclosure is the information processing apparatus according to any one aspect of the first aspect to the ninth aspect, in which the imageable signal is generated on condition that an overlap ratio between the pre-captured image and the main-captured image or the live view image is within a predetermined range.

An eleventh aspect according to the technology of the present disclosure is the information processing apparatus according to any one aspect of the first aspect to the tenth aspect, in which the processor acquires information based on the distance measurement result.

A twelfth aspect according to the technology of the present disclosure is the information processing apparatus according to the eleventh aspect, in which the information based on the distance measurement result includes information indicating whether or not a second imaging target surface imaged by the imaging apparatus and the imaging apparatus face each other.

A thirteenth aspect according to the technology of the present disclosure is the information processing apparatus according to the eleventh or twelfth aspect, in which the information based on the distance measurement result includes information based on a distance between a second imaging target surface imaged by the imaging apparatus and the imaging apparatus.

A fourteenth aspect according to the technology of the present disclosure is the information processing apparatus according to any one aspect of the eleventh aspect to the thirteenth aspect, in which the processor outputs distance measurement result data for causing a second display to display the information based on the distance measurement result.

A fifteenth aspect according to the technology of the present disclosure is the information processing apparatus according to the fourteenth aspect, in which the information based on the distance measurement result is displayed on the second display in a message format.

A sixteenth aspect according to the technology of the present disclosure is the information processing apparatus according to any one aspect of the first aspect to the fifteenth aspect, in which the imaging apparatus has a release button in a lock state, and the processor outputs an unlock instruction signal for causing the imaging apparatus to release the lock state, in a case in which the imageable signal is set.

A seventeenth aspect according to the technology of the present disclosure is an information processing system comprising the information processing apparatus according to any one aspect of the first aspect to the sixteenth aspect, and a reception device that receives an instruction given to the processor.

An eighteenth aspect according to the technology of the present disclosure is the information processing system according to the seventeenth aspect, further comprising the imaging apparatus.

A nineteenth aspect according to the technology of the present disclosure is an information processing method comprising acquiring a live view image obtained by imaging an imaging scene by an imaging apparatus having a distance measurement function and a pre-captured image based on a main-captured image obtained by executing main imaging by the imaging apparatus, setting an imageable signal indicating that the main imaging is determined to be executable based on at least one of a distance measurement result obtained by the distance measurement function or a captured image obtained by imaging with the imaging apparatus, and outputting screen data for displaying a screen including a live view region and a guide view region on a first display, in which the live view image is displayed in the live view region, the guide view region includes a wide view region and a guide region, the pre-captured image is displayed in the wide view region, guide information that is capable of specifying an image region corresponding to the live view image displayed in the live view region within the wide view region is displayed in the guide region, and the information processing method further comprises outputting the screen data as data in which the screen includes an imaging instruction reception region of a display aspect for notifying that the main imaging is executable, in a case in which the imageable signal is set, and outputting a main imaging instruction signal indicating an instruction to cause the imaging apparatus to execute the main imaging for the imaging scene indicated by the live view image, in a case in which an imaging instruction is received by the imaging instruction reception region.

A twentieth aspect of the technology of the present disclosure is a program for causing a computer to execute a process comprising acquiring a live view image obtained by imaging an imaging scene by an imaging apparatus having a distance measurement function and a pre-captured image based on a main-captured image obtained by executing main imaging by the imaging apparatus, setting an imageable signal indicating that the main imaging is determined to be executable based on at least one of a distance measurement result obtained by the distance measurement function or a captured image obtained by imaging with the imaging apparatus, and outputting screen data for displaying a screen including a live view region and a guide view region on a first display, in which the live view image is displayed in the live view region, the guide view region includes a wide view region and a guide region, the pre-captured image is displayed in the wide view region, guide information that is capable of specifying an image region corresponding to the live view image displayed in the live view region within the wide view region is displayed in the guide region, and the process further comprises outputting the screen data as data in which the screen includes an imaging instruction reception region of a display aspect for notifying that the main imaging is executable, in a case in which the imageable signal is set, and outputting a main imaging instruction signal indicating an instruction to cause the imaging apparatus to execute the main imaging for the imaging scene indicated by the live view image, in a case in which an imaging instruction is received by the imaging instruction reception region.

BRIEF DESCRIPTION OF THE DRAWINGS

Exemplary embodiments of the technology of the disclosure will be described in detail based on the following figures, wherein.

DETAILED DESCRIPTION

Hereinafter, an example of embodiments of an information processing apparatus, an information processing system, an information processing method, and a program according to the technology of the present disclosure will be explained with reference to the accompanying drawings.

First, the wording used in the following explanation will be explained.

CPU is an abbreviation stands for "Central Processing Unit". GPU is an abbreviation stands for "Graphics Processing Unit". NVM is an abbreviation stands for "Non-Volatile memory". RAM is an abbreviation stands for "Random Access Memory". IC is an abbreviation stands for "Integrated Circuit". ASIC is an abbreviation stands for "Application Specific Integrated Circuit". PLD is an abbreviation stands for "Programmable Logic Device". FPGA is an abbreviation stands for "Field-Programmable Gate Array". SoC is an abbreviation stands for "System-on-a-chip". SSD is an abbreviation stands for "Solid State Drive". USB is an abbreviation stands for "Universal Serial Bus". HDD is an abbreviation stands for "Hard Disk Drive". EEPROM is an abbreviation stands for "Electrically Erasable and Programmable Read Only Memory". EL is an abbreviation stands for "Electro-Luminescence". I/F is an abbreviation stands for "Interface". UI is an abbreviation stands for "User Interface". fps is an abbreviation stands for "frame per second". MF is an abbreviation stands for "Manual Focus". AF is an abbreviation stands for "Auto Focus". CMOS is an abbreviation stands for "Complementary Metal Oxide Semiconductor". LAN is an abbreviation stands for "Local Area Network". WAN is an abbreviation stands for "Wide Area Network". CNN is an abbreviation stands for "Convolutional Neural Network". AI is an abbreviation stands for "Artificial Intelligence". TOF is an abbreviation stands for "Time Of Flight". 3D is an abbreviation stands for "3 Dimensions". 5G is an abbreviation stands for "5th Generation". In the explanation of the present specification, "matching" refers to matching in a sense including an error generally allowed in the technical field to which the technology of the present disclosure belongs, that is the error to the extent that it does not contradict the purpose of the technology of the present disclosure, in addition to the exact matching.

Figure 1:
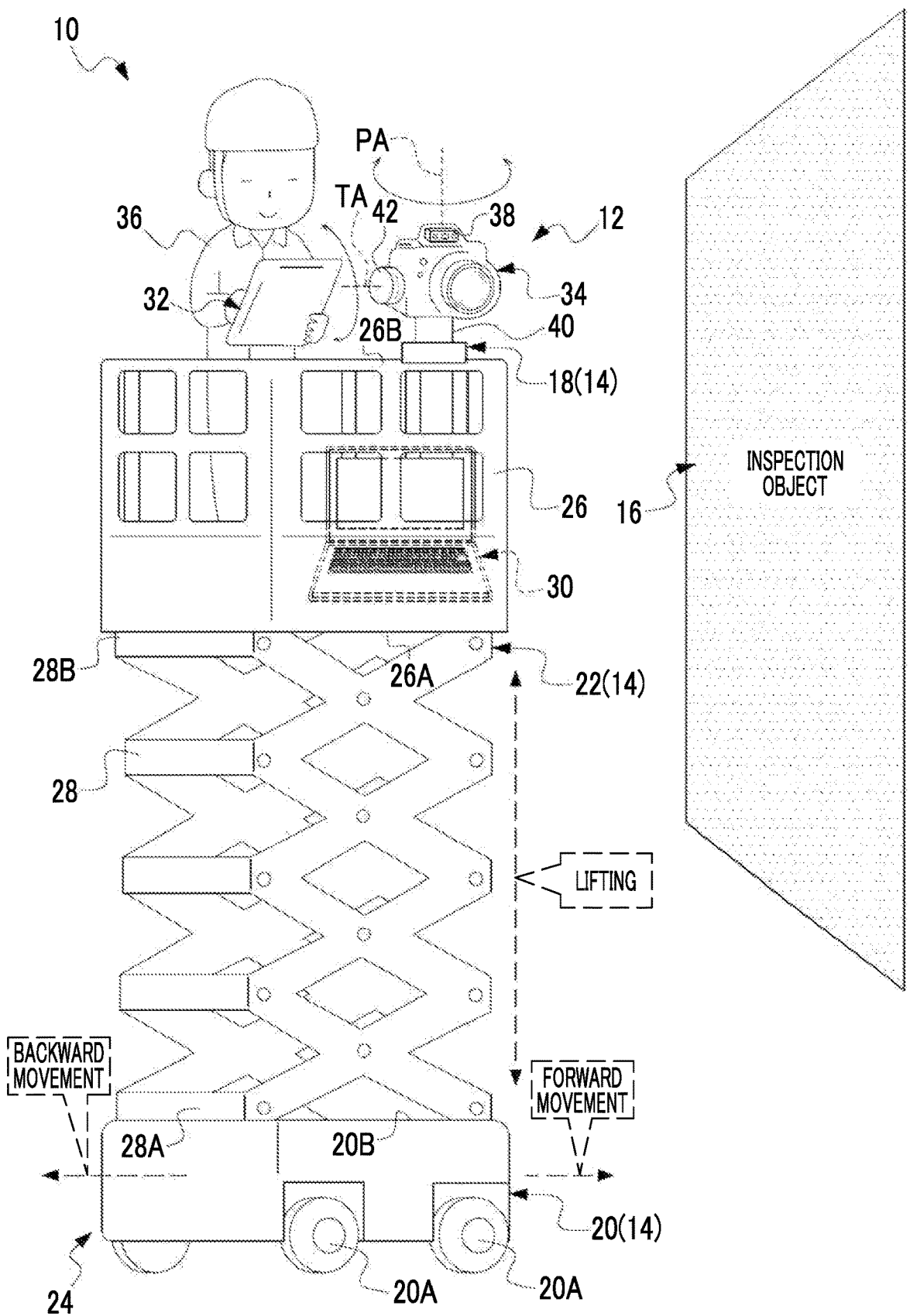
FIG. 1 is a schematic configuration diagram illustrating an example of a configuration of an entire inspection system.

As an example, as illustrated in FIG. 1, an inspection system 10 comprises an information processing system 12 and a drive system 14, and inspects an inspection object 16. The inspection refers, for example, to an inspection of a state of the inspection object 16. For example, a presence or absence of damage of the inspection object 16 and/or a degree of the damage, and the like are inspected by the inspection system 10. The inspection object 16 is an example of an "imaging scene" according to the technology of the present disclosure.

The drive system 14 comprises a biaxial revolution device 18, a vehicle 20, and a lifting device 22. Each of the biaxial revolution device 18, the vehicle 20, and the lifting device 22 has a communication function. The biaxial revolution device 18, the vehicle 20, and the lifting device 22 are connected to the information processing system 12 in a communicable manner and operate under the control of the information processing system 12.

In the example illustrated in FIG. 1, a vehicle 24 with a gondola is illustrated. The vehicle 24 with a gondola has the vehicle 20, the lifting device 22, and a gondola 26. For example, the vehicle 20 is a four-wheeled vehicle with an electric motor having four wheels 20A. The vehicle 20 travels in accordance with instructions given from the outside. Traveling refers to forward movement, backward movement, and meandering, for example.

The lifting device 22 is, for example, a pantograph type lift. The lifting device 22 has a pantograph mechanism 28. The pantograph mechanism 28 is a mechanism that expands and contracts in a vertical direction. The pantograph mechanism 28 is attached to an upper portion of the vehicle 20. That is, one end portion 28A of the pantograph mechanism 28 is attached to an upper portion 20B of the vehicle 20. The other end 28B of the pantograph mechanism 28 is attached to a lower surface 26A of the gondola 26, and the gondola 26 is supported from below by the pantograph mechanism 28. The lifting device 22 raises and lowers the gondola 26 along the vertical direction by expanding and contracting the pantograph mechanism 28 in accordance with the instruction given from the outside.

In the example illustrated in FIG. 1, the vehicle 24 with a gondola is illustrated, but this is merely an example, and it may be a moving apparatus that moves at least the imaging apparatus 34 of the information processing apparatus 30, the tablet terminal 32, or the imaging apparatus 34 in the vertical direction and a horizontal direction, such as a vehicle for work at height, a bridge inspection vehicle, an electric slider with a lifting device, or a carriage with a lifting device.

The information processing system 12 comprises an information processing apparatus 30, a tablet terminal 32, and an imaging apparatus 34. The information processing apparatus 30 and the imaging apparatus 34 are installed in the gondola 26.

The information processing apparatus 30 is, for example, a laptop personal computer. Here, the laptop personal computer is illustrated, but this is merely an example, and a desktop personal computer may be used. In addition, it is not limited to a personal computer and may be a server. The server may be a mainframe used on-premises together with the imaging apparatus 34 or may be an external server implemented by cloud computing. In addition, the server may be an external server implemented by network computing such as fog computing, edge computing, or grid computing. In the example illustrated in FIG. 1, the information processing apparatus 30 is installed in the gondola 26, but this is merely an example and the information processing apparatus 30 may be installed outside the gondola 26.

The imaging apparatus 34 is, for example, a lens-interchangeable digital camera. Here, the lens-interchangeable digital camera is illustrated as the imaging apparatus 34, but this is merely an example and a digital camera built in various electronic apparatuses such as a smart device or a wearable terminal may be used.

The imaging apparatus 34 images the inspection object 16 in accordance with the instruction given from the outside. In addition, the imaging apparatus 34 is an apparatus having a distance measurement function. The imaging apparatus 34 has a 3D sensor 38, and the distance measurement function is implemented by the 3D sensor 38. The 3D sensor 38 selectively executes the distance measurement of a stereo camera method and the distance measurement of a TOF method in accordance with the instruction given from the outside. In the present embodiment, distance measurement refers to measurement of a distance from the imaging apparatus 34 to the inspection object 16. In the following, for convenience of explanation, the explanation will be made on the premise that calibration has been executed in advance for the imaging apparatus 34 to match a coordinate system applied to the distance measurement by the 3D sensor 38 with a coordinate system applied to the imaging by the imaging apparatus 34.

The biaxial revolution device 18 is attached to a fence 26B of the gondola 26. The imaging apparatus 34 is installed in the biaxial revolution device 18 to allow revolution. The biaxial revolution device 18 operates in accordance with the instruction given from the outside to pan or tilt the imaging apparatus 34. The biaxial revolution device 18 has a pan mechanism 40 and a tilt mechanism 42. The pan mechanism 40 has a pan axis PA. The tilt mechanism 42 has a tilt axis TA. The pan mechanism 40 implements panning of the imaging apparatus 34 by revolving the imaging apparatus 34 around the pan axis PA, and the tilt mechanism 42 implements tilting of the imaging apparatus 34 by revolving the imaging apparatus 34 around the tilt axis TA.

The tablet terminal 32 is a mobile device having a touch panel type reception I/F and a communication function. The tablet terminal 32 is used by a user 36 who is boarding the gondola 26. In the example illustrated in FIG. 1, the tablet terminal 32 is used by the user 36 inside the gondola 26, but the tablet terminal 32 may be used by the user 36 outside the gondola 26.

The information processing system 12 is an example of an "information processing system" according to the technology of the present disclosure. The information processing apparatus 30 is an example of an "information processing apparatus" according to the technology of the present disclosure. The tablet terminal 32 is an example of a "reception device" according to the technology of the present disclosure. The imaging apparatus 34 is an example of an "imaging apparatus" according to the technology of the present disclosure. The inspection object 16 is an example of a "first imaging target" and a "second imaging target" according to the technology of the present disclosure.

The information processing apparatus 30 is connected to the tablet terminal 32 and the imaging apparatus 34 in a communicable manner. The user 36 gives an instruction to the information processing apparatus 30 through the tablet terminal 32 to cause the information processing apparatus 30 to execute various types of processing.

Here, the various types of processing refer, for example, to processing of causing the imaging apparatus 34 to image the inspection object 16, processing of causing the imaging apparatus 34 to execute the distance measurement of the inspection object 16, processing of operating the drive system 14, image processing, or the like.

The image processing includes screen generation processing, composition processing, inspection processing, or the like. The screen generation processing is, for example, processing of generating various screens according to the intended use. The composition processing is, for example, processing of generating a panoramic image by connecting and joining a plurality of captured images obtained by imaging with the imaging apparatus 34 in a longitudinal direction and a transverse direction (for example, the vertical direction and the horizontal direction).

The inspection processing includes, for example, choke detection processing and damage detection processing. In the choke detection processing and the damage detection processing, for example, the panoramic image obtained by image processing is used. The choke detection processing is processing of detecting a choke mark drawn with a choke on the inspection object 16 included as an image in the panoramic image. The damage detection processing is processing of detecting damage (for example, fissuring and/or rust) of the inspection object 16 included as an image in the panoramic image. The choke detection processing is implemented by, for example, template matching type subject recognition processing, and the damage detection processing is implemented by, for example, an AI type subject recognition processing.

As described above, since the subject recognition processing is used in the inspection processing, it is preferable that the panoramic image has no missing part in order to improve the accuracy of the inspection processing. Examples of the missing part include a gap (that is, a blank region) caused by a failure in connecting the plurality of captured images.

In order to connect the plurality of captured images without a gap, it is preferable that the inclination and size are matched between the adjacent captured images, and that a predetermined amount (for example, about 30% of one frame) is overlapped without misregistration in the connection direction (for example, the longitudinal direction and the transverse direction), and then the imaging is executed by the imaging apparatus 34 frame by frame. One of the reasons for the overlap is that, in the connection processing, matching feature points between adjacent captured images are referenced and used to connect them. Therefore, a certain number of feature points are required for that purpose.

In order to obtain a plurality of captured images that satisfy a predetermined condition as a condition for obtaining a panoramic image having no missing part with respect to the inclination, the size, and the overlap amount, it is required to cause the imaging apparatus 34 to execute imaging at good timing (that is, the timing satisfying the predetermined condition as a condition for obtaining the panoramic image having no missing part with respect to the inclination, the size, and the overlap amount).

As described above, in order to cause the imaging apparatus 34 to execute imaging at the good timing, the inspection system 10 comprises the configurations illustrated in FIGS. 2 to 43 as an example.

Figure 2:
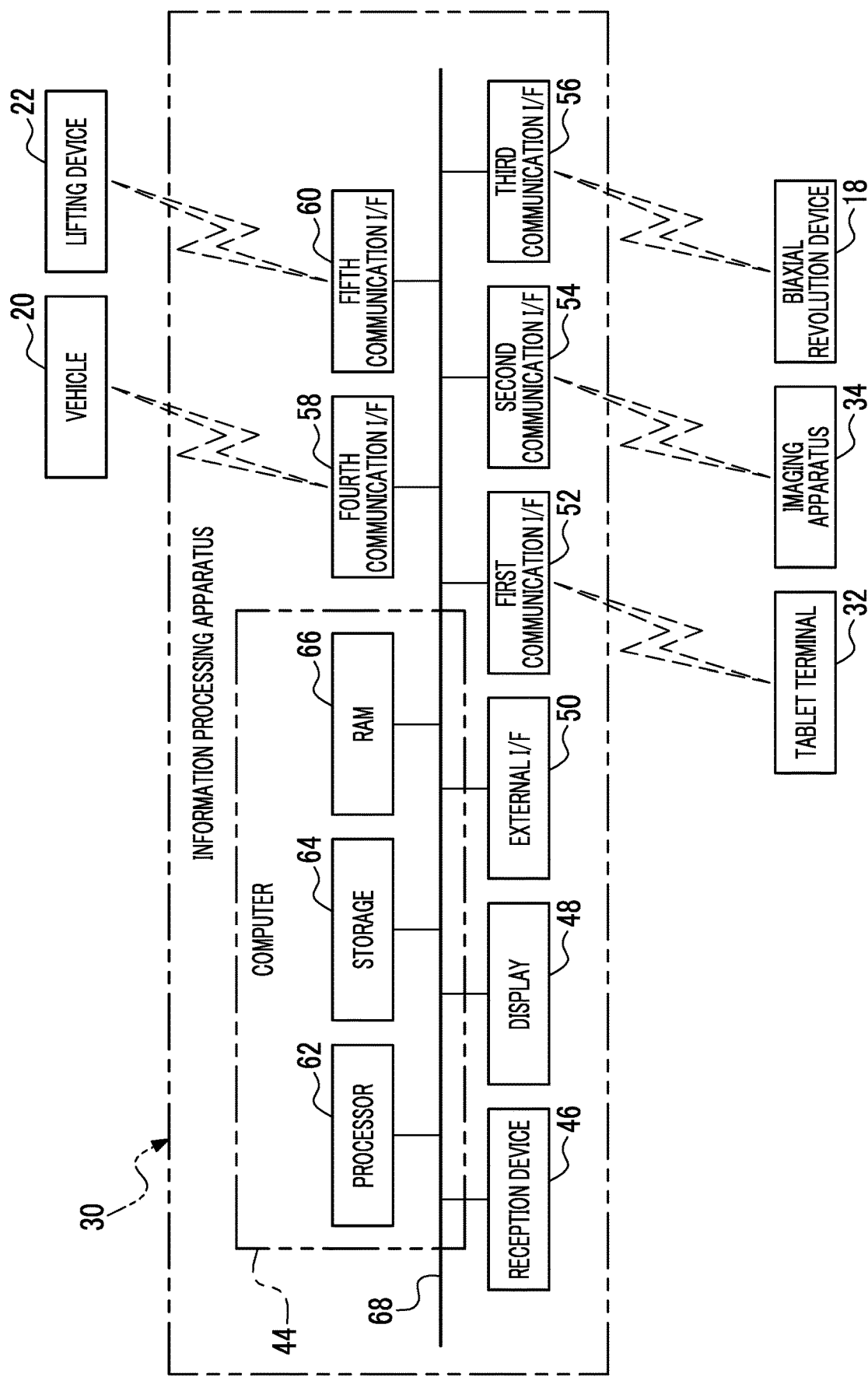
FIG. 2 is a schematic configuration diagram illustrating an example of a hardware configuration of an electrical system of an information processing apparatus.

As an example, as illustrated in FIG. 2, the information processing apparatus 30 comprises a computer 44, a reception device 46, a display 48, an external I/F 50, a first communication I/F 52, a second communication I/F 54, a third communication I/F 56, a fourth communication I/F 58, and a fifth communication I/F 60.

The computer 44 is an example of a "computer" according to the technology of the present disclosure. The computer 44 comprises a processor 62, a storage 64, and a RAM 66. The processor 62 is an example of a "processor" according to the technology of the present disclosure, and the RAM 66 is an example of a "memory" according to the technology of the present disclosure.

The processor 62, the storage 64, the RAM 66, the external I/F 50, the first communication I/F 52, the second communication I/F 54, the third communication I/F 56, the fourth communication I/F 58, and the fifth communication I/F 60 are connected to a bus 68. In the example illustrated in FIG. 2, one bus is illustrated as the bus 68 for convenience of illustration, but a plurality of buses may be used. The bus 68 may be a serial bus or may be a parallel bus including a data bus, an address bus, a control bus, or the like.

For example, the processor 62 has a CPU and a GPU and controls the entire information processing apparatus 30. The GPU operates under the control of the CPU, and is responsible for performing the image processing.

The storage 64 is a non-volatile storage device that stores various programs, various parameters, or the like. Examples of the storage 64 include an HDD and an SSD. The HDD and the SSD are merely examples, and a flash memory, a magnetic resistance memory, and/or a strong dielectric memory may be used instead of the HDD and/or the SSD or together with the HDD and/or the SSD.

The RAM 66 is a memory where information is temporarily stored, and is used as a work memory by the processor 62. Examples of the RAM 66 include a DRAM and/or an SRAM, and the like.

The reception device 46 has a keyboard, a mouse, a touch panel, and the like, and receives an instruction from a user 36 (refer to FIG. 1). The display 48 displays various types of information (for example, an image and a character) under the control of the processor 62. Examples of the display 48 include an EL display (for example, an organic EL display or an inorganic EL display). The display is not limited to the EL display, and another type of display, such as a liquid crystal display, may be used.

The external I/F 50 controls exchange of various types of information with a device (for example, a smart device, a personal computer, a server, a USB memory, a memory card, and/or a printer) existing outside the information processing apparatus 30. An example of the external I/F 50 is a USB interface. Various devices (not illustrated), such as a smart device, a personal computer, a server, a USB memory, a memory card, and/or a printer, are directly or indirectly connected to the USB interface.

The first communication I/F 52 is connected to the tablet terminal 32 in a communicable manner. Here, the first communication I/F 52 is connected to the tablet terminal 32 so as to be capable of wireless communication by a predetermined wireless communication standard. Examples of the predetermined wireless communication standard include Bluetooth (registered trademark). It may be a wireless communication standard other than this (for example, Wi-Fi, 5G, or the like). Here, although wireless communication is illustrated, the technology of the present disclosure is not limited to this, and wired communication may be applied instead of the wireless communication. The first communication I/F 52 controls the exchange of the information with the tablet terminal 32. For example, the first communication I/F 52 transmits the information in response to a request from the processor 62 to the tablet terminal 32. In addition, the first communication I/F 52 receives the information transmitted from the tablet terminal 32 to output the received information to the processor 62 via the bus 68.

The second communication I/F 54 is connected to the imaging apparatus 34 in a communicable manner. Here, the second communication I/F 54 is connected to the tablet terminal 32 so as to be capable of wireless communication by a predetermined wireless communication standard. In addition, although wireless communication is illustrated here, the technology of the present disclosure is not limited to this, and wired communication may be applied instead of the wireless communication. The second communication I/F 54 controls the exchange of the information with the imaging apparatus 34. For example, the second communication I/F 54 transmits the information in response to a request from the processor 62 to the imaging apparatus 34. In addition, the second communication I/F 54 receives the information transmitted from the imaging apparatus 34 to output the received information to the processor 62 via the bus 68.

The third communication I/F 56 is connected to the biaxial revolution device 18 in a communicable manner. Here, the third communication I/F 56 is connected to the biaxial revolution device 18 so as to be capable of wireless communication by a predetermined wireless communication standard. In addition, although wireless communication is illustrated here, the technology of the present disclosure is not limited to this, and wired communication may be applied instead of the wireless communication. The third communication I/F 56 controls the exchange of the information with the biaxial revolution device 18. For example, the third communication I/F 56 transmits the information in response to a request from the processor 62 to the biaxial revolution device 18. In addition, the third communication I/F 56 receives the information transmitted from the biaxial revolution device 18 to output the received information to the processor 62 via the bus 68.

The fourth communication I/F 58 is connected to the vehicle 20 in a communicable manner. Here, the fourth communication I/F 58 is connected to the vehicle 20 so as to be capable of wireless communication by a predetermined wireless communication standard. In addition, although wireless communication is illustrated here, the technology of the present disclosure is not limited to this, and wired communication may be applied instead of the wireless communication. The fourth communication I/F 58 controls the exchange of the information with the vehicle 20. For example, the fourth communication I/F 58 transmits the information in response to a request from the processor 62 to the vehicle 20. In addition, the fourth communication I/F 58 receives the information transmitted from the vehicle 20 to output the received information to the processor 62 via the bus 68.

The fifth communication I/F 60 is connected to the lifting device 22 in a communicable manner. Here, the fifth communication I/F 60 is connected to the lifting device 22 so as to be capable of wireless communication by a predetermined wireless communication standard. In addition, although wireless communication is illustrated here, the technology of the present disclosure is not limited to this, and wired communication may be applied instead of the wireless communication. The fifth communication I/F 60 controls the exchange of the information with the lifting device 22. For example, the fifth communication I/F 60 transmits the information in response to a request from the processor 62 to the vehicle 20. In addition, the fifth communication I/F 60 receives the information transmitted from the lifting device 22 to output the received information to the processor 62 via the bus 68.

Figure 3:
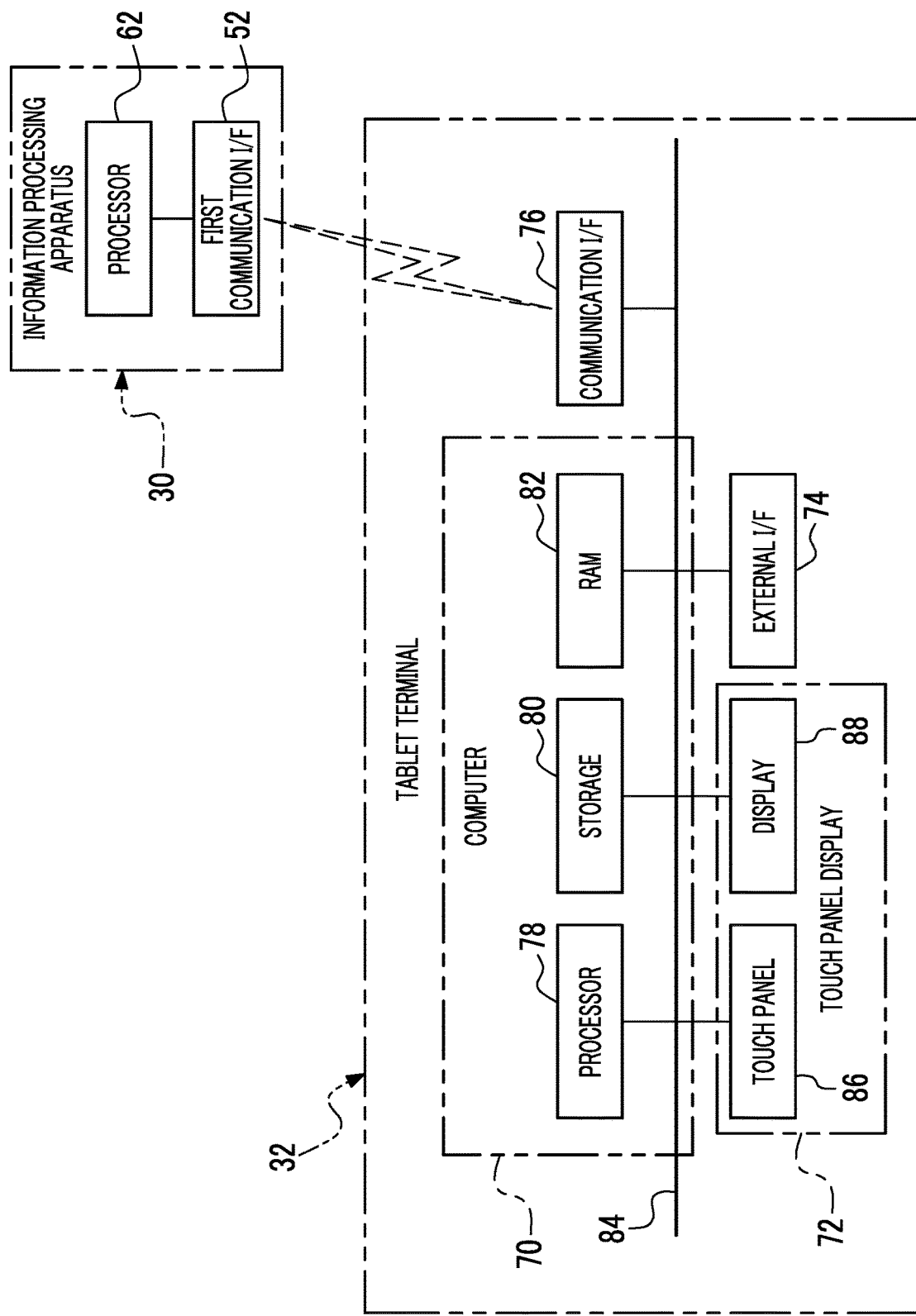
FIG. 3 is a schematic configuration diagram illustrating an example of a hardware configuration of an electrical system of a tablet terminal.

As an example, as illustrated in FIG. 3, the tablet terminal 32 comprises a computer 70, a touch panel display 72, an external I/F 74, and a communication I/F 76.

The computer 70 comprises a processor 78, a storage 80, and a RAM 82. The processor 78, the storage 80, and the RAM 82 are connected to a bus 84. In the example illustrated in FIG. 3, one bus is illustrated as the bus 84 for convenience of illustration, but a plurality of buses may be used. The bus 84 may be a serial bus or may be a parallel bus including a data bus, an address bus, a control bus, or the like.

For example, the processor 78 has a CPU and a GPU and controls the entire tablet terminal 32. The GPU operates under the control of the CPU, and is responsible for performing the image processing.

The storage 80 is a non-volatile storage device that stores various programs, various parameters, or the like. Examples of the storage 80 include a flash memory and an SSD. The flash memory and the SSD are merely examples, and an HDD, a magnetic resistance memory, and/or a strong dielectric memory may be used instead of the flash memory and/or the SSD or together with the flash memory and/or the SSD.

The RAM 82 is a memory where information is temporarily stored, and is used as a work memory by the processor 78. Examples of the RAM 82 include a DRAM and/or an SRAM, and the like.

The touch panel display 72 has a touch panel 86 and a display 88. An example of the display 88 is an EL display. The display is not limited to the EL display, and another type of display, such as a liquid crystal display, may be used.

The touch panel display 72 is formed by superimposing the touch panel 86 on a display region of the display 88 or by forming an in-cell type in which a touch panel function is built in the display 88. The in-cell type is merely an example, and an out-cell type or an on-cell type may be used.

The external I/F 74 controls exchange of various types of information with a device (for example, a smart device, a personal computer, a server, a USB memory, a memory card, and/or a printer) existing outside the tablet terminal 32. An example of the external I/F 74 is a USB interface. Various devices (not illustrated), such as a smart device, a personal computer, a server, a USB memory, a memory card, and/or a printer, are directly or indirectly connected to the USB interface.

The communication I/F 76 is connected to the information processing apparatus 30 in a communicable manner. Here, the communication I/F 76 is connected to the first communication I/F 52 of the information processing apparatus 30 so as to be capable of wireless communication by a predetermined wireless communication standard. Here, although wireless communication is illustrated, the technology of the present disclosure is not limited to this, and wired communication may be applied instead of the wireless communication. The communication I/F 76 controls the exchange of the information between the processor 62 of the information processing apparatus 30 and the processor 78 of the tablet terminal 32. For example, the communication I/F 76 transmits the information in response to a request from the processor 78 to the information processing apparatus 30. In addition, the communication I/F 76 receives the information transmitted from the processor 62 of the information processing apparatus 30 via the first communication I/F 52 to output the received information to the processor 78 via the bus 84.

The tablet terminal 32 performs processing according to an instruction received from the user 36 (refer to FIG. 1) by the touch panel display 72. For example, the tablet terminal 32 exchanges various types of information with the information processing apparatus 30 in accordance with an instruction received by the touch panel display 72. For example, the tablet terminal 32 receives the image transmitted from the information processing apparatus 30 to display the received image on the touch panel display 72.

Figure 4:
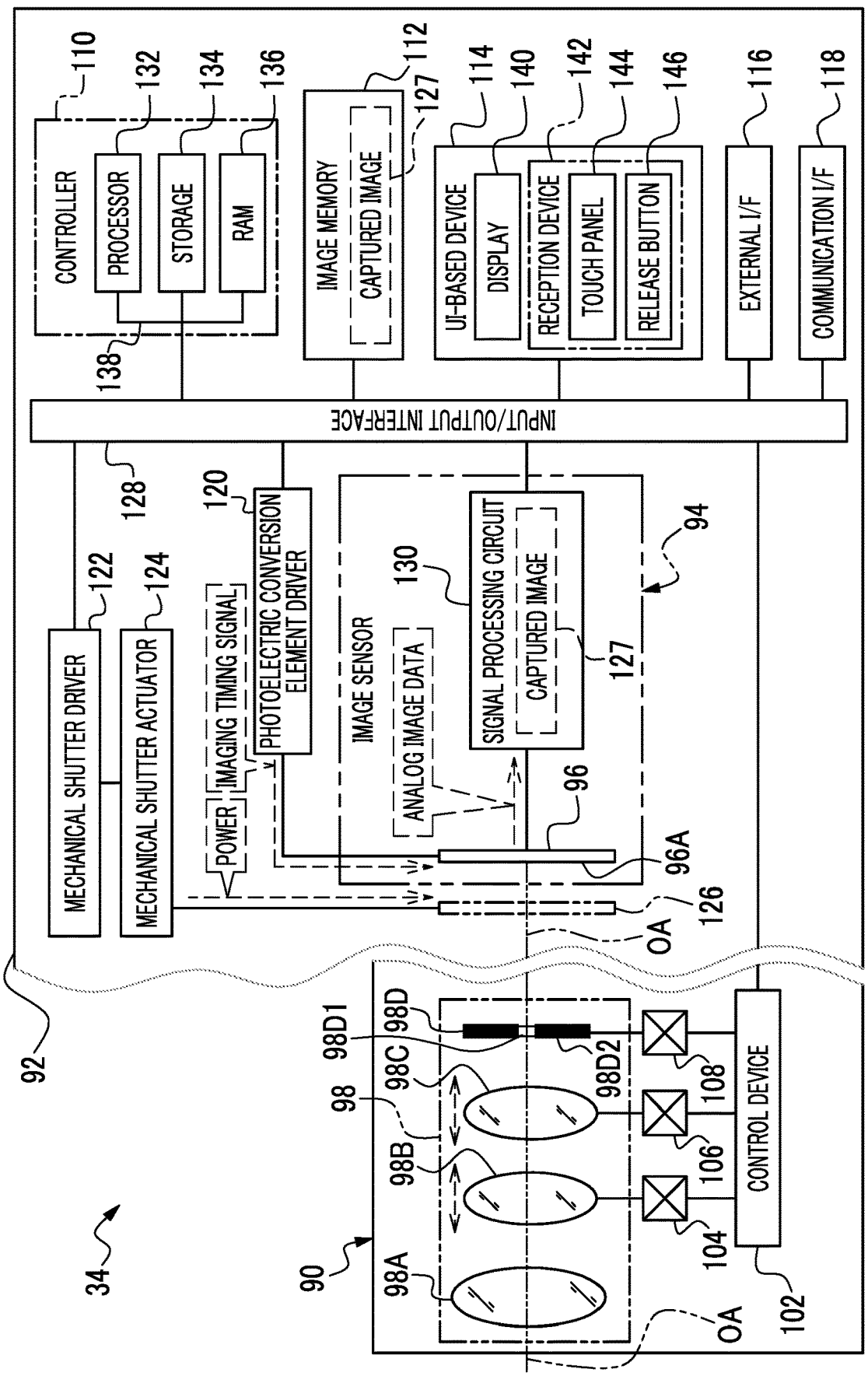
FIG. 4 is a schematic configuration diagram illustrating an example of hardware configurations of an optical system and an electrical system of an imaging apparatus.

As an example, as illustrated in FIG. 4, the imaging apparatus 34 comprises an interchangeable lens 90 and an imaging apparatus main body 92. The interchangeable lens 90 is interchangeably mounted to the imaging apparatus main body 92.

The imaging apparatus main body 92 comprises an image sensor 94. The image sensor 94 is a CMOS image sensor. The image sensor 94 images a subject (for example, the inspection object 16 illustrated in FIG. 1). In a case in which the interchangeable lens 90 is mounted to the imaging apparatus main body 92, subject light indicating the subject is transmitted through the interchangeable lens 90 and imaged on the image sensor 94, and then image data indicating an image of the subject is generated by the image sensor 94.

Here, although the CMOS image sensor is exemplified as the image sensor 94, the technology of the present disclosure is not limited to this, and other image sensors may be used.

The image sensor 94 comprises a photoelectric conversion element 96. The photoelectric conversion element 96 has a light-receiving surface 96A. The photoelectric conversion element 96 is disposed in the imaging apparatus main body 92 such that the center of the light-receiving surface 96A matches an optical axis OA. The photoelectric conversion element 96 has a plurality of photosensitive pixels disposed in a matrix shape, and the light-receiving surface 96A is formed by the plurality of photosensitive pixels. The photosensitive pixel is a physical pixel having a photodiode (not illustrated), which photoelectrically converts the received light and outputs an electric signal according to the light-receiving amount.

The interchangeable lens 90 comprises an imaging lens 98. The imaging lens 98 has an objective lens 98A, a focus lens 98B, a zoom lens 98C, and a stop 98D. The objective lens 98A, the focus lens 98B, the zoom lens 98C, and the stop 98D are disposed in the order of the objective lens 98A, the focus lens 98B, the zoom lens 98C, and the stop 98D along the optical axis OA from a subject side (object side) to the imaging apparatus main body 92 side (image side).

The interchangeable lens 90 comprises a control device 102, a first actuator 104, a second actuator 106, and a third actuator 108. The control device 102 controls the entire interchangeable lens 90 in accordance with an instruction from the imaging apparatus main body 92. The control device 102 is a device having a computer including, for example, a CPU, an NVM, a RAM, and the like. Here, although the computer is exemplified, this is merely an example, and a device including an ASIC, an FPGA, and/or a PLD may be applied. In addition, as the control device 102, for example, a device implemented by a combination of a hardware configuration and a software configuration may be used.

The first actuator 104 comprises a slide mechanism for focus (not illustrated) and a motor for focus (not illustrated). The focus lens 98B is mounted to the slide mechanism for focus so as to be slidable along the optical axis OA. In addition, the motor for focus is connected to the slide mechanism for focus, and the slide mechanism for focus operates by receiving the power of the motor for focus to move the focus lens 98B along the optical axis OA.

The second actuator 106 comprises a slide mechanism for zoom (not illustrated) and a motor for zoom (not illustrated). The zoom lens 98C is mounted to the slide mechanism for zoom so as to be slidable along the optical axis OA. In addition, the motor for zoom is connected to the slide mechanism for zoom, and the slide mechanism for zoom operates by receiving the power of the motor for zoom to move the zoom lens 98C along the optical axis OA.

Here, although an example of the embodiment in which the slide mechanism for focus and the slide mechanism for zoom are separately provided is given, this is merely an example, and an integrated slide mechanism that can implement both focusing and zooming may be used. In addition, in this case, the power generated by one motor may be transmitted to the slide mechanism without using the motor for focus and the motor for zoom.

The third actuator 108 comprises a power transmission mechanism (not illustrated) and a motor for stop (not illustrated). The stop 98D has an opening 98D1 and is a stop in which the size of the opening 98D1 is variable. The opening 98D1 is formed by a plurality of stop leaf blades 98D2. The plurality of stop leaf blades 98D2 are connected to the power transmission mechanism. In addition, the motor for stop is connected to the power transmission mechanism, and the power transmission mechanism transmits the power of the motor for stop to the plurality of stop leaf blades 98D2. The plurality of stop leaf blades 98D2 receives the power that is transmitted from the power transmission mechanism and operates to change the size of the opening 98D1. The stop 98D adjusts the exposure by changing the size of the opening 98D1.

The motor for focus, the motor for zoom, and the motor for stop are connected to the control device 102, and the control device 102 controls each drive of the motor for focus, the motor for zoom, and the motor for stop. A stepping motor is adopted as an example of the motor for focus, the motor for zoom, and the motor for stop in the present embodiment. Therefore, the motor for focus, the motor for zoom, and the motor for stop operate in synchronization with a pulse signal in response to a command from the control device 102. In addition, although an example in which the motor for focus, the motor for zoom, and the motor for stop are provided in the interchangeable lens 90 has been described here, this is merely an example, and at least one of the motor for focus, the motor for zoom, or the motor for stop may be provided in the imaging apparatus main body 92. A structure and/or an operation method of the interchangeable lens 90 can be changed as needed.

The interchangeable lens 90 comprises a first sensor (not illustrated). The first sensor detects a position of the focus lens 98B on the optical axis OA. An example of the first sensor is a potentiometer. A detection result from the first sensor is acquired by the control device 102 and is output to the imaging apparatus main body 92. The imaging apparatus main body 92 adjusts the position of the focus lens 98B on the optical axis OA based on the detection result from the first sensor.

The interchangeable lens 90 comprises a second sensor (not illustrated). The second sensor detects a position of the zoom lens 98C on the optical axis OA. An example of the second sensor is a potentiometer. A detection result from the second sensor is acquired by the control device 102 and is output to the imaging apparatus main body 92. The imaging apparatus main body 92 adjusts the position of the zoom lens 98C on the optical axis OA based on the detection result from the second sensor.

The interchangeable lens 90 comprises a third sensor (not illustrated). The third sensor detects a size of the opening 98D1. An example of the third sensor is a potentiometer. The detection result from the third sensor is acquired by the control device 102 and is output to the imaging apparatus main body 92. The imaging apparatus main body 92 adjusts the size of the opening 98D1 based on the detection result from the third sensor.

In the imaging apparatus 34, an MF mode and an AF mode are selectively set in accordance with the instruction given to the imaging apparatus main body 92. The MF mode is an operation mode that focuses manually. In the MF mode, for example, by operating a focus ring (not illustrated) or the like by the user, the focus lens 98B is moved along the optical axis OA with the movement amount according to the operation amount of the focus ring or the like, thereby the focus is adjusted.

In the AF mode, the imaging apparatus main body 92 calculates a focusing position according to a subject distance and moves the focus lens 98B toward the calculated focusing position to adjust the focus. Here, the focusing position refers to a position of the focus lens 98B on the optical axis OA in an in-focus state. In the following, for convenience of explanation, the control of aligning the focus lens 98B with the focusing position is also referred to as an "AF control".

The imaging apparatus main body 92 comprises the image sensor 94, a controller 110, an image memory 112, a UI-based device 114, an external I/F 116, a communication I/F 118, a photoelectric conversion element driver 120, a mechanical shutter driver 122, a mechanical shutter actuator 124, a mechanical shutter 126, and an input/output interface 128. In addition, the image sensor 94 comprises the photoelectric conversion element 96 and a signal processing circuit 130.

The controller 110, the image memory 112, the UI-based device 114, the external I/F 116, the communication I/F 118, the photoelectric conversion element driver 120, the mechanical shutter driver 122, and the signal processing circuit 130 are connected to the input/output interface 128. In addition, the control device 102 of the interchangeable lens 90 is also connected to the input/output interface 128.

The controller 110 comprises a processor 132, a storage 134, and a RAM 136. The processor 132, the storage 134, and the RAM 136 are connected to each other via a bus 138, and the bus 138 is connected to the input/output interface 128.

In the example illustrated in FIG. 4, one bus is illustrated as the bus 138 for convenience of illustration, but a plurality of buses may be used. The bus 138 may be a serial bus or may be a parallel bus including a data bus, an address bus, a control bus, or the like.

For example, the processor 132 has a CPU and a GPU and controls the entire imaging apparatus 34. The GPU operates under the control of the CPU, and is responsible for performing the image processing.

The storage 134 is a non-transitory storage medium, and stores various parameters and various programs. For example, the storage 134 is an EEPROM. However, this is merely an example, and an HDD and/or SSD or the like may be applied as the storage 134 instead of the EEPROM or together with the EEPROM. In addition, the RAM 136 transitorily stores various types of information, and is used as a work memory.

The processor 132 reads out a necessary program from the storage 134 and executes the read program on the RAM 136. The processor 132 controls the entire imaging apparatus 34 in accordance with the program executed on the RAM 136. In the example illustrated in FIG. 2, the image memory 112, the UI-based device 114, the external I/F 116, the communication I/F 118, the photoelectric conversion element driver 120, the mechanical shutter driver 122, and the control device 102 are controlled by the processor 132.

The photoelectric conversion element driver 120 is connected to the photoelectric conversion element 96. The photoelectric conversion element driver 120 supplies an imaging timing signal, which defines the timing of the imaging executed by the photoelectric conversion element 96, to the photoelectric conversion element 96 in accordance with an instruction from the processor 132. The photoelectric conversion element 96 executes reset, exposure, and output of an electric signal in accordance with the imaging timing signal supplied from the photoelectric conversion element driver 120. Examples of the imaging timing signal include a vertical synchronization signal and a horizontal synchronization signal.

In a case in which the interchangeable lens 90 is mounted to the imaging apparatus main body 92, the subject light incident on the imaging lens 98 is imaged on the light-receiving surface 96A by the imaging lens 98. Under the control of the photoelectric conversion element driver 120, the photoelectric conversion element 96 photoelectrically converts the subject light received by the light-receiving surface 96A, and outputs the electric signal according to the light amount of the subject light to the signal processing circuit 130 as analog image data indicating the subject light. Specifically, the signal processing circuit 130 reads out the analog image data from the photoelectric conversion element 96 in one frame unit and for each horizontal line by an exposure sequential read-out method.

The signal processing circuit 130 digitizes the analog image data to generate digital image data. In the following, for convenience of explanation, in a case in which it is not necessary to distinguish between digital image data to be internally processed in the imaging apparatus main body 92 and an image indicated by the digital image data (that is, an image that is visualized based on the digital image data and displayed on the display or the like), it is referred to as a "captured image 127".

The mechanical shutter 126 is a focal plane shutter and is disposed between the stop 98D and the light-receiving surface 96A. The mechanical shutter 126 comprises a front curtain (not illustrated) and a rear curtain (not illustrated). Each of the front curtain and the rear curtain comprises a plurality of leaf blades. The front curtain is disposed closer to the subject than the rear curtain.

The mechanical shutter actuator 124 is an actuator having a link mechanism (not illustrated), a solenoid for a front curtain (not illustrated), and a solenoid for a rear curtain (not illustrated). The solenoid for a front curtain is a drive source of the front curtain and is mechanically connected to the front curtain via the link mechanism. The solenoid for a rear curtain is a drive source of the rear curtain and is mechanically connected to the rear curtain via the link mechanism. The mechanical shutter driver 122 controls the mechanical shutter actuator 124 in accordance with the instruction from the processor 132.

The solenoid for a front curtain generates power under the control of the mechanical shutter driver 122 and selectively executes winding up and pulling down the front curtain by applying the generated power to the front curtain. The solenoid for a rear curtain generates power under the control of the mechanical shutter driver 122 and selectively executes winding up and pulling down the rear curtain by applying the generated power to the rear curtain. In the imaging apparatus 34, the exposure amount with respect to the photoelectric conversion element 96 is controlled by controlling the opening and closing of the front curtain and the opening and closing of the rear curtain by the processor 132.

In the imaging apparatus 34, imaging for a live view image and imaging for a recorded image for recording a still image and/or a video are executed by using the exposure sequential reading method (rolling shutter method). The image sensor 94 has an electronic shutter function, and the imaging for a live view image is implemented by activating the electronic shutter function without operating the mechanical shutter 126 in a fully opened state.

On the other hand, imaging accompanied by the main exposure, that is, the imaging for a still image (hereinafter, also referred to as a "main imaging") is implemented by activating the electronic shutter function and operating the mechanical shutter 126 such that the mechanical shutter 126 transitions from the front curtain closed state to the rear curtain closed state.

The image memory 112 stores the captured image 127 generated by the signal processing circuit 130. That is, the signal processing circuit 130 causes the image memory 112 to store the captured image 127. The processor 132 acquires the captured image 127 from the image memory 112 and performs various types of processing by using the acquired captured image 127.

The UI-based device 114 comprises a display 140, and the processor 132 causes the display 140 to display various types of information. In addition, the UI-based device 114 comprises a reception device 142. The reception device 142 comprises a touch panel 144, a release button 146, and the like.

The release button 146 functions as an imaging preparation instruction unit and an imaging instruction unit, and a push operation of two stages of an imaging preparation instruction state and an imaging instruction state can be detected. For example, the imaging preparation instruction state refers to a state in which the release button is pushed to an intermediate position (half push position) from a standby position, and the imaging instruction state refers to a state in which the release button is pushed to a final push position (full push position) beyond the intermediate position. In the following, the "state in which the release button is pushed to the half push position from the standby position" will be referred to as a "half push state", and the "state in which the release button is pushed to the full push position from the standby position" will be referred to as a "full push state".

The external I/F 116 controls the exchange of various types of information with a device existing outside the imaging apparatus 34 (hereinafter, also referred to as an "external device"). Examples of the external I/F 116 include a USB interface. External devices (not illustrated), such as a 3D sensor 38 (refer to FIGS. 1 and 5), a smart device, a personal computer, a server, a USB memory, a memory card, and/or a printer, are directly or indirectly connected to the USB interface.

Figure 5:
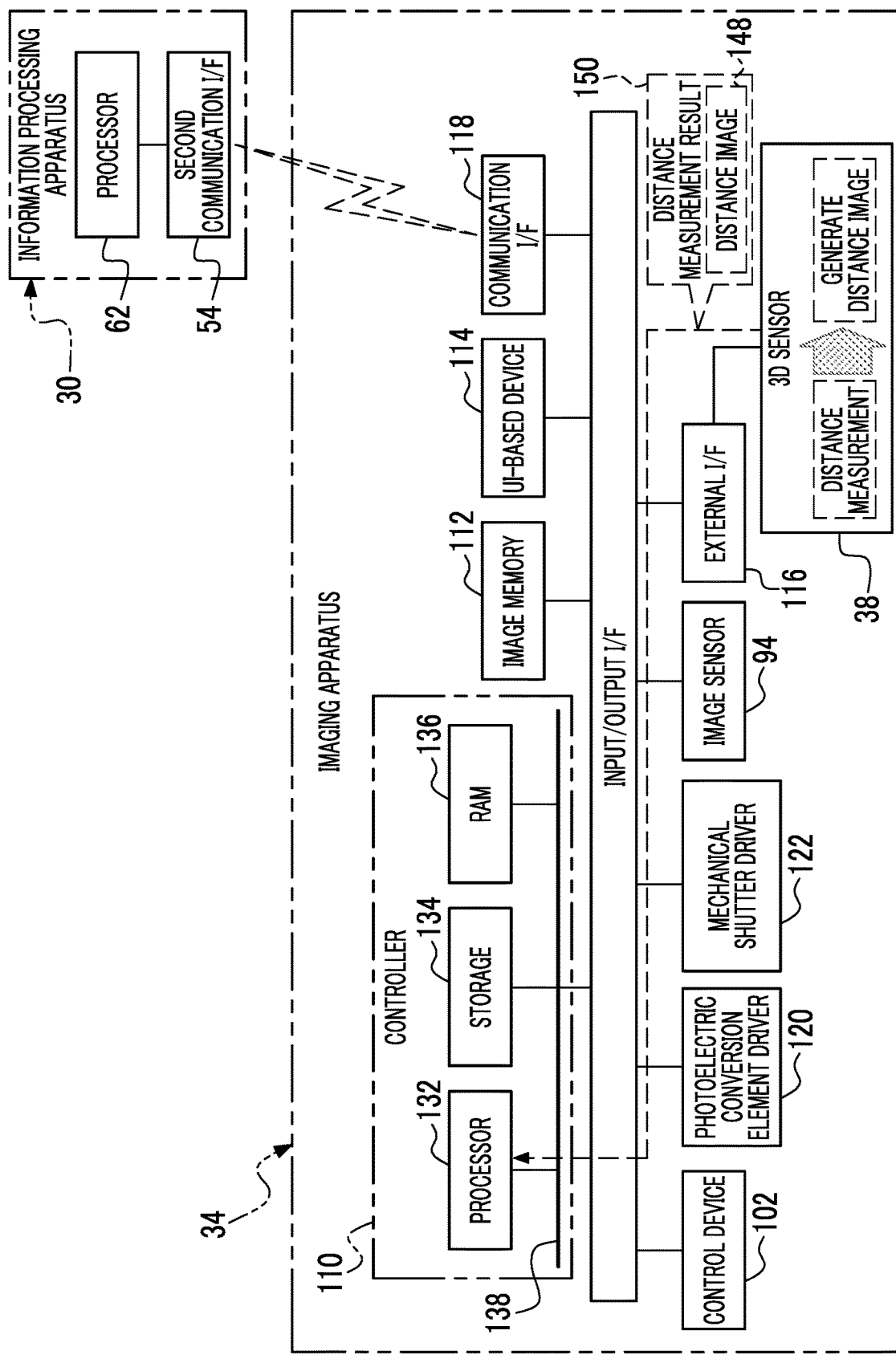
FIG. 5 is a schematic configuration diagram illustrating an example of a hardware configuration of the electric system of the imaging apparatus.

The communication I/F 118 controls transmission and reception of information by the imaging apparatus 34 with respect to the information processing apparatus 30. As an example, as illustrated in FIG. 5, the communication I/F 118 is connected to the information processing apparatus 30 in a communicable manner. Here, the communication I/F 118 is connected to the second communication I/F 54 of the information processing apparatus 30 so as to be capable of wireless communication by a predetermined wireless communication standard. Here, although wireless communication is illustrated, the technology of the present disclosure is not limited to this, and wired communication may be applied instead of the wireless communication. The communication I/F 118 controls the exchange of the information between the processor 62 of the information processing apparatus 30 and the processor 132 of the imaging apparatus 34. For example, the communication I/F 118 transmits the information in response to a request from the processor 132 to the information processing apparatus 30. In addition, the communication I/F 118 receives the information transmitted from the processor 62 of the information processing apparatus 30 via the second communication I/F 54 to output the received information to the processor 132 via the bus 138.

The processor 132 operates the 3D sensor 38 in accordance with the instruction from the information processing apparatus 30 to cause the 3D sensor 38 to execute the distance measurement. That is, the processor 132 causes the 3D sensor 38 to measure the distance to the inspection object 16 (refer to FIG. 1). A distance measurement range, that is, a range of the inspection object 16 measured by the 3D sensor 38 is a range corresponding to the imaging range (for example, the imaging range for one frame) imaged by the imaging apparatus 34. The processor 132 acquires a distance measurement result 150 obtained by the 3D sensor 38. The distance measurement result 150 includes a distance image 148 as information based on the distance between the inspection object 16 and the imaging apparatus 34. The distance image 148 is generated by the 3D sensor 38 based on the distance measurement results.

The distance image 148 is an image illustrating a distance from the imaging apparatus 34 to a plurality of distance measurement points within the distance measurement range. In addition, the distance image 148 has a plurality of pixels arranged in a matrix, and each pixel is represented by a color according to a distance obtained by distance measurement. Distance data indicating a distance from the imaging apparatus 34 to a distance measurement point within the distance measurement range is assigned to the plurality of pixels, and the color according to the distance indicated by the distance data is applied to the plurality of pixels. The color according to the distance is a color within a constant hue angle (here, as an example, a hue angle of 0 degree or more and 240 degrees or less). For example, a color closer to blue is applied to the pixel as the distance indicated by the distance data applied to the pixels is farther from the imaging apparatus 34, and a color closer to red is applied to the pixel as the distance indicated by the distance data applied to the pixels is closer to the imaging apparatus 34.

Figure 6:
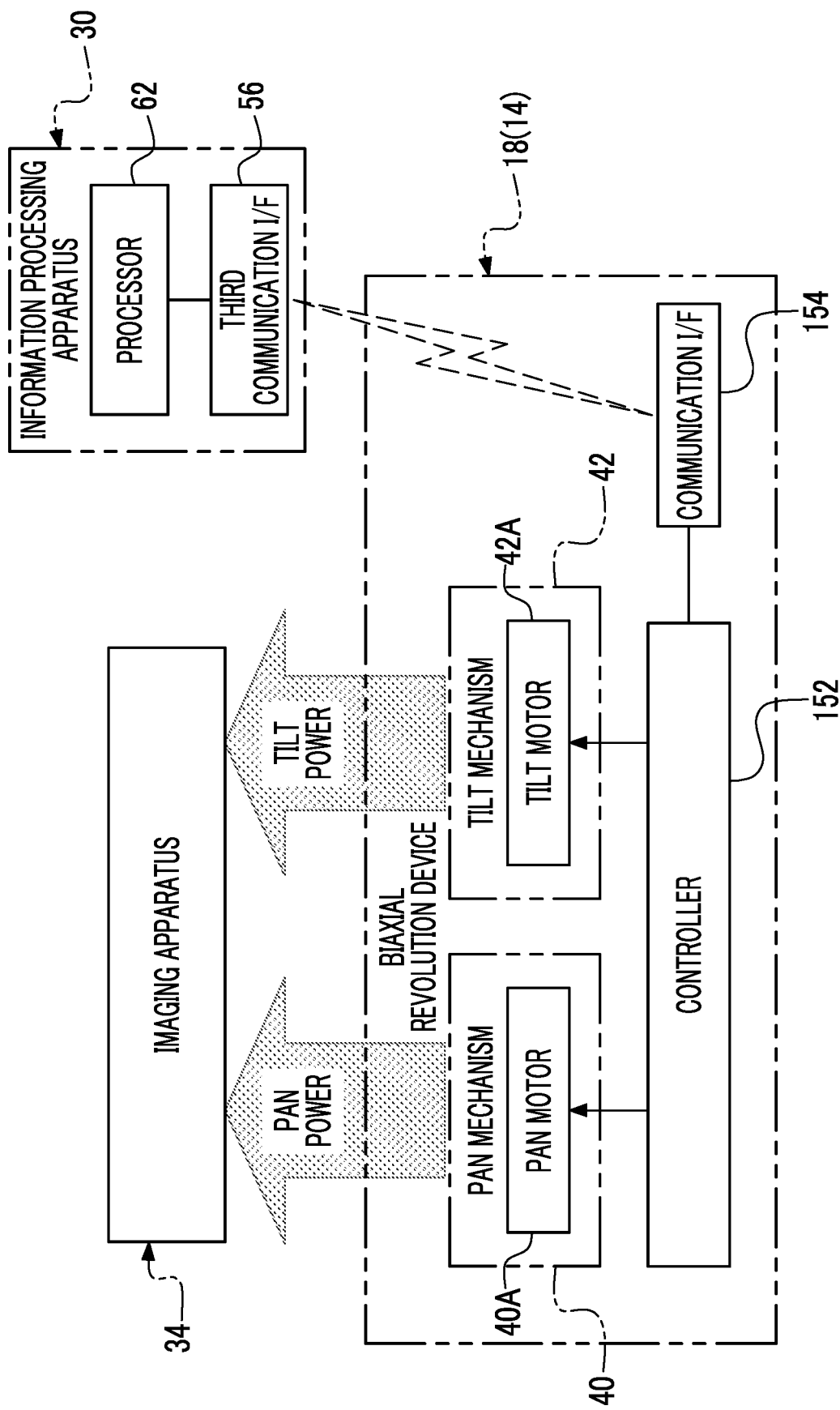
FIG. 6 is a schematic configuration diagram illustrating an example of a hardware configuration of a biaxial revolution mechanism.

As an example, as illustrated in FIG. 6, the biaxial revolution device 18 which is one of the drive systems 14 comprises a pan mechanism 40, a tilt mechanism 42, a controller 152, and a communication I/F 154.

The controller 152 controls the entire biaxial revolution device 18. An example of the controller 152 is a computer having a processor (for example, a CPU), a storage (for example, an EEPROM), and a RAM. The computer is merely an example, and a device including an ASIC, an FPGA, and/or a PLD may be applied instead of the computer. In addition, instead of the computer, a combination of a hardware configuration and a software configuration may be used.

The communication I/F 154 is connected to the controller 152. In addition, the communication I/F 154 is connected to the information processing apparatus 30 in a communicable manner. Here, the communication I/F 154 is connected to the third communication I/F 56 of the information processing apparatus 30 so as to be capable of wireless communication by a predetermined wireless communication standard. Here, although wireless communication is illustrated, the technology of the present disclosure is not limited to this, and wired communication may be applied instead of the wireless communication. The communication I/F 154 controls the exchange of the information between the controller 152 of the biaxial revolution device 18 and the processor 62 of the information processing apparatus 30. For example, the communication I/F 154 transmits the information in response to a request from the controller 152 to the information processing apparatus 30. In addition, the communication I/F 154 receives the information transmitted from the processor 62 of the information processing apparatus 30 via the third communication I/F 56 to output the received information to the controller 152.

The pan mechanism 40 has a pan motor 40A. The pan motor 40A is connected to the controller 152, and is driven under the control of the controller 152. The pan mechanism 40 pans the imaging apparatus 34 by transmitting a driving force of the pan motor 40A to the imaging apparatus 34 as power around the pan axis PA (refer to FIG. 1).

The tilt mechanism 42 has a tilt motor 42A. The tilt motor 42A is connected to the controller 152, and is driven under the control of the controller 152. The tilt mechanism 42 tilts the imaging apparatus 34 by transmitting a driving force of the tilt motor 42A to the imaging apparatus 34 as power around the tilt axis TA (refer to FIG. 1).

Figure 7:
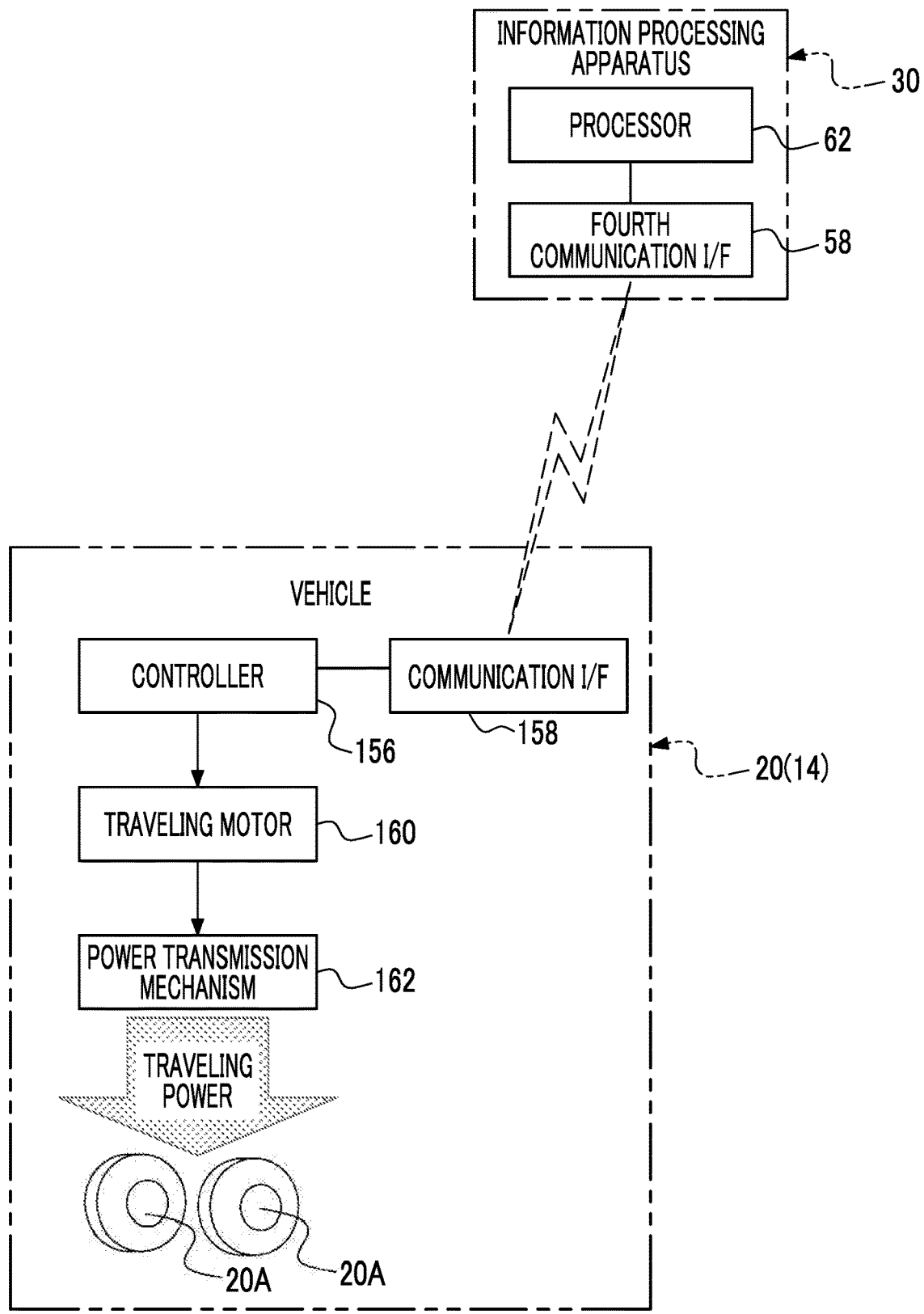
FIG. 7 is a schematic configuration diagram illustrating an example of a hardware configuration of a vehicle.

As an example, as illustrated in FIG. 7, the vehicle 20 which is one of the drive systems 14 comprises a controller 156, a communication I/F 158, a traveling motor 160, and a power transmission mechanism 162.

The controller 156 controls the entire vehicle 20. An example of the controller 156 is a computer having a processor (for example, a CPU), a storage (for example, an EEPROM), and a RAM. The computer is merely an example, and a device including an ASIC, an FPGA, and/or a PLD may be applied instead of the computer. In addition, instead of the computer, a combination of a hardware configuration and a software configuration may be used.

The communication I/F 158 is connected to the controller 156. In addition, the communication I/F 158 is connected to the information processing apparatus 30 in a communicable manner. Here, the communication I/F 158 is connected to the fourth communication I/F 58 of the information processing apparatus 30 so as to be capable of wireless communication by a predetermined wireless communication standard. Here, although wireless communication is illustrated, the technology of the present disclosure is not limited to this, and wired communication may be applied instead of the wireless communication. The communication I/F 158 controls the exchange of the information between the controller 156 of the vehicle 20 and the processor 62 of the information processing apparatus 30. For example, the communication I/F 158 transmits the information in response to a request from the controller 156 to the information processing apparatus 30. In addition, the communication I/F 158 receives the information transmitted from the processor 62 of the information processing apparatus 30 via the fourth communication I/F 58 to output the received information to the controller 156.

The traveling motor 160 is connected to the controller 156, and is driven under the control of the controller 156. The power transmission mechanism 162 is connected to the traveling motor 160 and a plurality of wheels 20A (for example, two front wheels, two rear wheels, or four wheels 20A). The power transmission mechanism 162 rotates the plurality of wheels 20A by transmitting a driving force of the traveling motor 160 to the plurality of wheels 20A. In a case in which the plurality of wheels 20A rotate, the vehicle 20 travels. The vehicle 20 also comprises a direction changing mechanism (not illustrated) that changes the direction of the plurality of wheels 20A and a direction changing motor (not illustrated) that applies power to the direction changing mechanism, and the power of the direction changing motor is controlled by the controller 156. The information processing apparatus 30 controls the traveling of the vehicle 20 by controlling the drive of the traveling motor 160 and the direction change motor via the controller 156.

Figure 8:
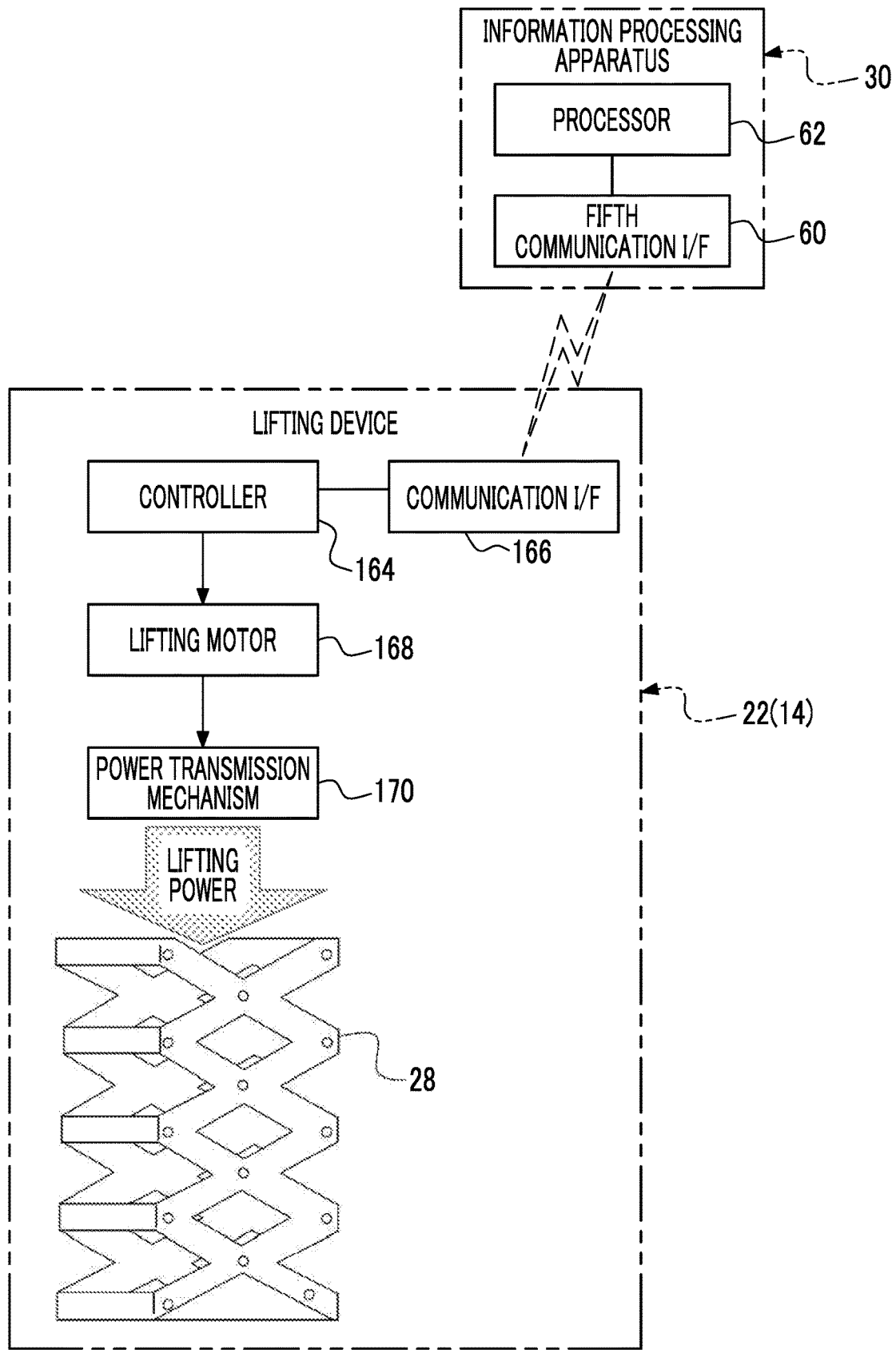
FIG. 8 is a schematic configuration diagram illustrating an example of a hardware configuration of a lifting device.

As an example, as illustrated in FIG. 8, the lifting device 22 which is one of the drive systems 14 comprises a controller 164, a communication I/F 166, a lifting motor 168, and a power transmission mechanism 170.

The controller 164 controls the entire lifting device 22. An example of the controller 164 is a computer having a processor (for example, a CPU), a storage (for example, an EEPROM), and a RAM. The computer is merely an example, and a device including an ASIC, an FPGA, and/or a PLD may be applied instead of the computer. In addition, instead of the computer, a combination of a hardware configuration and a software configuration may be used.

The communication I/F 166 is connected to the controller 164. In addition, the communication I/F 166 is connected to the information processing apparatus 30 in a communicable manner. Here, the communication I/F 166 is connected to the fifth communication I/F 60 of the information processing apparatus 30 so as to be capable of wireless communication by a predetermined wireless communication standard. Here, although wireless communication is illustrated, the technology of the present disclosure is not limited to this, and wired communication may be applied instead of the wireless communication. The communication I/F 166 controls the exchange of the information between the controller 164 of the lifting device 22 and the processor 62 of the information processing apparatus 30. For example, the communication I/F 166 transmits the information in response to a request from the controller 164 to the information processing apparatus 30. In addition, the communication I/F 166 receives the information transmitted from the processor 62 of the information processing apparatus 30 via the fifth communication I/F 60 to output the received information to the controller 164.

The lifting motor 168 is connected to the controller 164, and is driven under the control of the controller 164. The power transmission mechanism 170 is connected to the lifting motor 168 and the pantograph mechanism 28. The power transmission mechanism 170 expands and contracts the pantograph mechanism 28 in the vertical direction by transmitting a driving force of the lifting motor 168 to the pantograph mechanism 28. As the pantograph mechanism 28 expands and contracts along the vertical direction, raising and lowering of the gondola 26 (refer to FIG. 1) is implemented.

Figure 9:
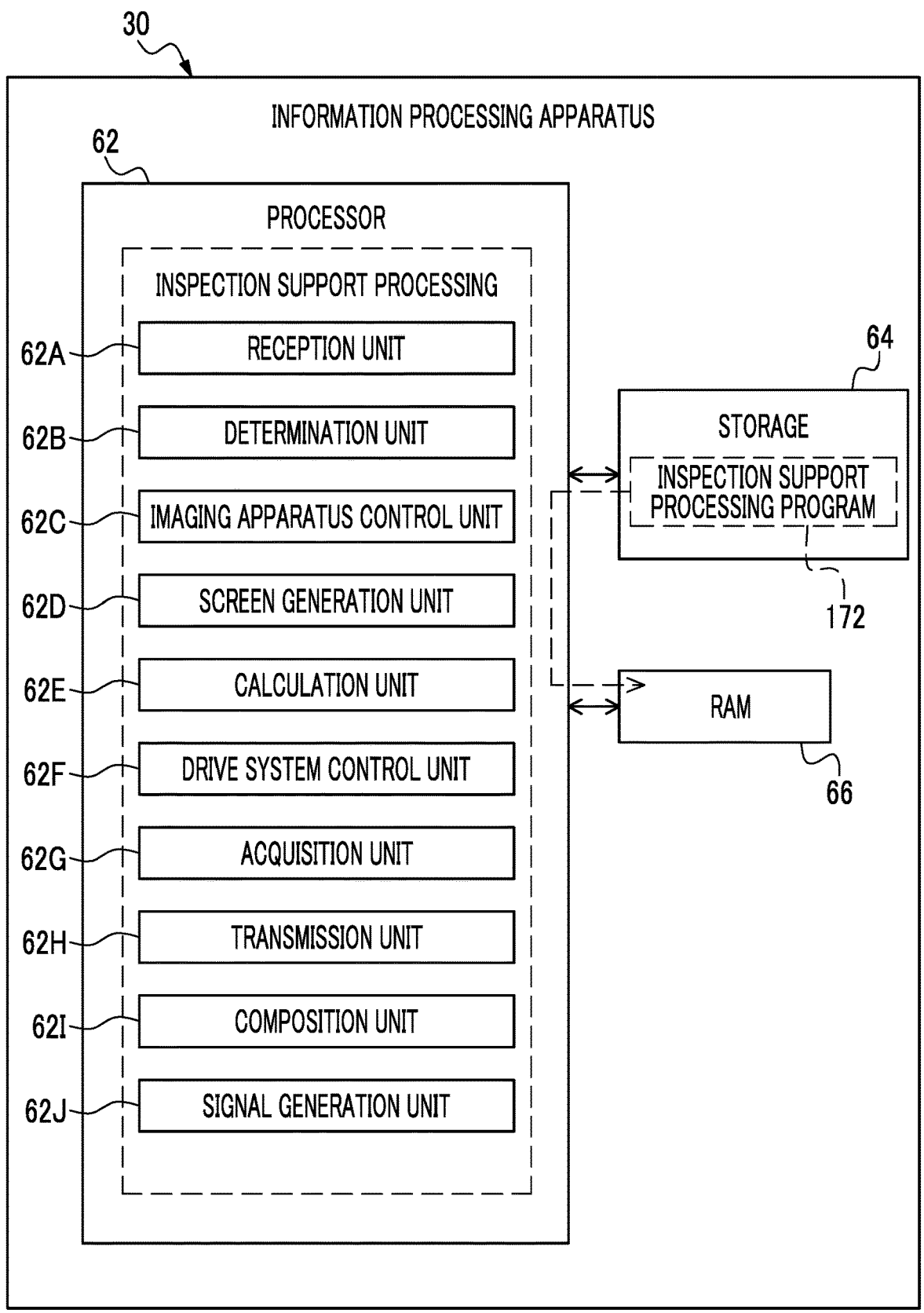
FIG. 9 is a block diagram illustrating an example of a function of a main part of a processor of the information processing apparatus.

As an example, as illustrated in FIG. 9, an inspection support processing program 172 is stored in the storage 64 of the information processing apparatus 30. The inspection support processing program 172 is an example of a "program" according to the technology of the present disclosure.

The processor 62 reads out the inspection support processing program 172 from the storage 64 and executes the read inspection support processing program 172 on the RAM 66. The processor 62 performs inspection support processing in accordance with the inspection support processing program 172 executed on the RAM 66 (refer to FIGS. 45A to 45D). By executing the inspection support processing program 172, the processor 62 operates as a reception unit 62A, a determination unit 62B, an imaging apparatus control unit 62C, a screen generation unit 62D, a calculation unit 62E, a drive system control unit 62F, an acquisition unit 62G, a transmission unit 62H, a composition unit 62I, and a signal generation unit 62J.

Figure 10:
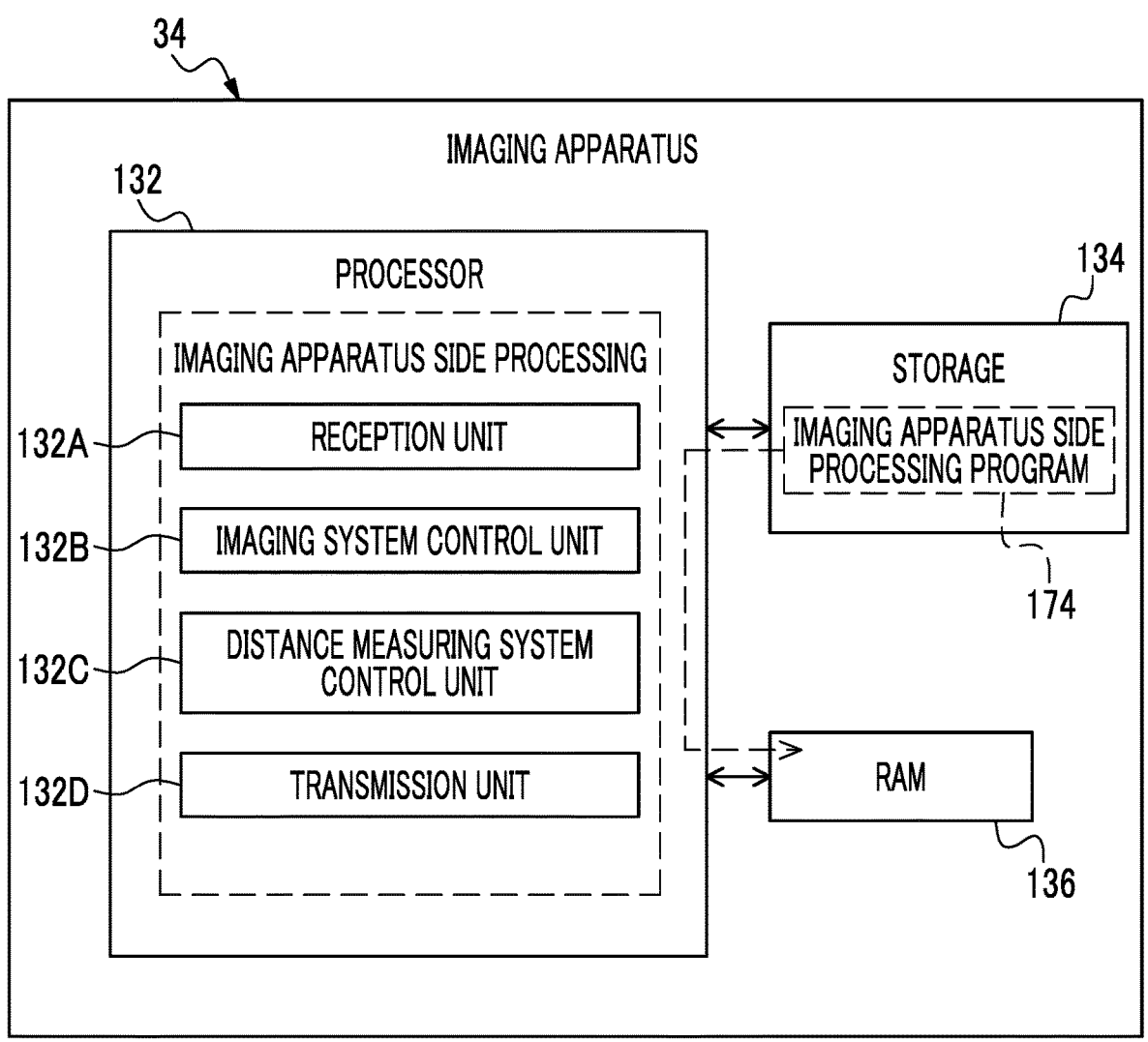
FIG. 10 is a block diagram illustrating an example of a function of a main part of a processor of the imaging apparatus.

As an example, as illustrated in FIG. 10, an imaging apparatus side processing program 174 is stored in the storage 134 of the imaging apparatus 34. The processor 132 reads out the imaging apparatus side processing program 174 from the storage 134 and executes the read imaging apparatus side processing program 174 on the RAM 136. The processor 132 performs the imaging apparatus side processing in accordance with the imaging apparatus side processing program 174 executed on the RAM 136 (refer to FIG. 45). By executing the imaging apparatus side processing program 174, the processor 132 operates as a reception unit 132A, an imaging system control unit 132B, a distance measurement system control unit 132C, and a transmission unit 132D.

Figure 11:
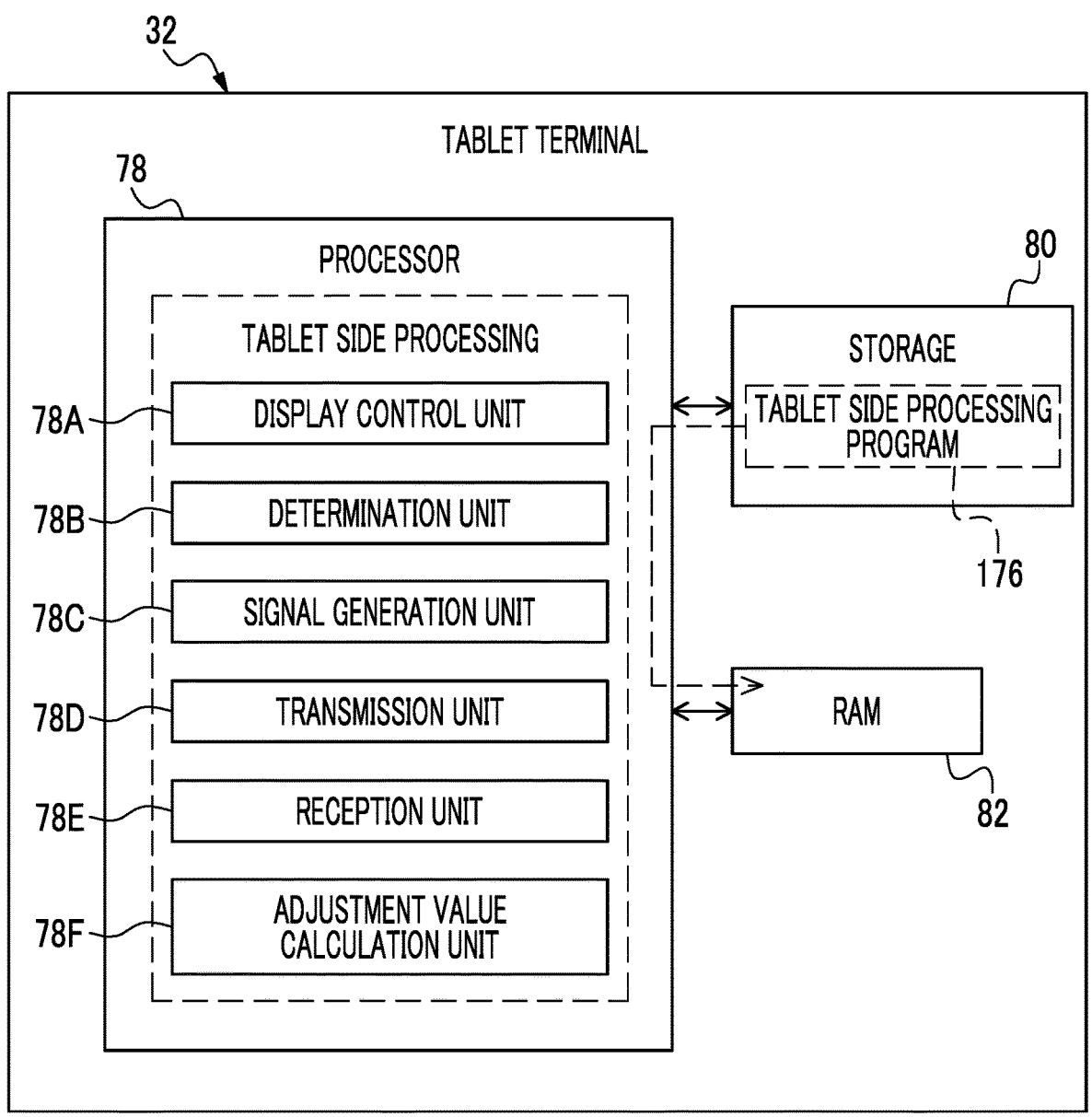
FIG. 11 is a block diagram illustrating an example of a function of a main part of a processor of the tablet terminal.

As an example, as illustrated in FIG. 11, a tablet side processing program 176 is stored in the storage 80 of the tablet terminal 32. The processor 78 reads out the tablet side processing program 176 from the storage 80 and executes the read tablet side processing program 176 on the RAM 82. The processor 78 performs the tablet side processing in accordance with the tablet side processing program 176 executed on the RAM 82 (refer to FIGS. 44A to 44C). By executing the tablet side processing program 176, the processor 78 operates as a display control unit 78A, a determination unit 78B, a signal generation unit 78C, a transmission unit 78D, a reception unit 78E, and an adjustment value calculation unit 78F.

Figure 12:
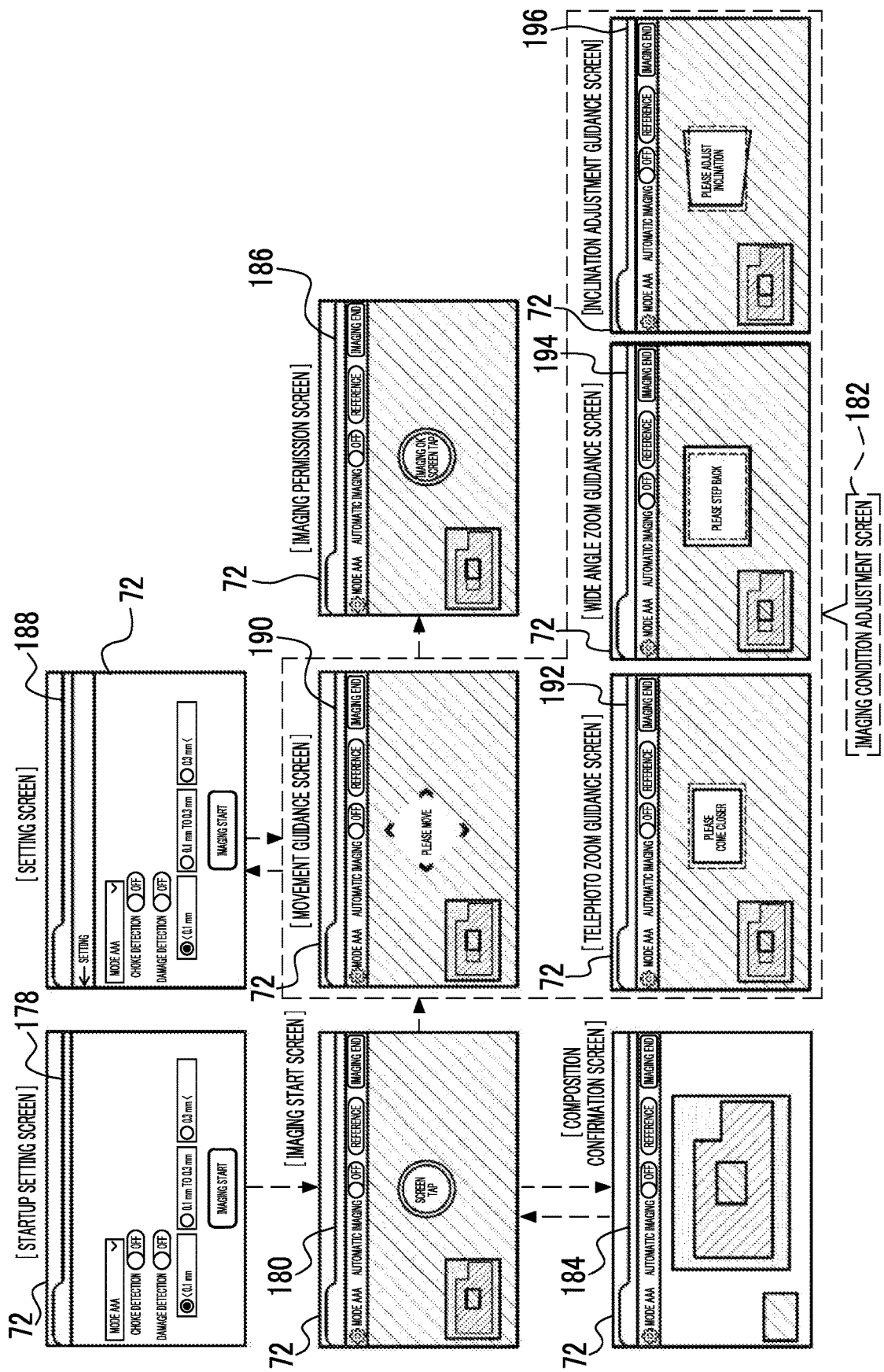
FIG. 12 is a schematic screen diagram illustrating an example of various screens displayed on a touch panel display of the tablet terminal.

In a case in which the tablet side processing is performed by the processor 78 in the tablet terminal 32, as an example, as illustrated in FIG. 12, a startup setting screen 178, an imaging start screen 180, an imaging condition adjustment screen 182, a composition confirmation screen 184, an imaging permission screen 186, and a setting screen 188 are selectively displayed on the touch panel display 72 of the tablet terminal 32.

The startup setting screen 178 is first displayed on the touch panel display 72 by performing the tablet side processing. The startup setting screen 178 is a screen that allows the user 36 (refer to FIG. 1) to select between performing the choke detection processing and performing the damage detection processing, allows the user 36 to designate the size of the damage or the like which is to be a detection target, or receives an instruction to start the imaging for the imaging apparatus 34.

The imaging start screen is a screen that receives an instruction to start imaging for a panoramic image used in the choke detection processing and/or the damage detection processing. The imaging condition adjustment screen 182 is a screen that receives an instruction to adjust imaging conditions of the imaging apparatus 34. The imaging condition adjustment screen 182 is classified into a movement guidance screen 190, a telescopic zoom guidance screen 192, a wide angle zoom guidance screen 194, and an inclination adjustment guidance screen 196. The movement guidance screen 190 is a screen that guides the user 36 regarding the adjustment of a movement direction of the imaging range of the imaging apparatus 34. The telescopic zoom guidance screen 192 is a screen that guides the user 36 regarding the setting of the optical telescopic zoom of the imaging apparatus 34. The wide angle zoom guidance screen 194 is a screen that guides the user 36 regarding the setting of the optical wide angle zoom of the imaging apparatus 34. The inclination adjustment guidance screen 196 is a screen that guides the user 36 regarding the adjustment of the inclination of the captured image 127.

The composition confirmation screen 184 is a screen that allows the user 36 to confirm the panoramic image. The imaging permission screen 186 is a screen that notifies the user 36 that the main imaging is permitted and that receives an instruction to start the main imaging. The setting screen 188 is a screen that receives instructions of various settings (for example, a change from the choke detection processing to the damage detection processing, a change from the damage detection processing to the choke detection processing, and/or a change in the size of the damage or the like which is to be a detection target).

In the following, an example of processing in which the startup setting screen 178, the imaging start screen 180, the imaging condition adjustment screen 182, the composition confirmation screen 184, the imaging permission screen 186, and the setting screen 188 are generated by the information processing system 12 will be explained.

Figure 13:
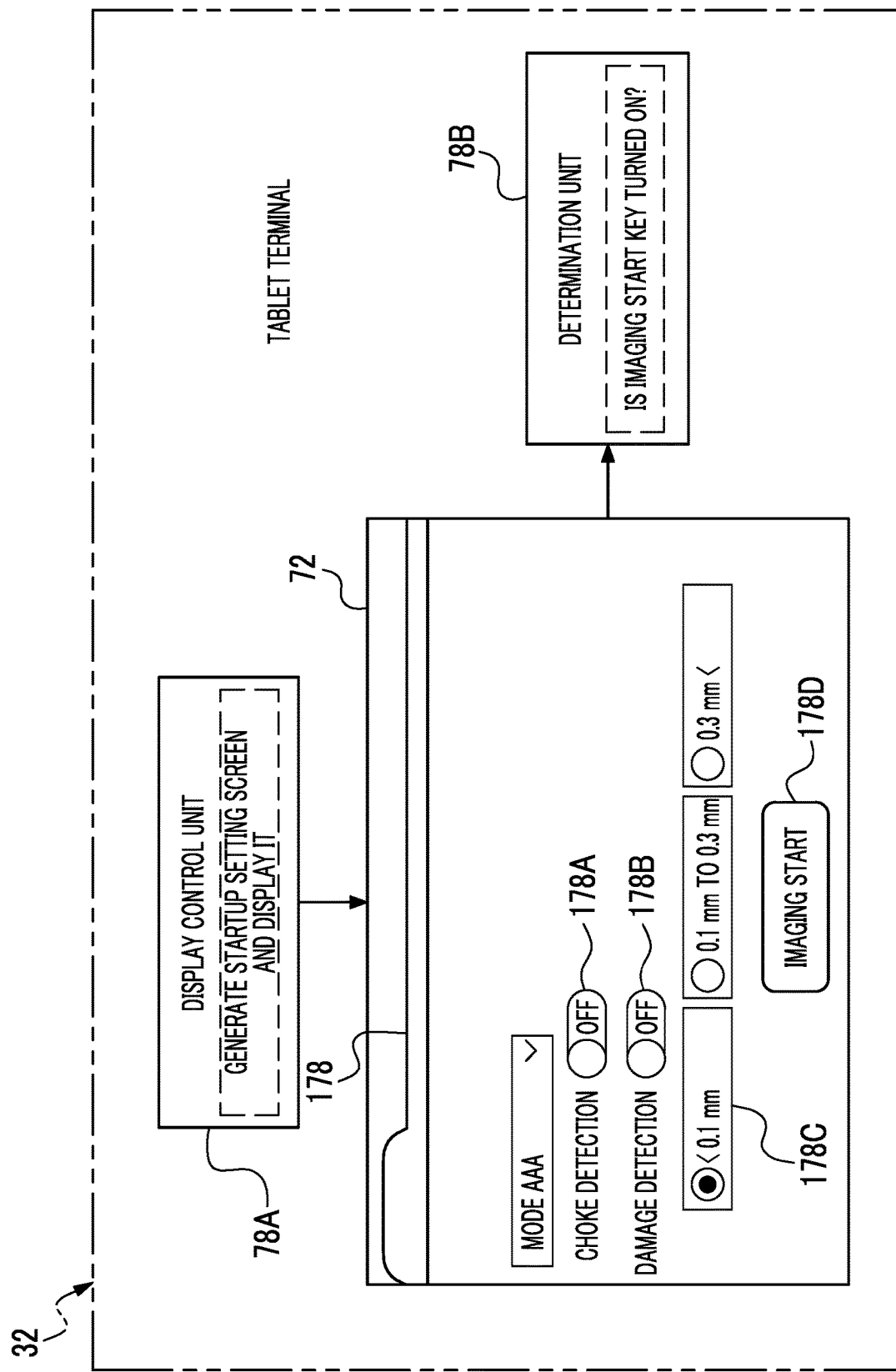
FIG. 13 is a conceptual diagram illustrating an example of a processing content for displaying a startup setting screen and a processing content using the startup setting screen.

As an example, as illustrated in FIG. 13, in the tablet terminal 32, the display control unit 78A generates a startup setting screen 178, and displays the generated startup setting screen 178 on the touch panel display 72. In the startup setting screen 178, a first button 178A, a second button 178B, a plurality of size designation boxes 178C, and an imaging start key 178D are displayed. The first button 178A is a slide-type soft key, and on and off can be switched by sliding the first button 178A. In a case in which the first button 178A is turned on, the choke detection processing is performed, and in a case in which the first button 178A is turned off, the choke detection processing is not performed. The second button 178B is a slide-type soft key. In a case in which the second button 178B is turned on, the damage detection processing is performed, and in a case in which the second button 178B is turned off, the damage detection processing is not performed. The plurality of size designation boxes 178C are used to designate the size of the damage or the like which is to be a detection target. In the plurality of size designation boxes 178C, ranges of different sizes as the size of the damage or the like which is to be a detection target, and radio buttons are displayed. In a case in which any of the radio buttons of the plurality of size designation boxes 178C is turned on, damage or the like in a size range displayed in the size designation box 178C to which the radio button is turned on is set as a detection target. The imaging start key 178D receives an instruction to start imaging by the imaging apparatus 34. In a case in which the imaging start key 178D is turned on, an instruction to start imaging by the imaging apparatus 34 is received.

Figure 14:
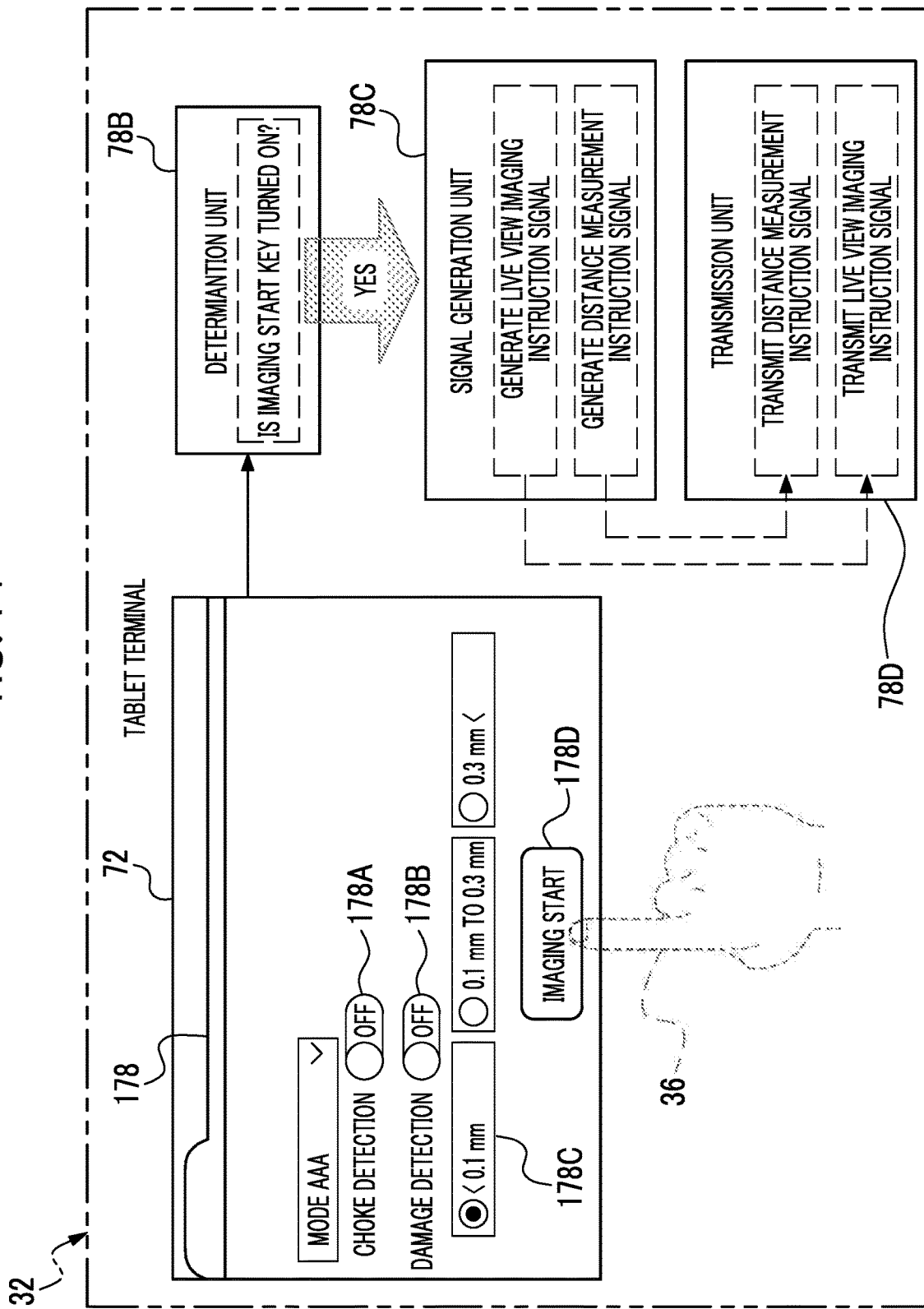
FIG. 14 is a conceptual diagram illustrating an example of a processing content using the startup setting screen.

The determination unit 78B determines whether or not the imaging start key 178D has been turned on. As an example, as illustrated in FIG. 14, in a case in which the imaging start key 178D is turned on, the signal generation unit 78C generates a live view imaging instruction signal and generates a distance measurement instruction signal. The live view imaging instruction signal is a signal instructing the imaging apparatus 34 to start imaging for a live view image, and the distance measurement instruction signal is a signal instructing the imaging apparatus 34 to start the distance measurement, that is, a signal instructing the imaging apparatus 34 to acquire the distance measurement result. The transmission unit 78D transmits the live view imaging instruction signal and the distance measurement instruction signal, which are generated by the signal generation unit 78C, to the information processing apparatus 30.

Figure 15:
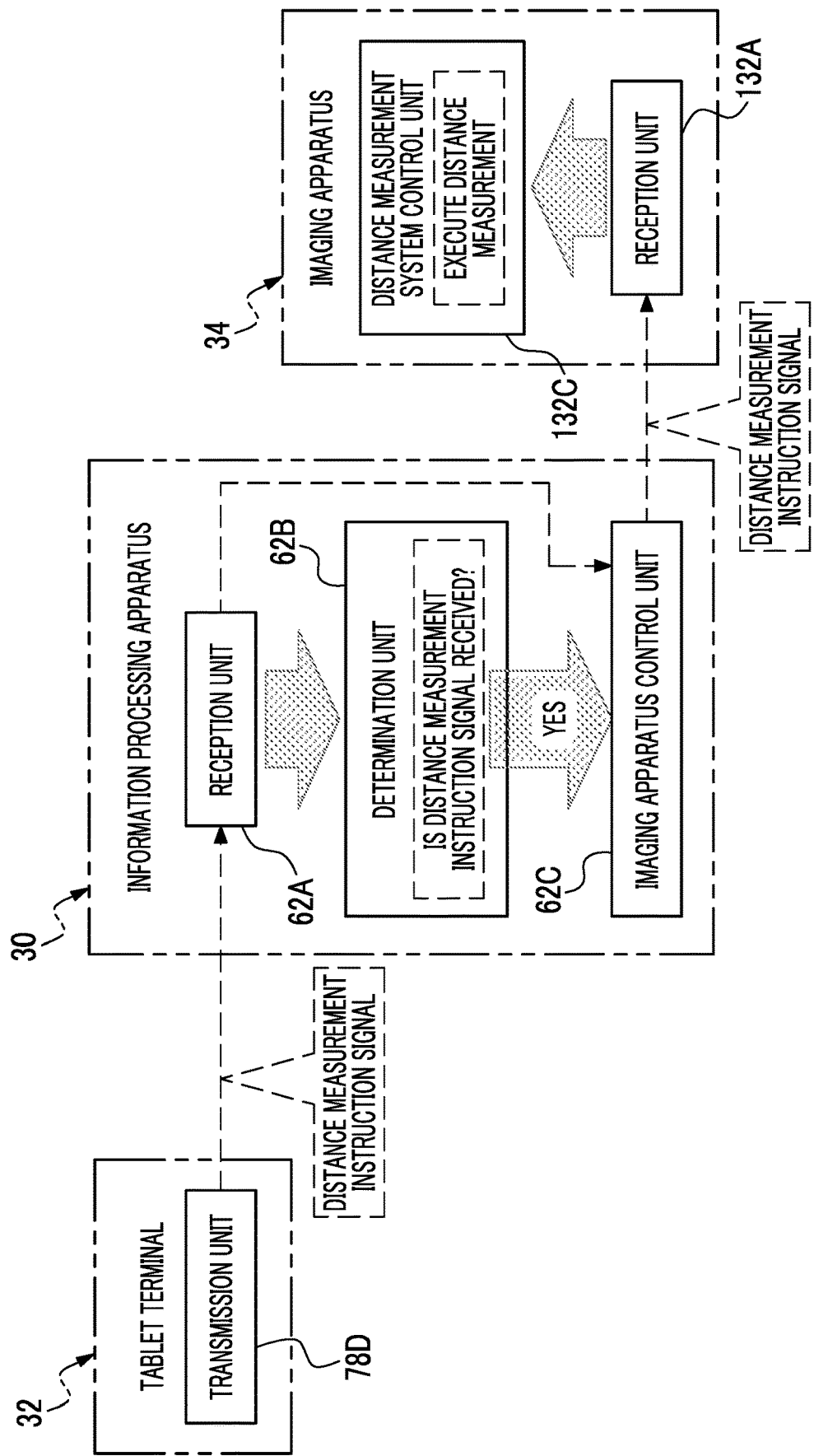
FIG. 15 is a conceptual diagram illustrating an example of a flow of a distance measurement instruction signal.

As an example, as illustrated in FIG. 15, in the information processing apparatus 30, the reception unit 62A receives the distance measurement instruction signal transmitted from the transmission unit 78D of the tablet terminal 32. The determination unit 62B determines whether or not the signal received by the reception unit 62A is the distance measurement instruction signal. In a case in which the determination unit 62B determines that the signal received by the reception unit 62A is the distance measurement instruction signal, the imaging apparatus control unit 62C transmits the distance measurement instruction signal received by the reception unit 62A to the imaging apparatus 34.

In the imaging apparatus 34, the reception unit 132A receives the distance measurement instruction signal which is transmitted by the imaging apparatus control unit 62C of the information processing apparatus 30. In a case in which the distance measurement instruction signal is received by the reception unit 132A, the distance measurement system control unit 132C causes the 3D sensor 38 (refer to FIG. 5) to execute the distance measurement.

Figure 16:
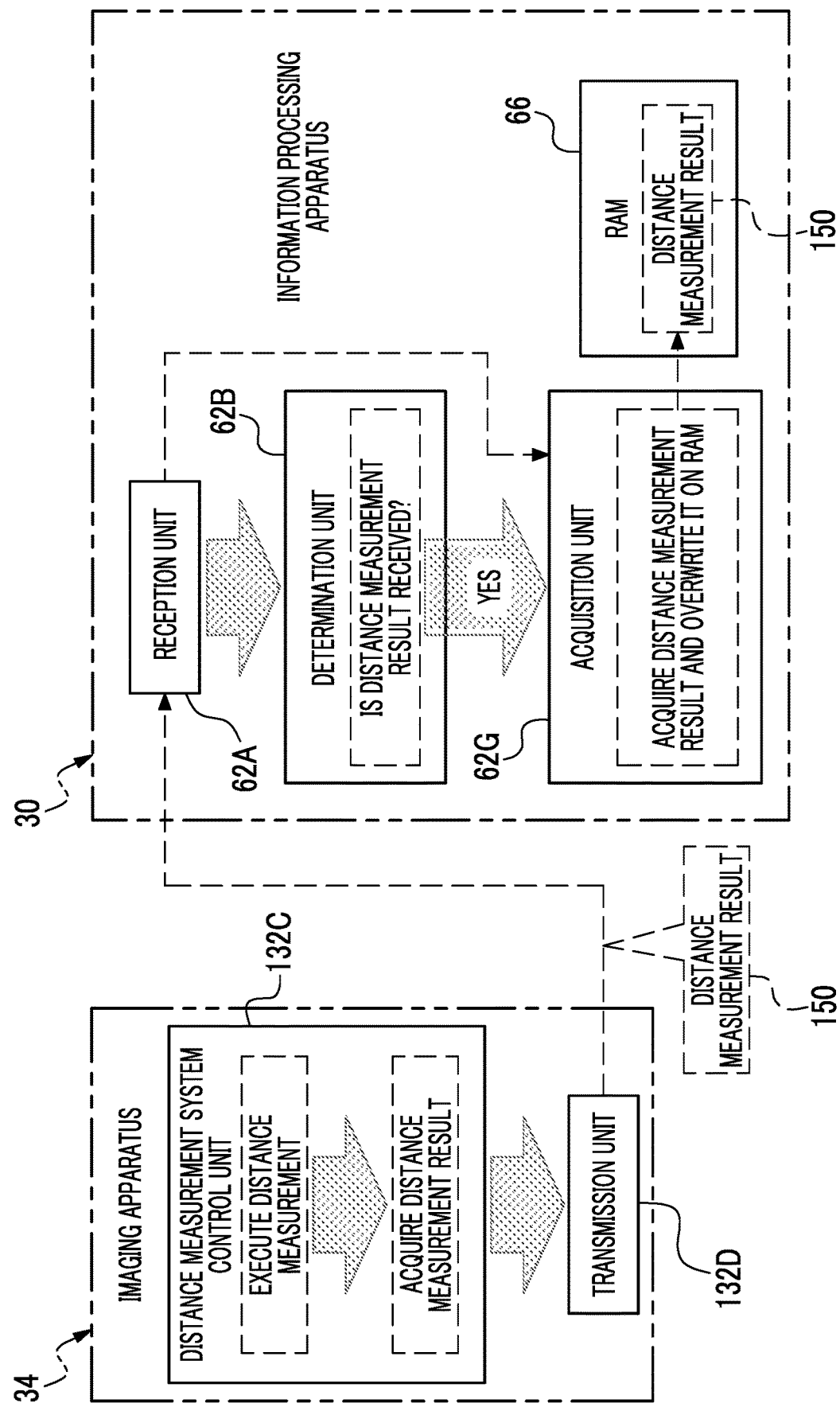
FIG. 16 is a conceptual diagram illustrating an example of a processing content using a distance measurement result.

As an example, as illustrated in FIG. 16, in the imaging apparatus 34, the distance measurement system control unit 132C causes the 3D sensor 38 to execute the distance measurement to generate a distance image 148 (refer to FIG. 5), and acquires the distance measurement result 150 including the distance image 148 from the 3D sensor 38. The transmission unit 132D transmits the distance measurement result 150 including the distance image 148 to the information processing apparatus 30.

In the information processing apparatus 30, the reception unit 62A receives the distance measurement result 150 which is transmitted from the transmission unit 132D of the imaging apparatus 34. The determination unit 62B determines whether or not the signal received by the reception unit 62A is the distance measurement result. In a case in which the determination unit 62B determines that the signal received by the reception unit 62A is the distance measurement result 150, the acquisition unit 62G acquires the distance measurement result 150 received by the reception unit 62A and overwrites and stores the acquired distance measurement result 150 in a distance measurement result storage region of the RAM 66.

Figure 17:
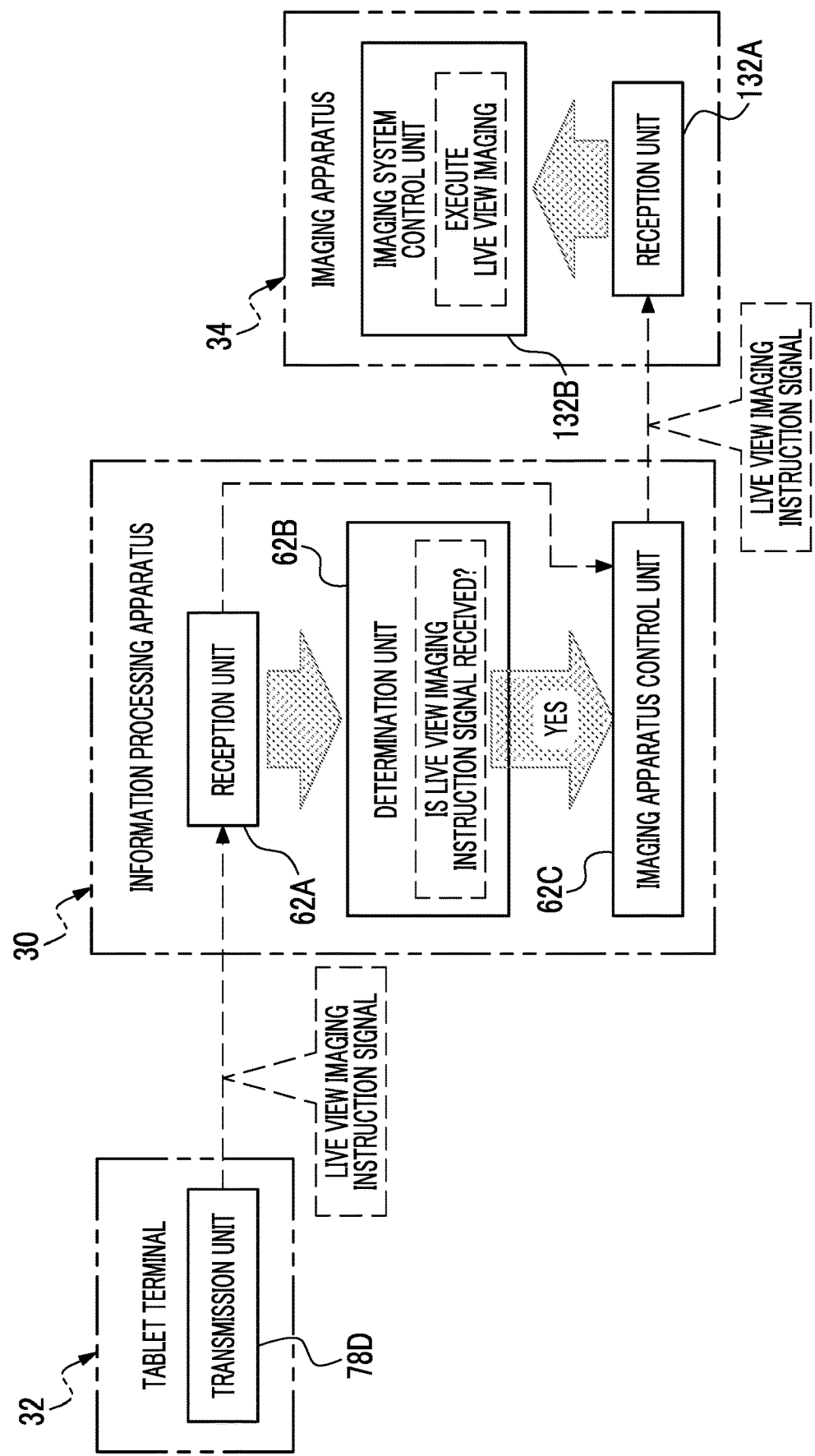
FIG. 17 is a conceptual diagram illustrating an example of a flow of a live view imaging instruction signal.

As an example, as illustrated in FIG. 17, in the information processing apparatus 30, the reception unit 62A receives the live view imaging instruction signal transmitted from the transmission unit 78D of the tablet terminal 32. The determination unit 62B determines whether or not the signal received by the reception unit 62A is the live view imaging instruction signal. In a case in which the determination unit 62B determines that the signal received by the reception unit 62A is the live view imaging instruction signal, the imaging apparatus control unit 62C transmits the live view imaging instruction signal received by the reception unit 62A to the imaging apparatus 34.

In the imaging apparatus 34, the reception unit 132A receives the live view imaging instruction signal transmitted by the imaging apparatus control unit 62C of the information processing apparatus 30. In a case in which the live view imaging instruction signal is received by the reception unit 132A, the imaging system control unit 132B executes the imaging for a live view image.

Figure 18:
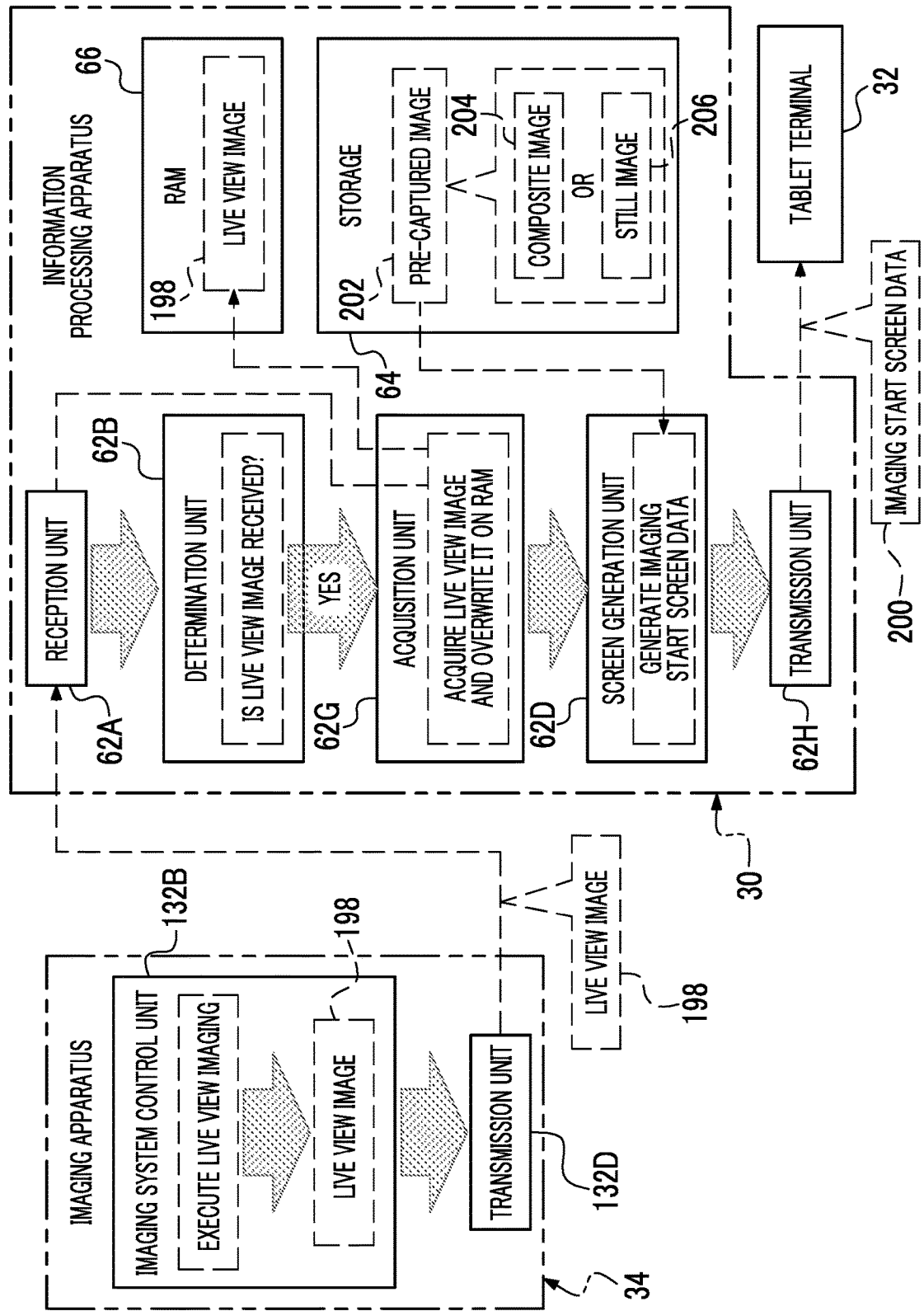
FIG. 18 is a conceptual diagram illustrating an example of a processing content related to a live view image and imaging start screen data.

As an example, as illustrated in FIG. 18, in the imaging apparatus 34, the imaging system control unit 132B acquires a live view image 198 as the captured image 127 (refer to FIG. 4) by executing the imaging for a live view image with the inspection object 16 (refer to FIG. 1) as a subject. The transmission unit 132D transmits the live view image 198 which is acquired by the imaging system control unit 132B to the information processing apparatus 30.

In the information processing apparatus 30, the reception unit 62A receives the live view image 198 which is transmitted from the transmission unit 132D of the imaging apparatus 34. The determination unit 62B determines whether or not the live view image 198 has been received by the reception unit 62A. In a case in which the determination unit 62B determines that the live view image 198 has been received by the reception unit 62A, the acquisition unit 62G acquires the live view image 198 which is received by the reception unit 62A and overwrites and stores the acquired live view image 198 in the live view image storage region of the RAM 66.

In the storage 64, a pre-captured image 202 is stored. The pre-captured image 202 is an image based on a still image 206 obtained by executing the main imaging by the imaging apparatus 34. For example, the pre-captured image 202 is a composite image 204 or the still image 206 for one frame. The still image 206 is an example of a "main-captured image" according to the technology of the present disclosure.

The composite image 204 is an image illustrating a scene wider than the imaging scene illustrated by the live view image 198. For example, in a case in which each of a plurality of still images 206 obtained by executing the main imaging by the imaging apparatus 34 is obtained by the main imaging of the imaging scene illustrated by the live view image 198, the composite image 204 is an image obtained by combining the plurality of still images 206 (that is, a panoramic image).

Here, for convenience of explanation, the explanation is made on the premise that the pre-captured image 202 is stored in the storage 64, there may be a case in which the pre-captured image 202 is not stored in the storage 64. In this case, the still image 206 for one frame, which is obtained by executing the main imaging by the imaging apparatus 34, is stored in the storage 64.

The screen generation unit 62D generates imaging start screen data 200 based on the live view image 198 acquired by the acquisition unit 62G and the pre-captured image 202 stored in the storage 64. The imaging start screen data 200 is screen data for displaying the imaging start screen 180 (refer to FIG. 12, FIGS. 19 and 20) on the touch panel display 72 (for example, screen data indicating the imaging start screen 180 (refer to FIG. 12, FIGS. 19 and 20)). The transmission unit 62H transmits the imaging start screen data 200, which is generated by the screen generation unit 62D, to the tablet terminal 32.

Here, the imaging start screen data 200 is an example of "screen data" according to the technology of the present disclosure. In addition, the transmission of the imaging start screen data 200 by the transmission unit 62H is an example of "output" of the "screen data" according to the technology of the present disclosure. In addition, the touch panel display 72 is an example of a "first display" and a "second display" according to the technology of the present disclosure.

Figure 19:
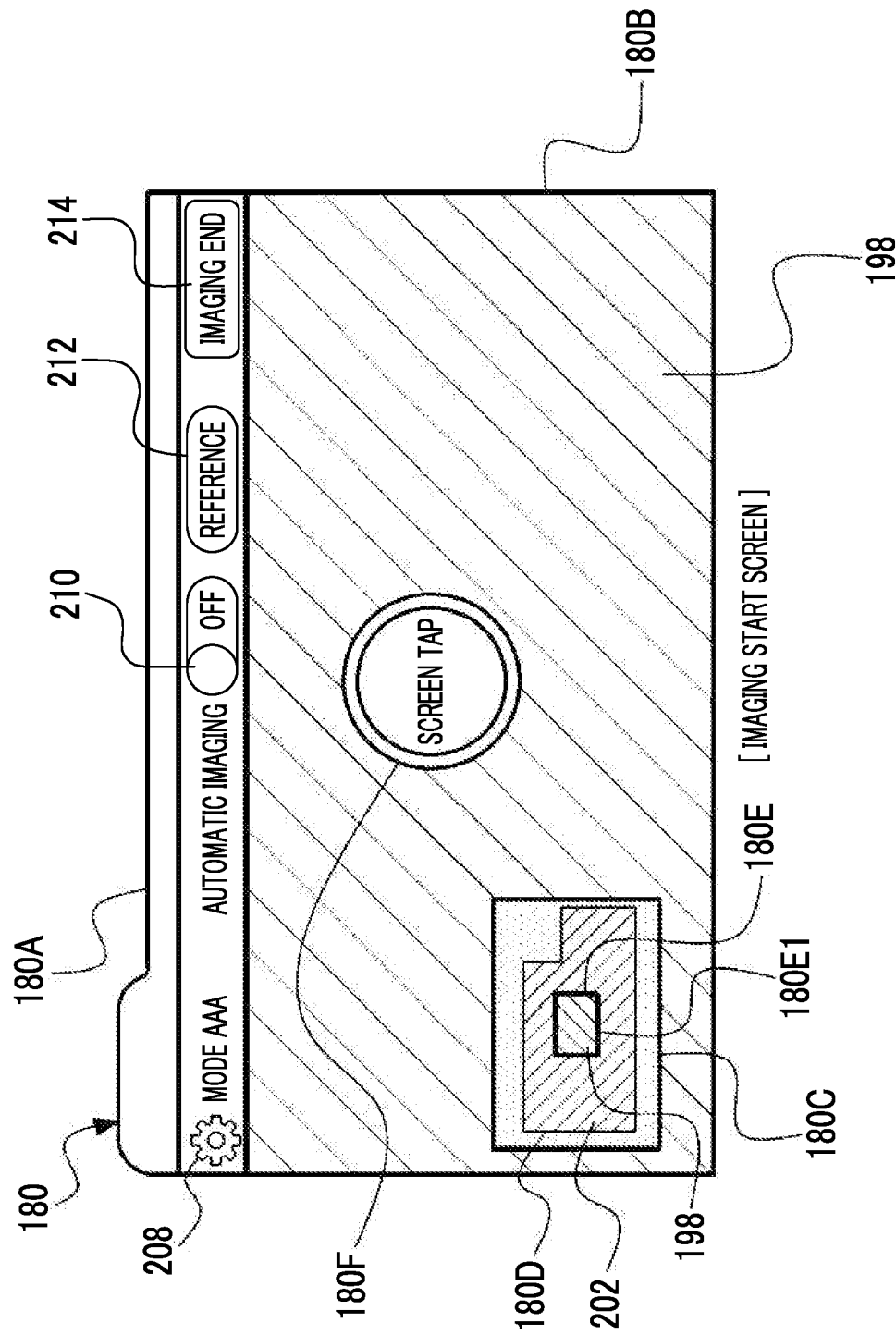
FIG. 19 is a schematic screen diagram illustrating an example of an imaging start screen.
Figure 20:
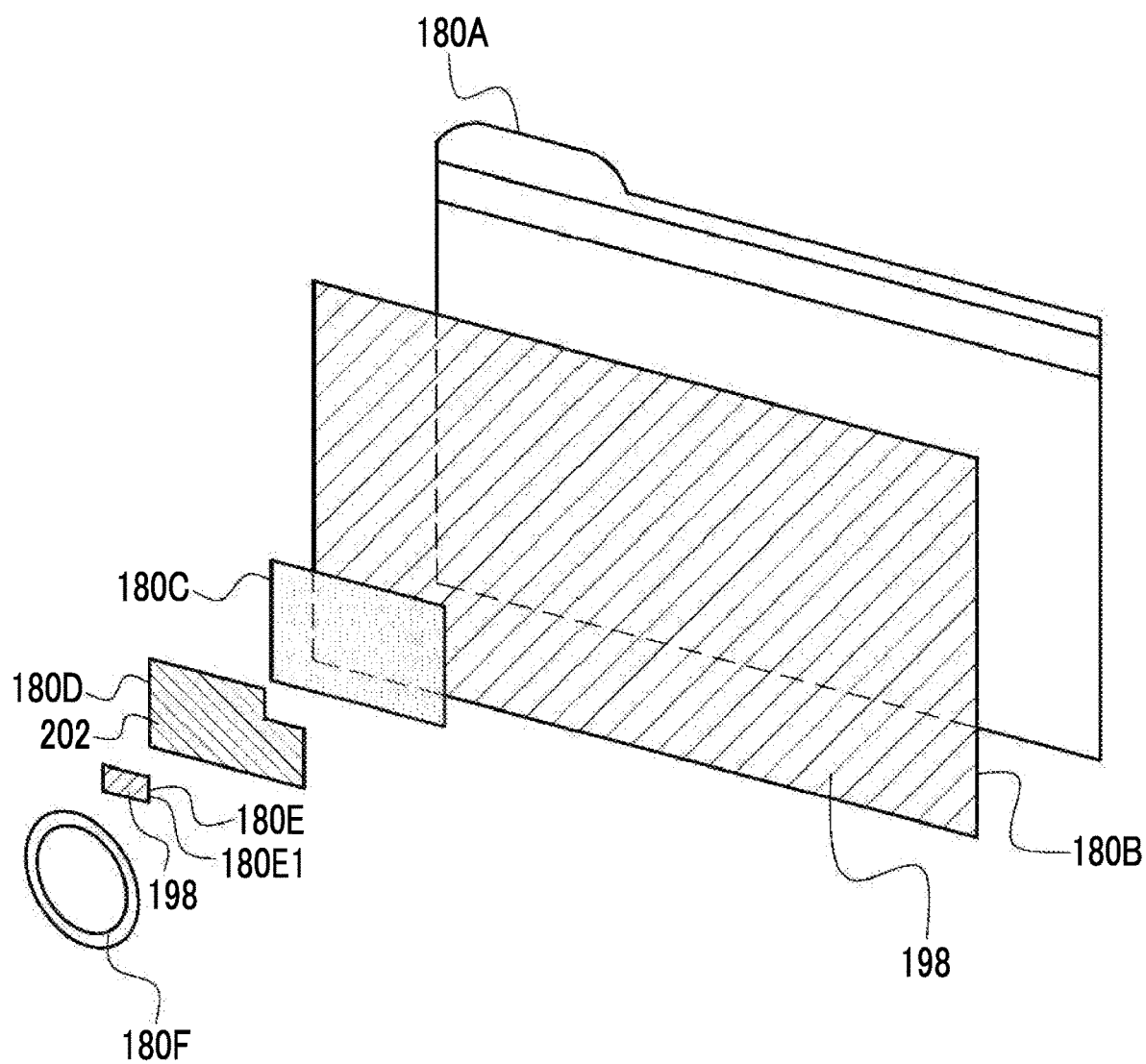
FIG. 20 is a schematic perspective diagram illustrating an example of a structure of the imaging start screen.

As an example, as illustrated in FIGS. 19 and 20, the imaging start screen 180 includes a screen frame 180A, a live view region 180B, a guide view region 180C, a wide view region 180D, a guide region 180E, and an instruction reception region 180F.

The screen frame 180A is a screen frame of common specifications among the imaging start screen 180, the imaging condition adjustment screen 182, the composition confirmation screen 184, and the imaging permission screen 186. On an upper end portion of the screen frame 180A, setting button 208, an imaging mode change button 210, a reference button 212, and an imaging end key 214 are displayed.

The setting button 208 is a button that receives an instruction to switch the screen currently displayed on the touch panel display 72 to the setting screen 188 (refer to FIG. 12). In a case in which the setting button 208 is turned on, the screen currently displayed on the touch panel display 72 (the imaging start screen 180 in the example illustrated in FIG. 19) is switched to the setting screen 188. The imaging mode change button 210 is a slide-type soft key, and is used to switch between on and off modes by sliding the imaging mode change button 210. In a case in which the imaging mode change button 210 is turned on, the AF mode is set as the imaging mode of the imaging apparatus 34, and in a case where the imaging mode change button 210 is turned off, the MF mode is set as the imaging mode of the imaging apparatus 34. The reference button 212 is a button that receives an instruction to display information (hereinafter, referred to as "reference information") which is predetermined as information to be referred to by the user 36. In a case in which the reference button 212 is turned on, reference information is displayed on the touch panel display 72. The imaging end key 214 is a soft key that receives an instruction to end the imaging for a live view image. In a case in which the imaging end key 214 is turned on, the imaging for a live view image by the imaging apparatus 34 is stopped.

The live view region 180B is superimposed on a region of the screen frame 180A other than the upper end portion. In the live view region 180B, the live view image 198 is displayed. The instruction reception region 180F is superimposed on the central portion of the live view region 180B. The instruction reception region 180F is a circular region. Any mark may be used as long as it is a mark that can visually identify the instruction reception region 180F. Here, the instruction reception region 180F in a circular region is exemplified, but this is merely an example, and the shape of the instruction reception region 180F may be a shape other than a circle (for example, a diamond shape or a triangle shape). The instruction reception region 180F has a function as a soft key, and receives an instruction to start imaging for a panoramic image used in the choke detection processing and/or the damage detection processing (hereinafter, also referred to as "imaging start instruction for a panoramic image"). The reception of the imaging start instruction for a panoramic image by the instruction reception region 180F is implemented by tapping the instruction reception region 180F.

The guide view region 180C is superimposed on a front view lower left portion of the live view region 180B. The guide view region 180C includes the wide view region 180D and the guide region 180E. The wide view region 180D is superimposed on the guide view region 180C within a range inside the outer frame of the guide view region 180C. In the wide view region 180D, the pre-captured image 202 (composite image 204 in the example illustrated in FIG. 19) is displayed. The guide region 180E is a region that has a smaller display area than the wide view region 180D and is movable within the range inside the outer frame of the guide view region 180C. In the guide view region 180C, the guide region 180E is superimposed on the guide view region 180C, and in the wide view region 180D, it is superimposed on the wide view region 180D.

The movement of the guide region 180E within the guide view region 180C is implemented, for example, by swiping or flicking by the user on the touch panel display 72. In the guide region 180E, the live view image 198 is displayed. The guide region 180E is in a similar relationship with the live view region 180B. In the guide region 180E, the entire live view image 198 displayed in the live view region 180B is displayed in a reduced state.

In the guide region 180E, an outer edge 180E1 of the guide region 180E is highlighted so that an image region corresponding to the live view image 198 displayed in the live view region 180B can be specified within the wide view region 180D. That is, the outer edge 180E1 is highlighted so that a boundary between the guide region 180E and the other region is visually distinguishable. The outer edge 180E1 is an example of "guide information" according to the technology of the present disclosure.

Figure 21:
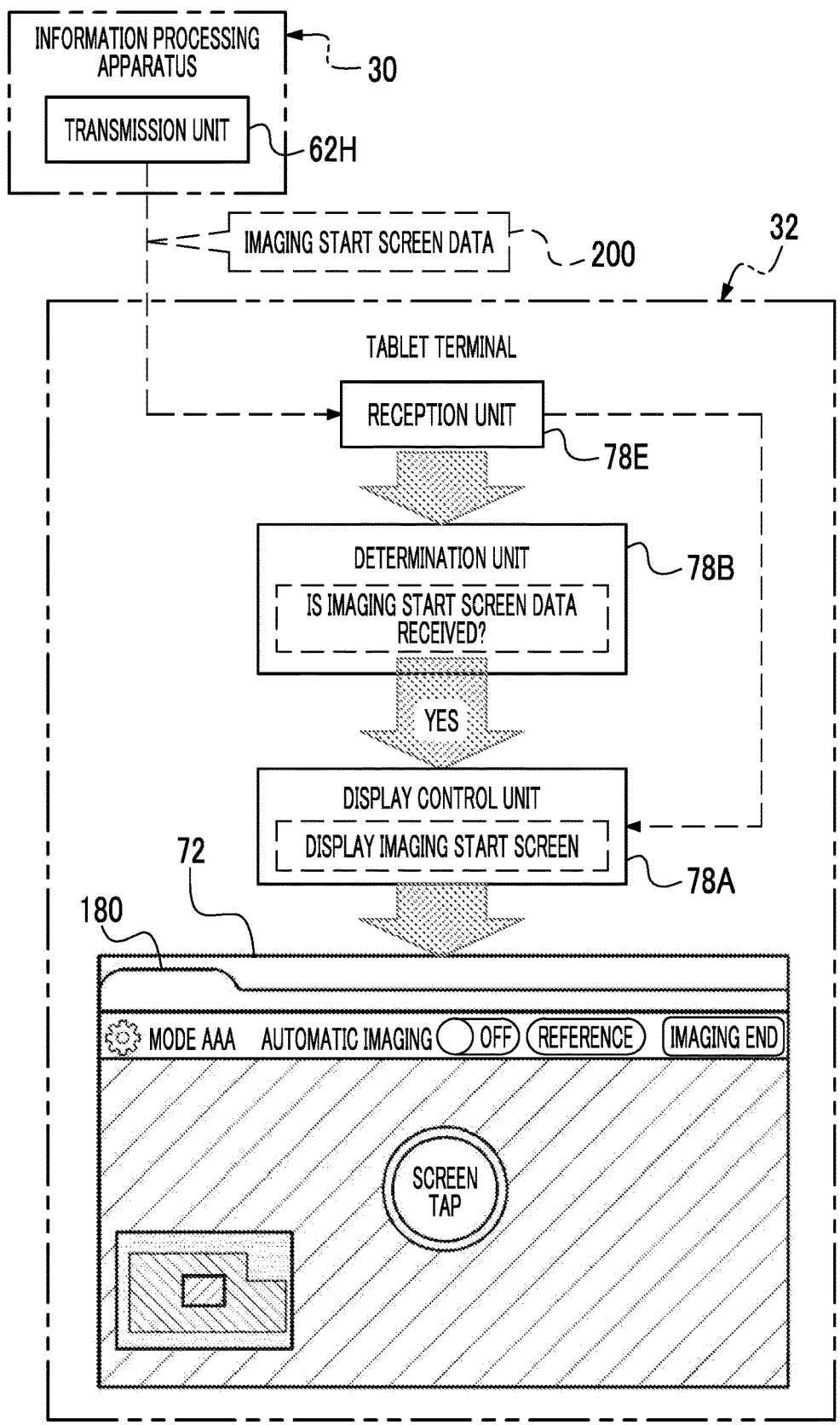
FIG. 21 is a conceptual diagram illustrating an example of a processing content related to the imaging start screen data.

As an example, as illustrated in FIG. 21, in the tablet terminal 32, the reception unit 78E receives the imaging start screen data 200 transmitted from the transmission unit 62H of the information processing apparatus 30. The determination unit 78B determines whether or not the imaging start screen data 200 has been received by the reception unit 78E. In a case in which the imaging start screen data 200 is received by the reception unit 78E, the display control unit 78A displays the imaging start screen 180 indicated by the imaging start screen data 200 received by the reception unit 78E on the touch panel display 72.

Figure 22:
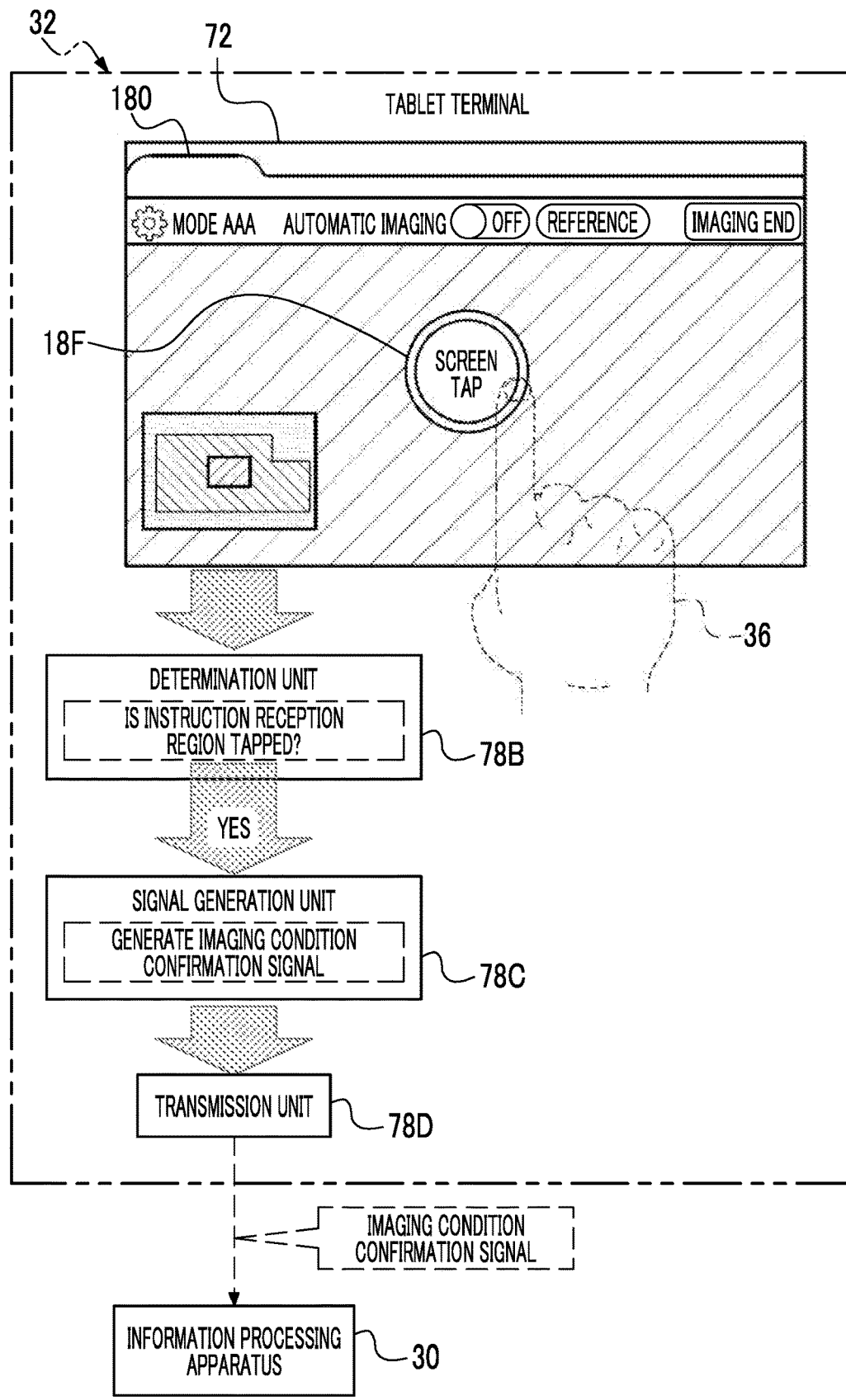
FIG. 22 is a conceptual diagram illustrating an example of a processing content in a case in which an instruction reception region included in the imaging start screen is tapped.

As an example, as illustrated in FIG. 22, in the tablet terminal 32, the determination unit 78B determines whether or not the instruction reception region 180F within the imaging start screen 180 displayed on the touch panel display 72 is tapped by the user 36. In a case in which the determination unit 78B determines that the instruction reception region 180F has been tapped by the user 36, the signal generation unit 78C generates an imaging condition confirmation signal. The imaging condition confirmation signal is a signal instructing the information processing apparatus 30 to confirm the imaging condition for generating the composite image 204. The transmission unit 78D transmits the imaging condition confirmation signal, which is generated by the signal generation unit 78C, to the information processing apparatus 30.

Figure 23:
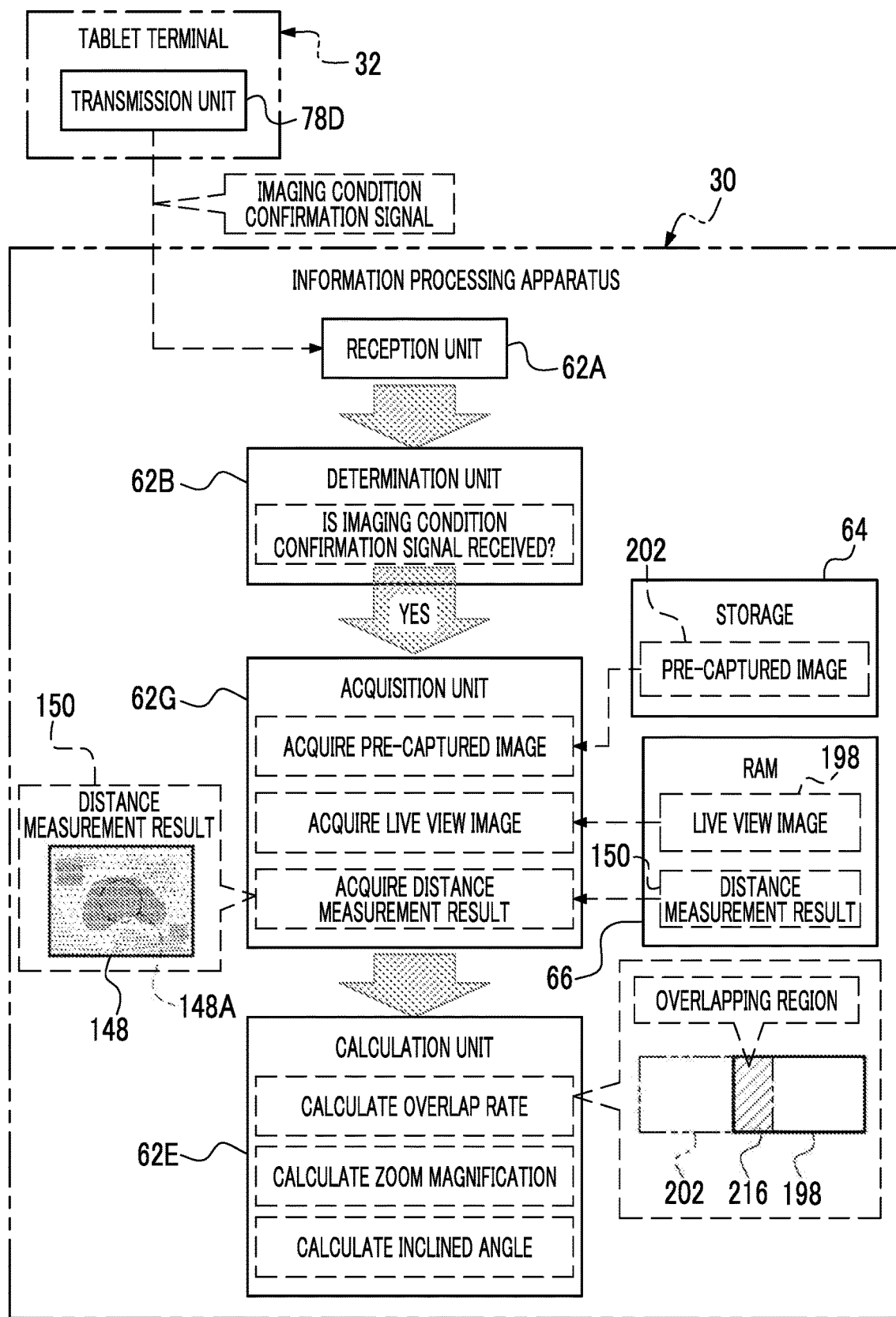
FIG. 23 is a conceptual diagram illustrating an example of a processing content related to an imaging condition confirmation signal.

As an example, as illustrated in FIG. 23, in the information processing apparatus 30, the reception unit 62A receives the imaging condition confirmation signal transmitted from the transmission unit 78D of the tablet terminal 32. The determination unit 62B determines whether or not the signal received by the reception unit 62A is the imaging condition confirmation signal. In a case in which the determination unit 62B determines that the signal received by the reception unit 62A is the imaging condition confirmation signal, the acquisition unit 62G acquires the pre-captured image 202 from the storage 64 and acquires the live view image 198 and the distance measurement result 150 from the RAM 66. The calculation unit 62E calculates an overlap ratio, a zoom magnification, and an inclined angle. The overlap ratio refers to a ratio of an area of an overlap region 216 to an area of the live view image 198.

The overlap region 216 refers to a region where the live view image 198 and the pre-captured image 202 overlap each other. Here, although an example in which the live view image 198 and the pre-captured image 202 overlap each other is explained, the still image 206 obtained by executing the main imaging by the imaging apparatus 34 and the pre-captured image 202 may overlap each other.

The zoom magnification refers to an optical zoom magnification required to match the size of the live view image 198 with the size of the still image 206 (refer to FIG. 18) for one frame constituting the pre-captured image 202.

The inclined angle refers to an angle formed by an imaging target surface included in the inspection object 16 (refer to FIG. 1) and the light-receiving surface 96A (refer to FIG. 4). The angle formed by the imaging target surface and the light-receiving surface 96A is, for example, an angle formed by a normal vector of the imaging target surface and a normal vector of the light-receiving surface 96A. The imaging target surface refers to, for example, a plane included in a central portion (for example, a central portion occupying several tens of percent of the imaging range) of the imaging range with respect to the inspection object 16. The imaging target surface is specified, for example, from a region 148A corresponding to the central portion of the imaging range with respect to the inspection object 16 in the distance image 148 included in the distance measurement result 150. For example, the widest plane included as an image in the region 148A is the imaging target surface. Here, the imaging target surface is an example of a "first imaging target surface" and a "second imaging target surface" according to the technology of the present disclosure. The light-receiving surface 96A is an example of a "predetermined surface included in the imaging apparatus" and a "surface corresponding to an imaging surface of the image sensor" according to the technology of the present disclosure.

Figure 24:
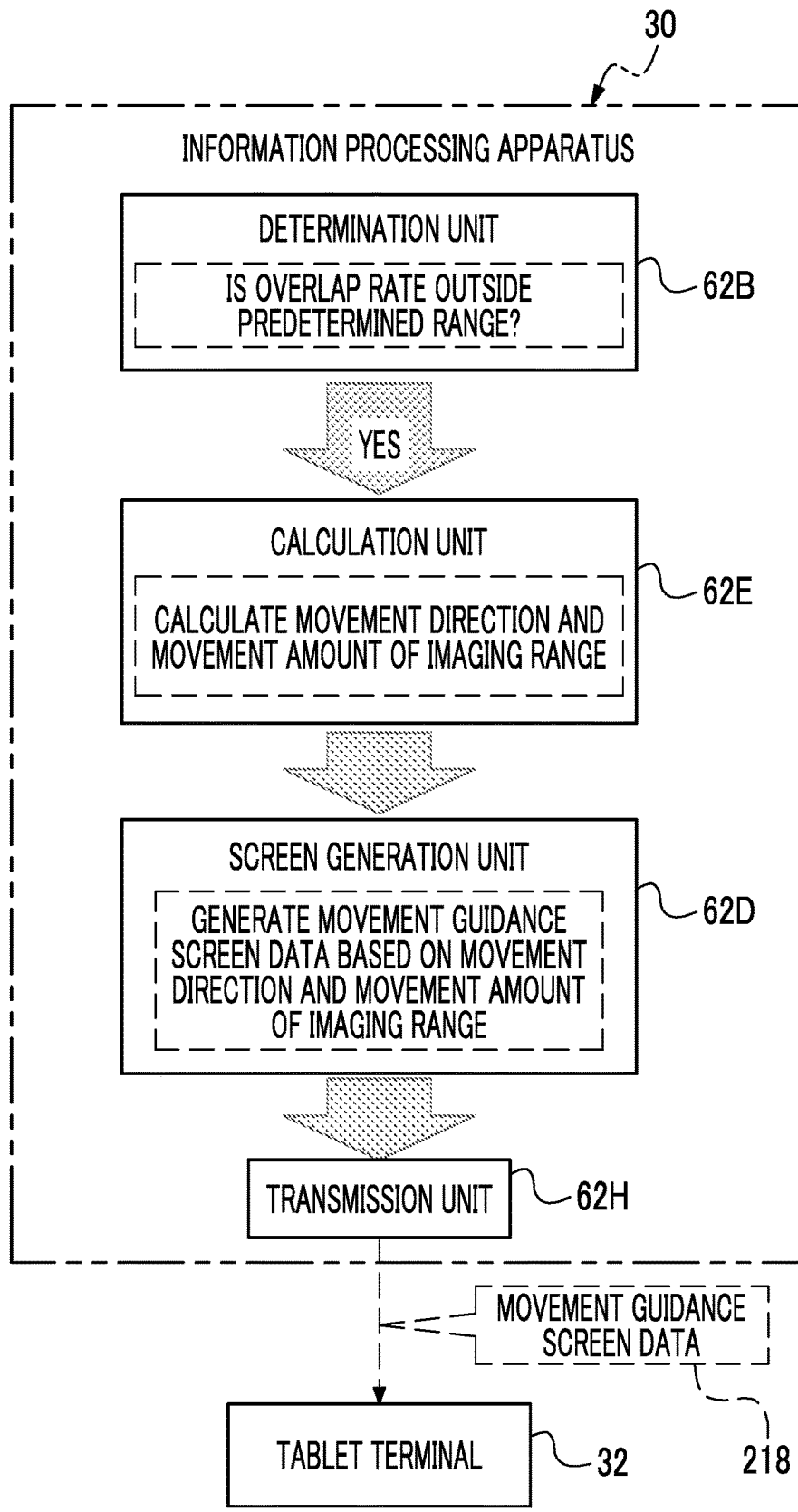
FIG. 24 is a conceptual diagram illustrating an example of a processing content related to movement guidance screen data.

As an example, as illustrated in FIG. 24, in the information processing apparatus 30, the determination unit 62B determines whether or not the overlap ratio calculated by the calculation unit 62E illustrated in FIG. 23 is outside a predetermined range. The predetermined range refers to, for example, a range within 30%±several % (that is, a tolerance). In a case in which the determination unit 62B determines that the overlap ratio is outside the predetermined range, the calculation unit 62E calculates that, as the movement direction and the movement amount of the imaging range, the movement direction and the movement amount necessary for the overlap ratio to be within the predetermined range.

The screen generation unit 62D generates movement guidance screen data 218 based on the movement direction and the movement amount calculated by the calculation unit 62E. The movement guidance screen data 218 is screen data (for example, screen data indicating the movement guidance screen 190) for displaying the movement guidance screen 190 (refer to FIGS. 12 and 25) on the touch panel display 72. The transmission unit 62H transmits the movement guidance screen data 218, which is generated by the screen generation unit 62D, to the tablet terminal 32.

Figure 25:
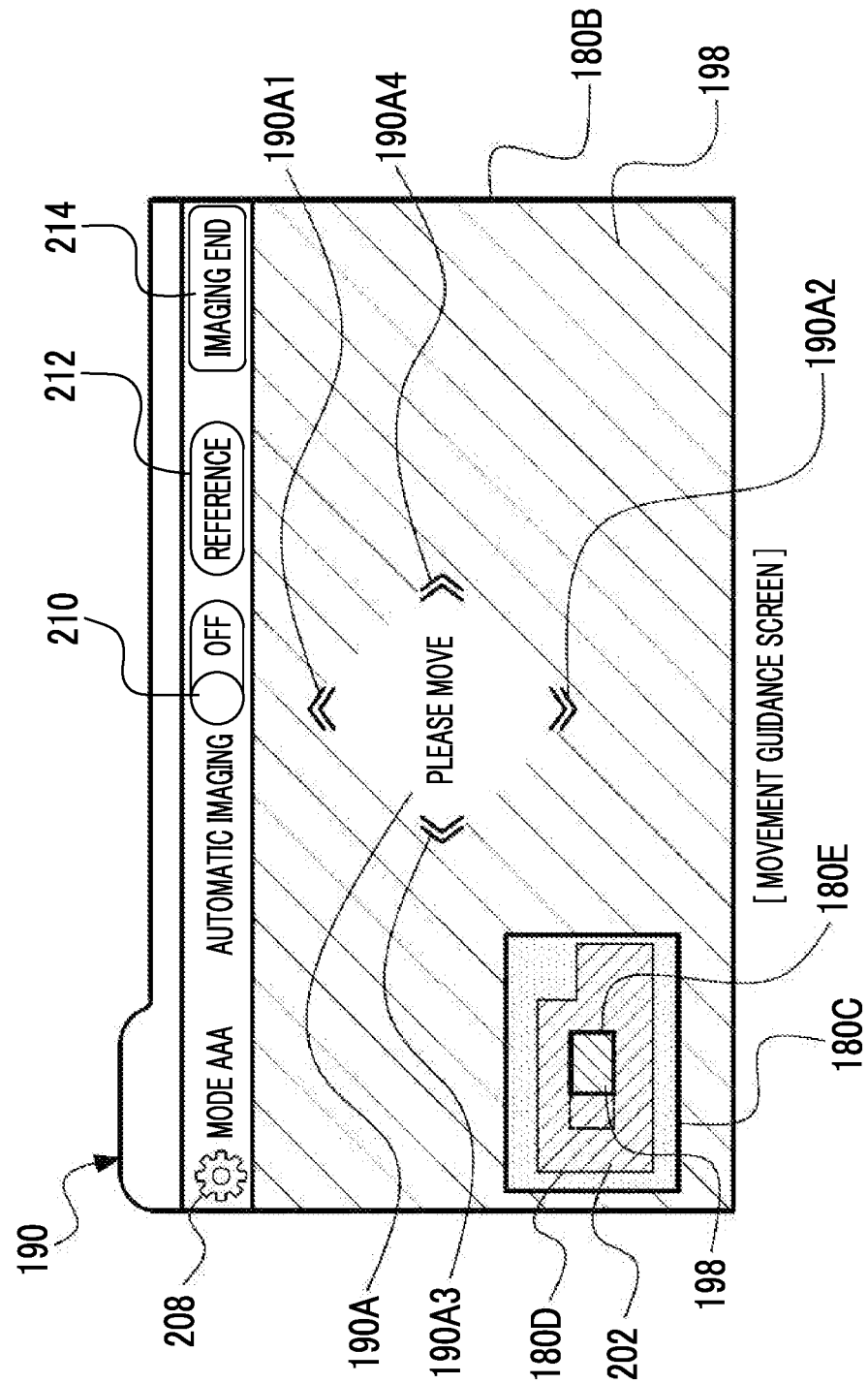
FIG. 25 is a schematic screen diagram illustrating an example of a movement guidance screen.

As an example, as illustrated in FIG. 25, the movement guidance screen 190 indicated by the movement guidance screen data 218 is different from the imaging start screen 180

(refer to FIG. 19) in that the instruction reception region 190A is applied instead of the instruction reception region 180F.

The instruction reception region 190A is a rhombus-shaped region, in which wedge-shaped marks 190A1 to 190A4 indicating each of the four directions of up, down, left, and right are assigned to the four corners of the rhombus. In addition, a message that urges the user 36 to move the imaging range is displayed in the instruction reception region 190A. In the example illustrated in FIG. 25, the message "Please move" is illustrated. In a case of moving the imaging range in an upward direction, the mark 190A1 is tapped, in a case of moving the imaging range in a downward direction, the mark 190A2 is tapped, in a case of moving the imaging range in a leftward direction, the mark 190A3 is tapped, and in a case of moving the imaging range in a rightward direction, the mark 190A4 is tapped. A unit movement amount (for example, a movement amount for one tap) is, for example, 0.01 mm. In addition, the movement amount of the imaging range is determined, for example, according to the number of times of taps or the duration of a long press on the marks 190A1 to 190A4. The unit movement amount may be a fixed value or a variable value that is changed according to a given instruction and/or various conditions.

Figure 26:
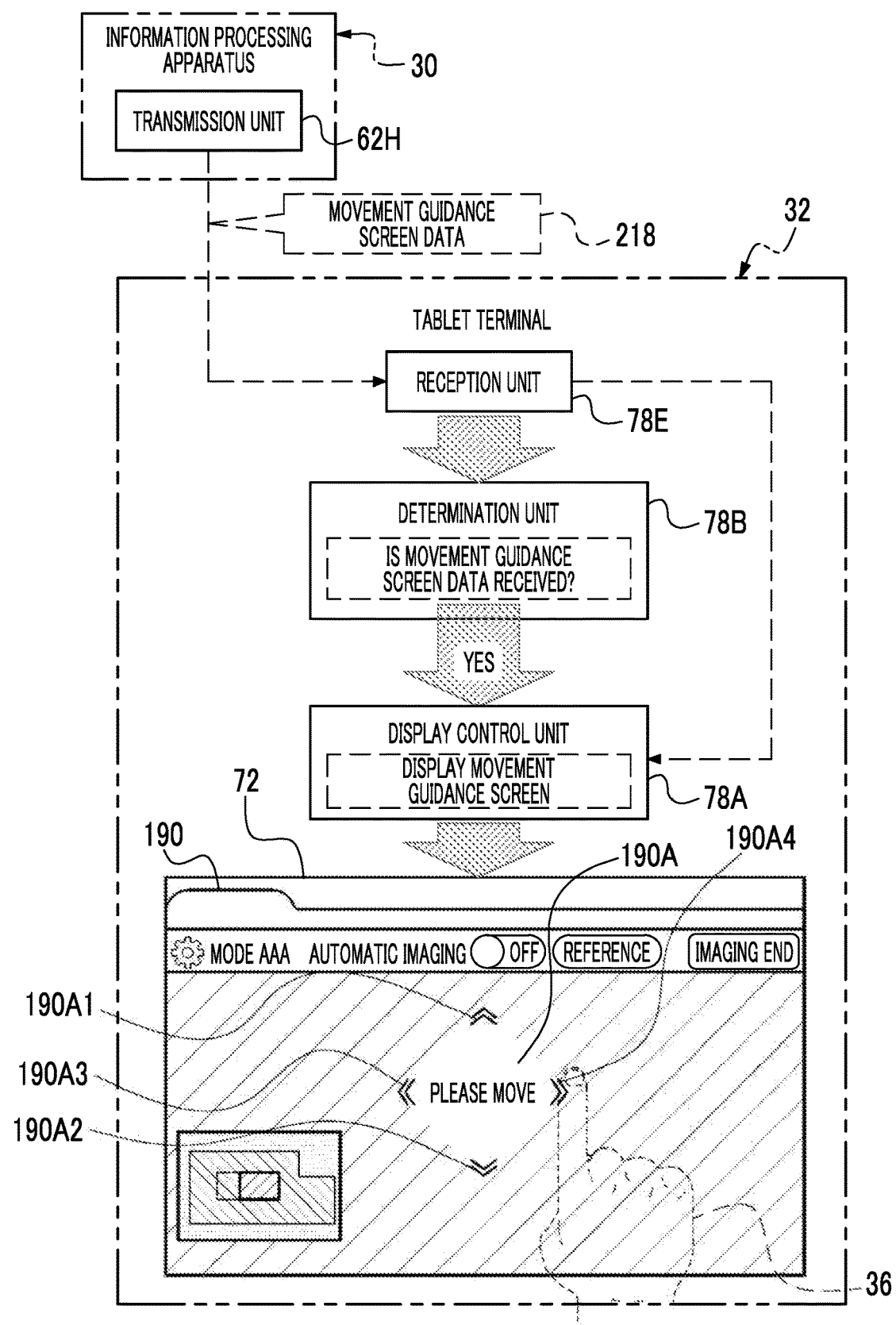
FIG. 26 is a conceptual diagram illustrating an example of an aspect in which an instruction is given to an instruction reception region included in the movement guidance screen.

As an example, as illustrated in FIG. 26, in the tablet terminal 32, the reception unit 78E receives the movement guidance screen data 218 transmitted from the transmission unit 62H of the information processing apparatus 30. The determination unit 78B determines whether or not the movement guidance screen data 218 has been received by the reception unit 78E. In a case in which the determination unit 78B determines that the movement guidance screen data 218 has been received by the reception unit 78E, the display control unit 78A displays the movement guidance screen 190 indicated by the movement guidance screen data 218 received by the reception unit 78E on the touch panel display 72. In the example illustrated in FIG. 26, an aspect in which the mark 190A4 within the movement guidance screen 190 is tapped by the user 36 is illustrated. In this case, the imaging range moves by the movement amount according to the number of times it is tapped in the leftward direction. In a case in which the position of the imaging range reaches a predetermined position (for example, a position where the overlap ratio falls within the predetermined range), the display control unit 78A may delete the message within the instruction reception region 190A.

Figure 27:
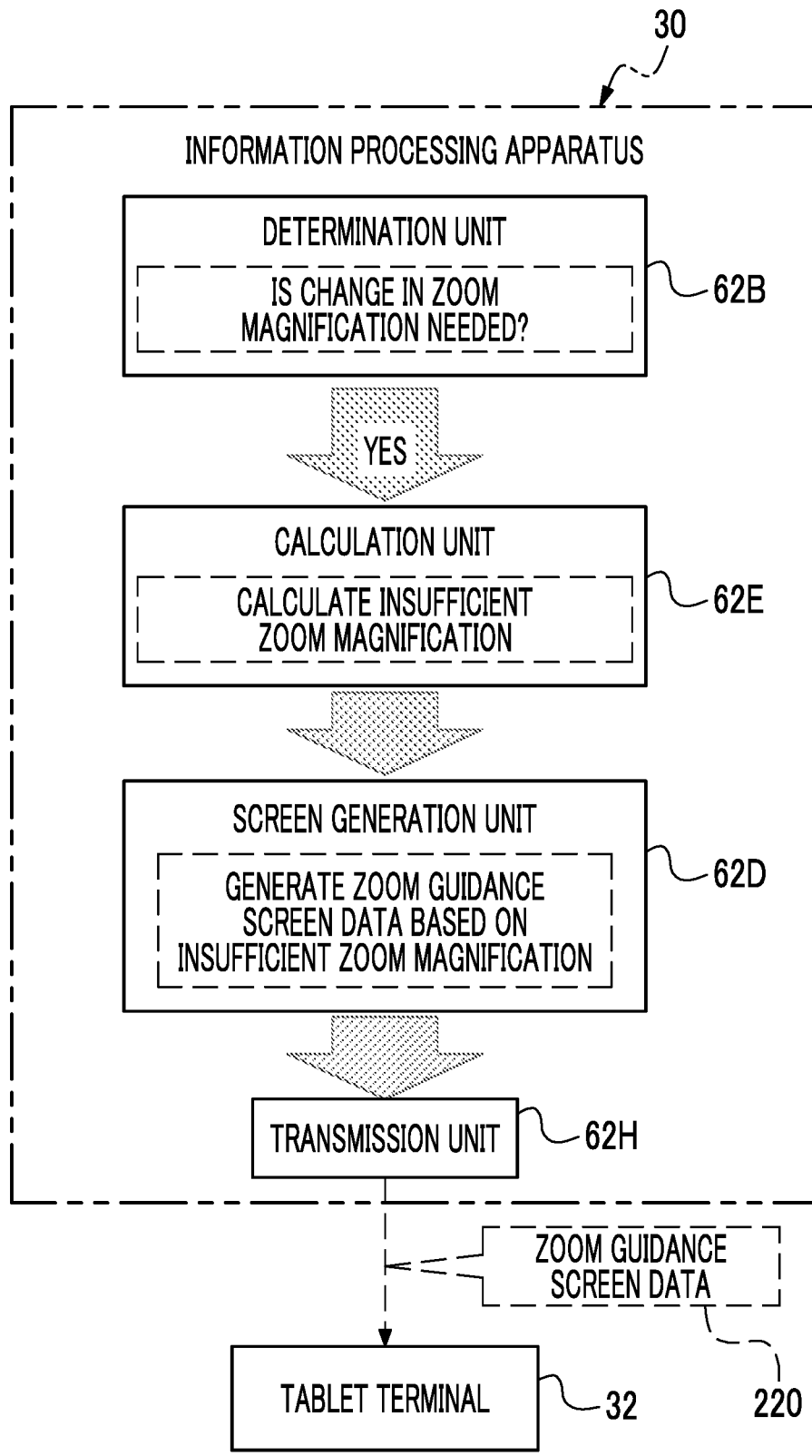
FIG. 27 is a conceptual diagram illustrating an example of a processing content related to zoom guidance screen data.

As an example, as illustrated in FIG. 27, in the information processing apparatus 30, the determination unit 62B determines whether or not the zoom magnification calculated by the calculation unit 62E illustrated in FIG. 23 needs to be changed. For example, in a case in which the zoom magnification is a value other than "1", it is determined that the zoom magnification needs to be changed. In a case in which the determination unit 62B determines that the zoom magnification needs to be changed, the calculation unit 62E calculates an insufficient zoom magnification. The insufficient zoom magnification refers to a zoom magnification that is insufficient to make the zoom magnification "1".

The screen generation unit 62D generates zoom guidance screen data 220 based on the insufficient zoom magnification calculated by the calculation unit 62E. The zoom guidance screen data 220 is screen data for displaying the telescopic zoom guidance screen 192 (refer to FIGS. 12 and 28) or the wide angle zoom guidance screen 194 (refer to FIGS. 12 and 29) on the touch panel display 72 (for example, screen data indicating the telescopic zoom guidance screen 192 or the wide angle zoom guidance screen 194). The transmission unit 62H transmits the zoom guidance screen data 220, which is generated by the screen generation unit 62D, to the tablet terminal 32. In the following, for convenience of explanation, in a case in which it is not necessary to explain the telescopic zoom guidance screen 192 and the wide angle zoom guidance screen 194 distinctively, they are referred to as the "zoom guidance screen" without a reference numeral.

Figure 28:
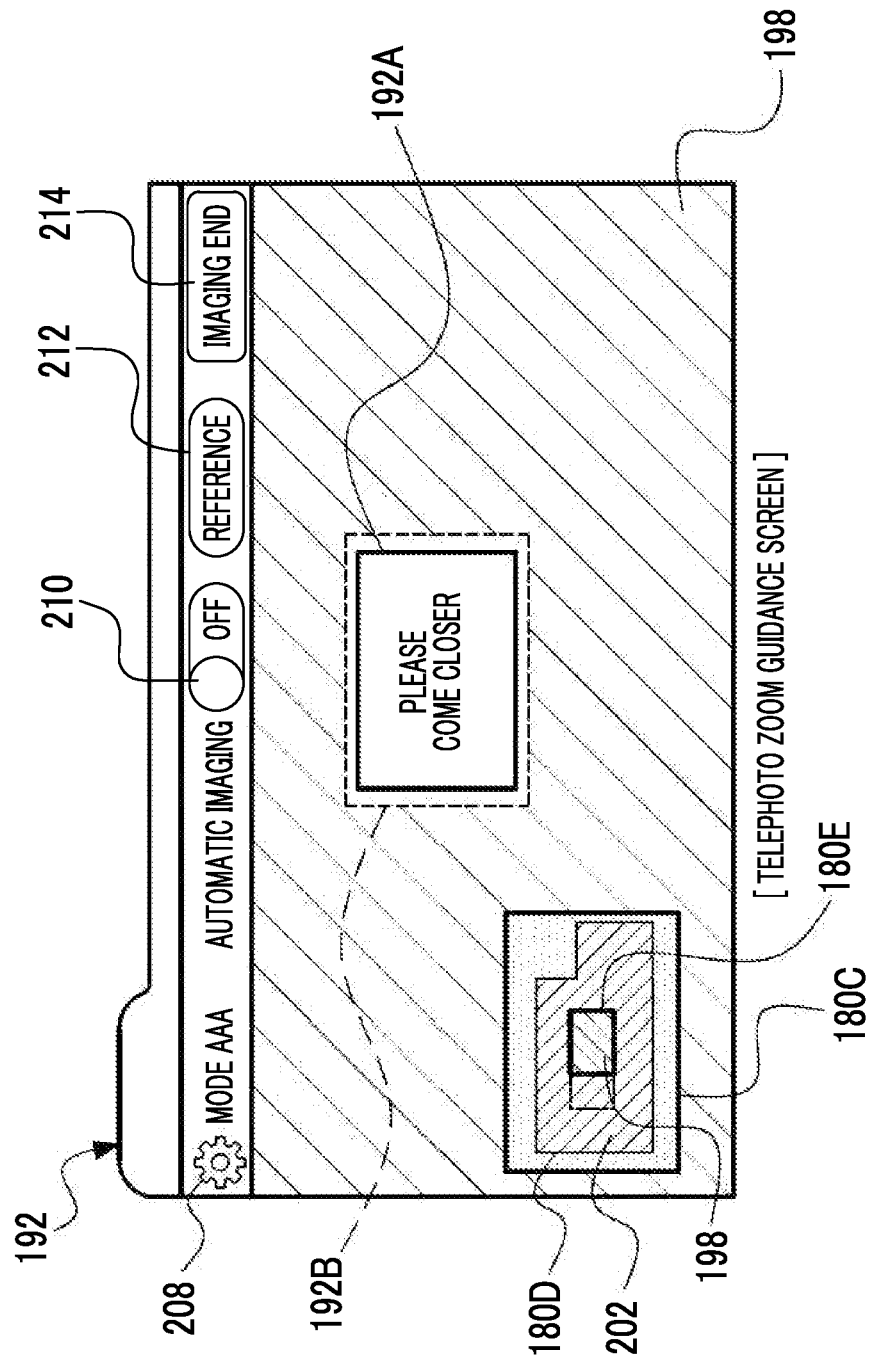
FIG. 28 is a schematic screen diagram illustrating an example of a telescopic zoom guidance screen.

As an example, as illustrated in FIG. 28, the telescopic zoom guidance screen 192 is different from the movement guidance screen 190 in that the instruction reception region 192A is applied instead of the instruction reception region 190A and that a reference frame 192B is provided.

The instruction reception region 192A is a region that is in a similar relationship with the imaging range and has a quadrangular outer frame. In the instruction reception region 192A, a message that urges the user 36 to operate the telescopic zoom is displayed. In the example illustrated in FIG. 28, the message "Please come closer" is displayed. In addition, in the telescopic zoom guidance screen 192, the reference frame 192B is assigned to the instruction reception region 192A. The reference frame 192B is a frame that is in a similar relationship with the instruction reception region 192A and is larger than the instruction reception region 192A. The reference frame 192B is a frame of a size corresponding to the imaging range obtained by compensating for the insufficient zoom magnification.

Figure 29:
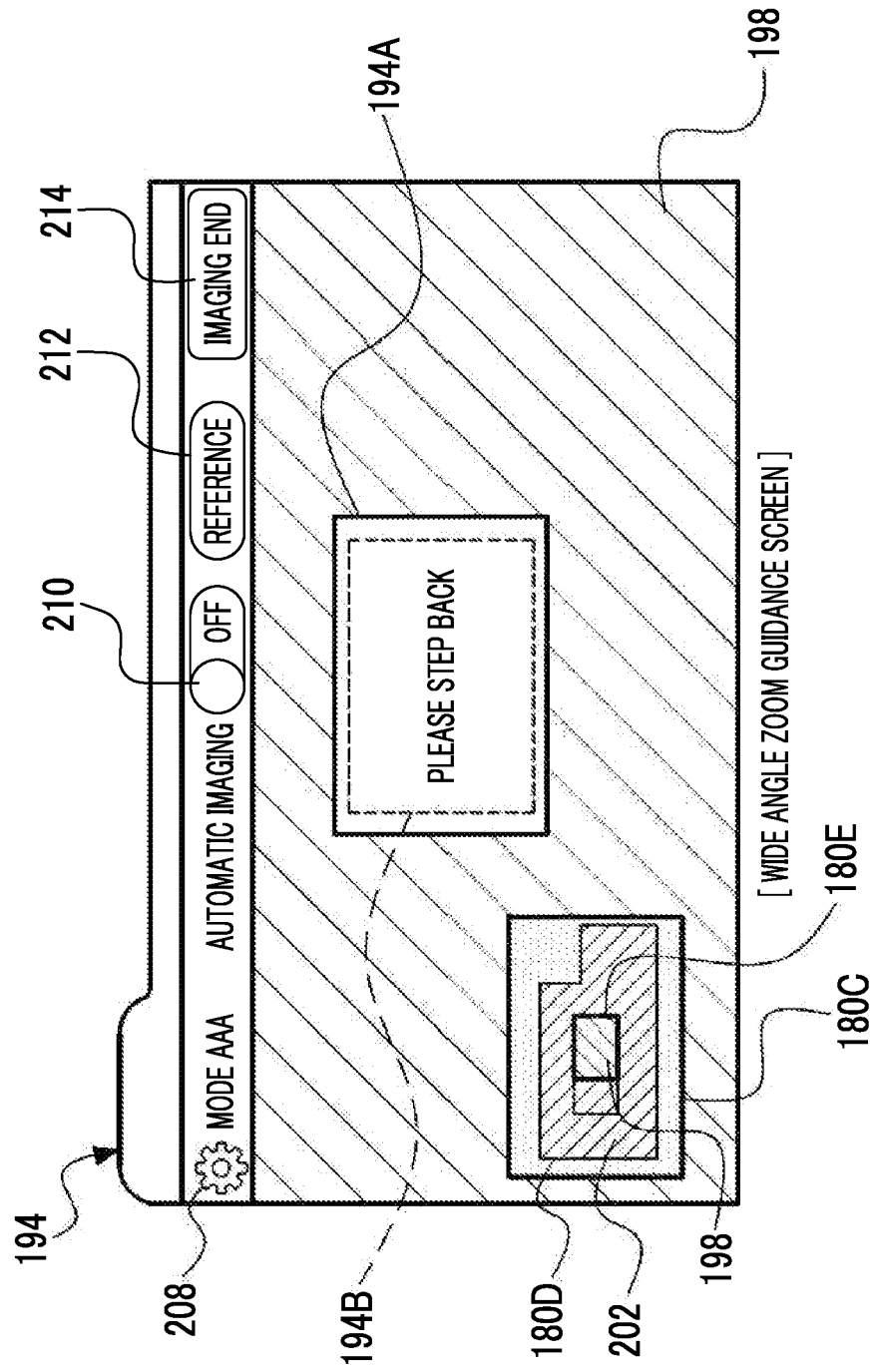
FIG. 29 is a schematic screen diagram illustrating an example of a wide angle zoom guidance screen.

As an example, as illustrated in FIG. 29, the wide angle zoom guidance screen 194 is different from the telescopic zoom guidance screen 192 in that the instruction reception region 194A is applied instead of the instruction reception region 192A and that a reference frame 194B is applied instead of the reference frame 192B.

The instruction reception region 194A is a region that is in a similar relationship with the imaging range and has a quadrangular outer frame. In the instruction reception region 194A, a message that urges the user 36 to operate the wide angle zoom is displayed. In the example illustrated in FIG. 29, the message "Please step back" is displayed. In addition, in the wide angle zoom guidance screen 194, the reference frame 194B is assigned to the instruction reception region 194A. The reference frame 194B is a frame that is in a similar relationship with the instruction reception region 194A and is smaller than the instruction reception region 194A. The reference frame 194B is a frame of a size corresponding to the imaging range obtained by compensating for the insufficient zoom magnification.

Figure 30:
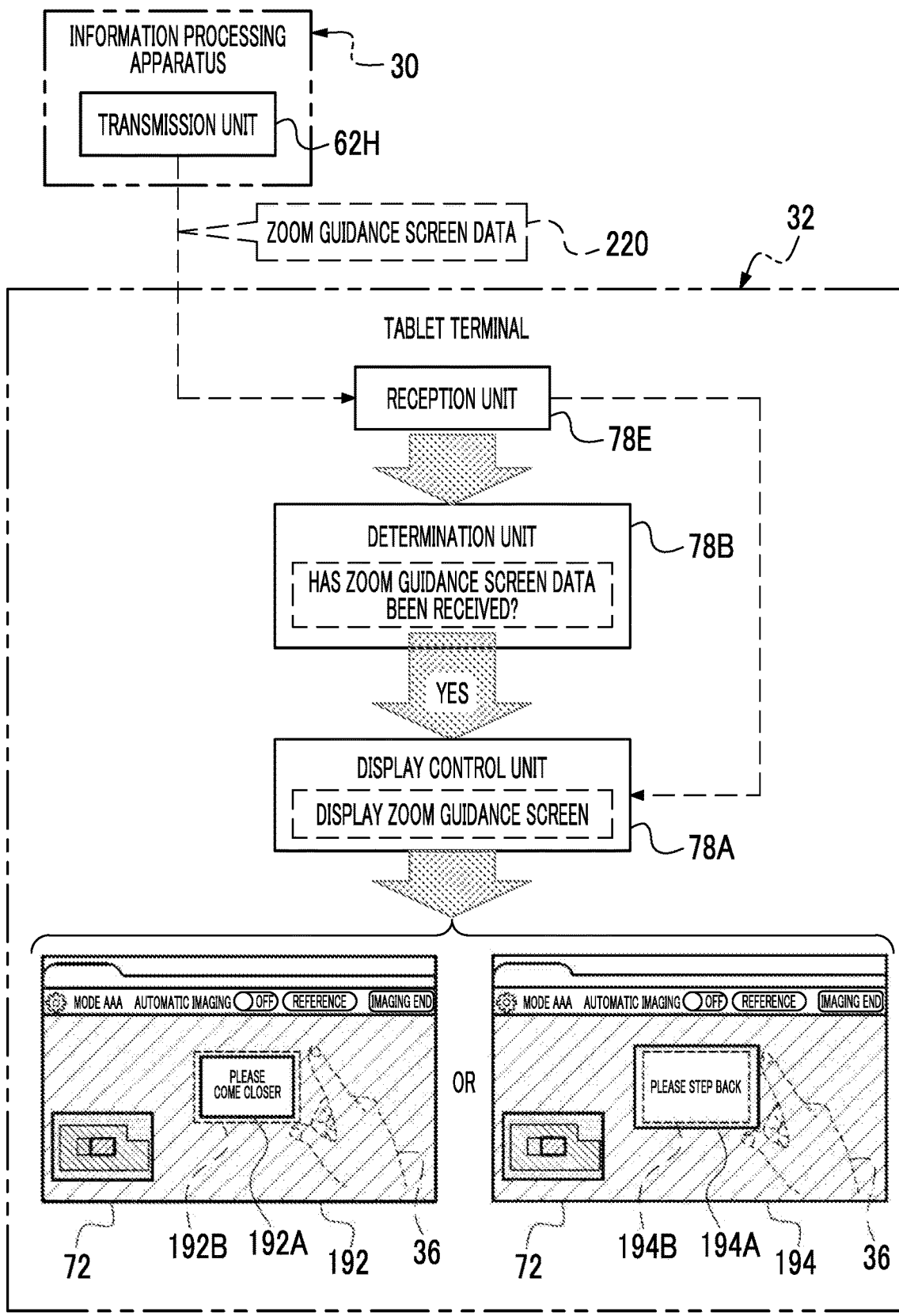
FIG. 30 is a conceptual diagram illustrating an example of an aspect in which an instruction is given to an instruction reception region included in the zoom guidance screen.

As an example, as illustrated in FIG. 30, in the tablet terminal 32, the reception unit 78E receives the zoom guidance screen data 220 transmitted from the transmission unit 62H of the information processing apparatus 30. The determination unit 78B determines whether or not the zoom guidance screen data 220 has been received by the reception unit 78E. In a case in which the determination unit 78B determines that the zoom guidance screen data 220 has been received by the reception unit 78E, the display control unit 78A displays the zoom guidance screen indicated by the zoom guidance screen data 220 received by the reception unit 78E on the touch panel display 72.

In the example illustrated in FIG. 30, an aspect in which the user 36 performs a pinch-out operation on the touch panel display 72 as an operation of adjusting the size of the instruction reception region 192A in the telescopic zoom guidance screen 192 to the size of the reference frame 192B is illustrated. The size of the instruction reception region 192A gradually increases by the pinch-out operation, and eventually matches the size of the reference frame 192B. In a case in which the size of the instruction reception region 192A matches the size of the reference frame 192B, the display control unit 78A may delete the message in the instruction reception region 192A, or may perform peaking processing on the instruction reception region 192A.

In the example illustrated in FIG. 30, an aspect in which the user 36 performs a pinch-in operation on the touch panel display 72 as an operation of adjusting the size of the instruction reception region 194A in the wide angle zoom guidance screen 194 to the size of the reference frame 194B is illustrated. The size of the instruction reception region 194A gradually increases by the pinch-in operation, and eventually matches the size of the reference frame 194B. In a case in which the size of the instruction reception region 194A matches the size of the reference frame 194B, the display control unit 78A may delete the message in the instruction reception region 194A, or may perform peaking processing on the instruction reception region 194A.

Figure 31:
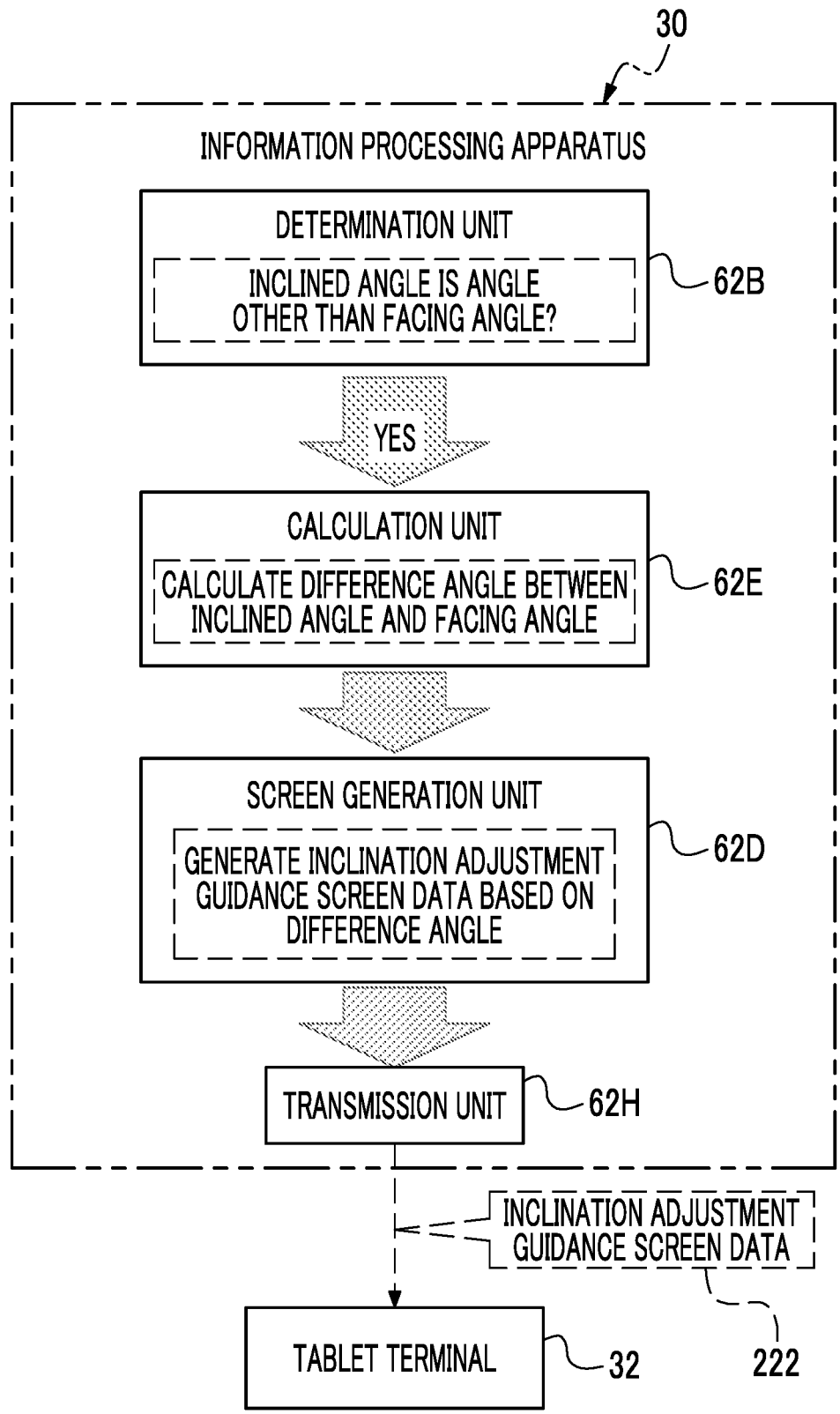
FIG. 31 is a conceptual diagram illustrating an example of a processing content related to inclination adjustment guidance screen data.

As an example, as illustrated in FIG. 31, in the information processing apparatus 30, the determination unit 62B determines whether or not the inclined angle calculated by the calculation unit 62E illustrated in FIG. 23 is an angle other than a facing angle. The facing angle, for example, is determined by whether or not an angle with the light-receiving surface 96A (refer to FIG. 4) is larger than 0 degrees±one-hundredth of a degree (that is, a tolerance). In a case in which the determination unit 62B determines that the inclined angle is an angle other than the facing angle, the calculation unit 62E calculates a difference angle. The difference angle refers to an angle of difference between the inclined angle and the facing angle. The difference angle is an example of "information indicating whether or not a second imaging target surface imaged by the imaging apparatus and the imaging apparatus face each other" according to the technology of the present disclosure.

The screen generation unit 62D generates the inclination adjustment guidance screen data 222 based on the difference angle calculated by the calculation unit 62E. The inclination adjustment guidance screen data 222 is screen data (for example, screen data indicating the inclination adjustment guidance screen 196) for displaying the inclination adjustment guidance screen 196 (refer to FIGS. 12 and 32) on the touch panel display 72. The transmission unit 62H transmits the inclination adjustment guidance screen data 222, which is generated by the screen generation unit 62D, to the tablet terminal 32.

Figure 32:
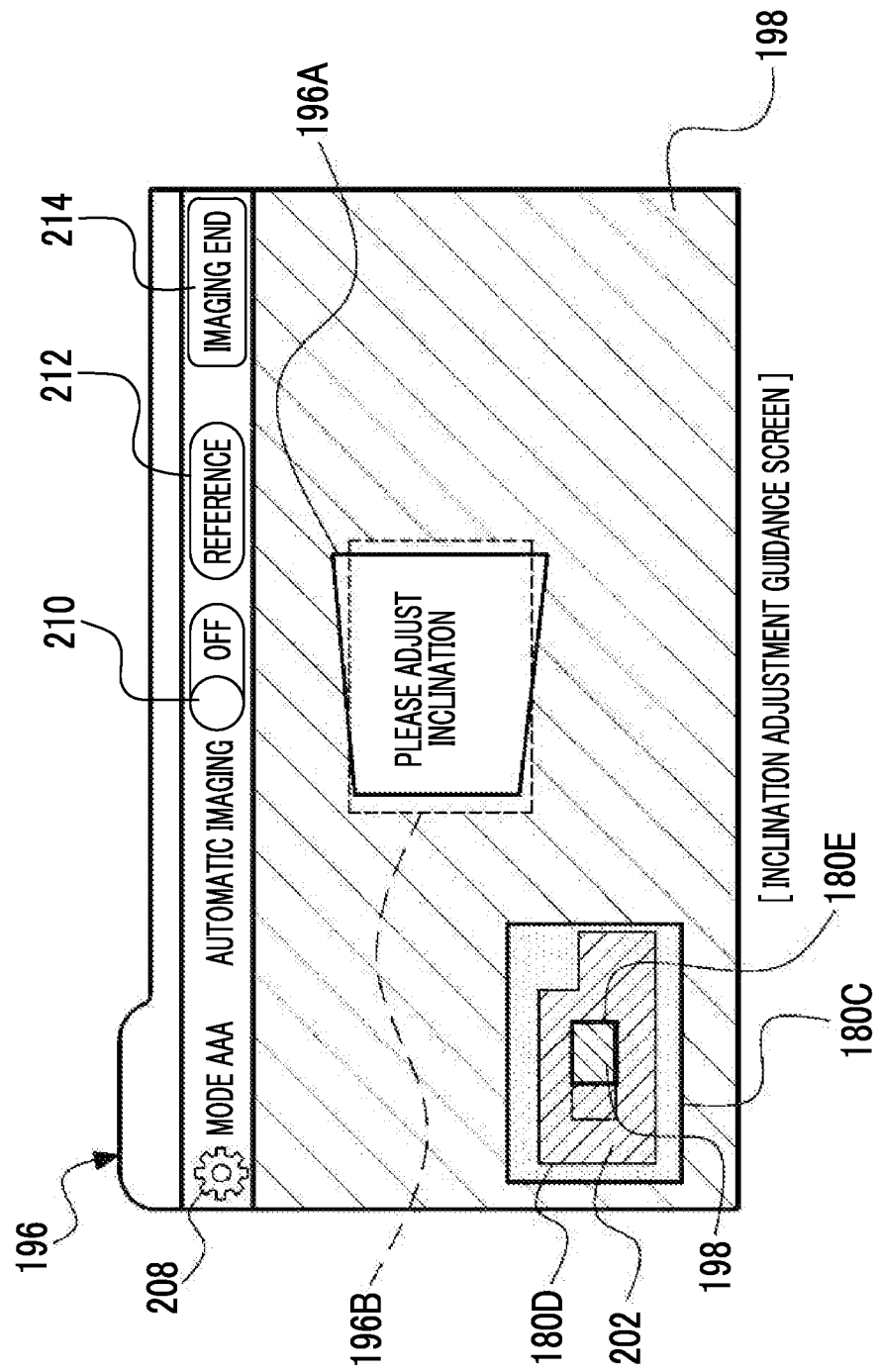
FIG. 32 is a schematic screen diagram illustrating an example of an inclination adjustment guidance screen.

As an example, as illustrated in FIG. 32, the inclination adjustment guidance screen 196 is different from the wide angle zoom guidance screen 194 in that the instruction reception region 196A is applied instead of the instruction reception region 194A and that a reference frame 196B is applied instead of the reference frame 194B.

The instruction reception region 196A is a region that is in a similar relationship with the imaging range and has a quadrangular outer frame. A message that urges the user 36 to perform an operation of adjusting the inclination of the imaging range is displayed in the instruction reception region 196A. In the example illustrated in FIG. 32, the message "Please adjust inclination" is displayed. In addition, in the inclination adjustment guidance screen 196, the reference frame 196B is assigned to the instruction reception region 196A. The reference frame 196B is a frame having a shape and a size corresponding to the imaging range, which is obtained by compensating for the difference angle.

Figure 33:
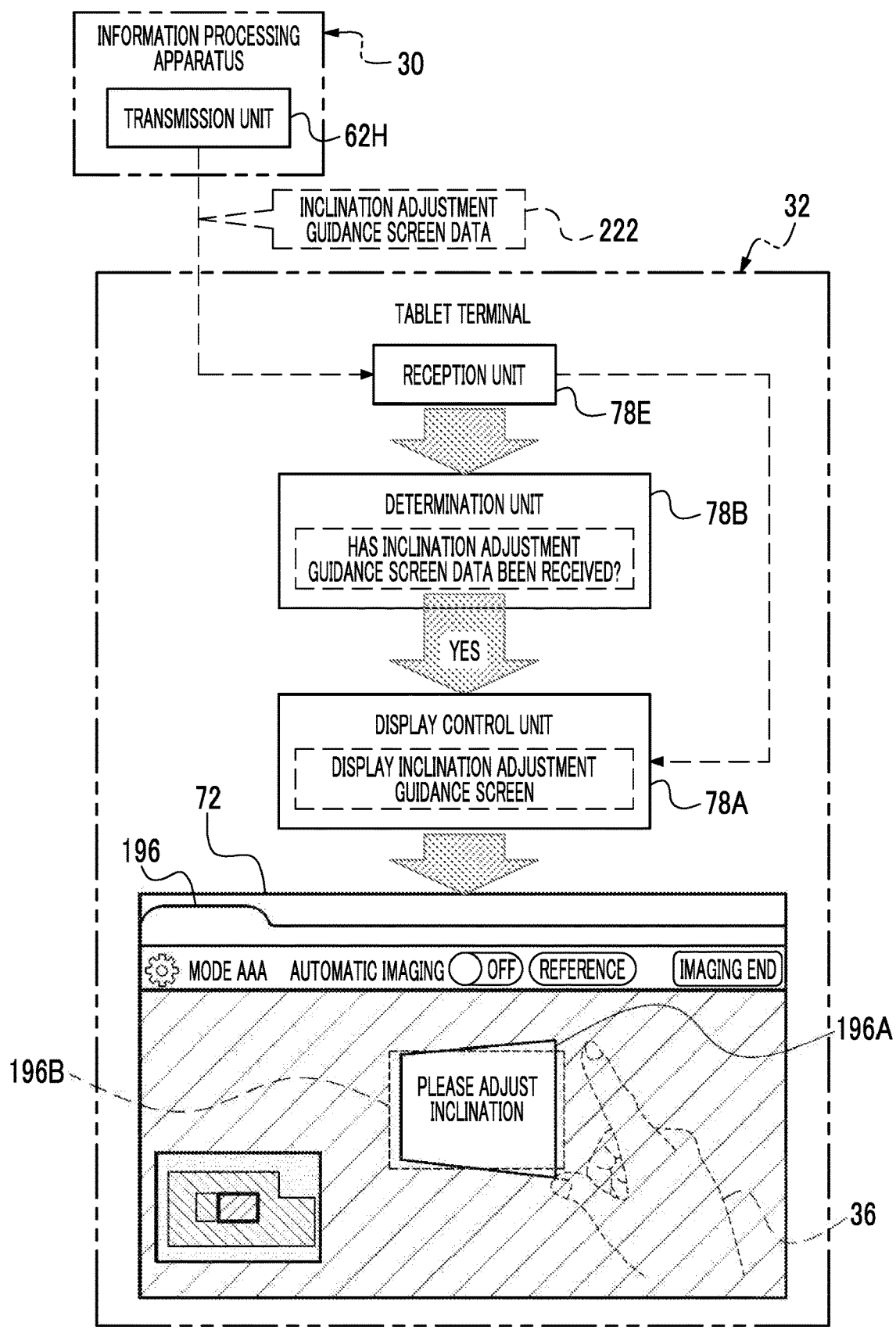
FIG. 33 is a conceptual diagram illustrating an example of an aspect in which an instruction is given to an instruction reception region included in the inclination adjustment guidance screen.

As an example, as illustrated in FIG. 33, in the tablet terminal 32, the reception unit 78E receives the inclination adjustment guidance screen data 222 transmitted from the transmission unit 62H of the information processing apparatus 30. The determination unit 78B determines whether or not the inclination adjustment guidance screen data 222 has been received by the reception unit 78E. In a case in which the determination unit 78B determines that the inclination adjustment guidance screen data 222 has been received by the reception unit 78E, the display control unit 78A displays the inclination adjustment guidance screen 196 indicated by the inclination adjustment guidance screen data 222 received by the reception unit 78E on the touch panel display 72.

In the example illustrated in FIG. 33, an aspect in which the user 36 performs a pinch-in operation and/or a pinch-out operation with respect to the touch panel display 72 as an operation of adjusting the shape and the size of the instruction reception region 196A in the inclination adjustment guidance screen 196 to the shape and the size of the reference frame 196B is illustrated. The shape and the size of the instruction reception region 196A are changed by the pinch-in operation and/or the pinch-out operation, and eventually match the shape and the size of the reference frame 192B. In a case in which the shape and the size of the instruction reception region 196A matches the shape and the size of the reference frame 192B, the display control unit 78A may delete the message in the instruction reception region 196A, or may perform peaking processing on the instruction reception region 196A.

Figure 34:
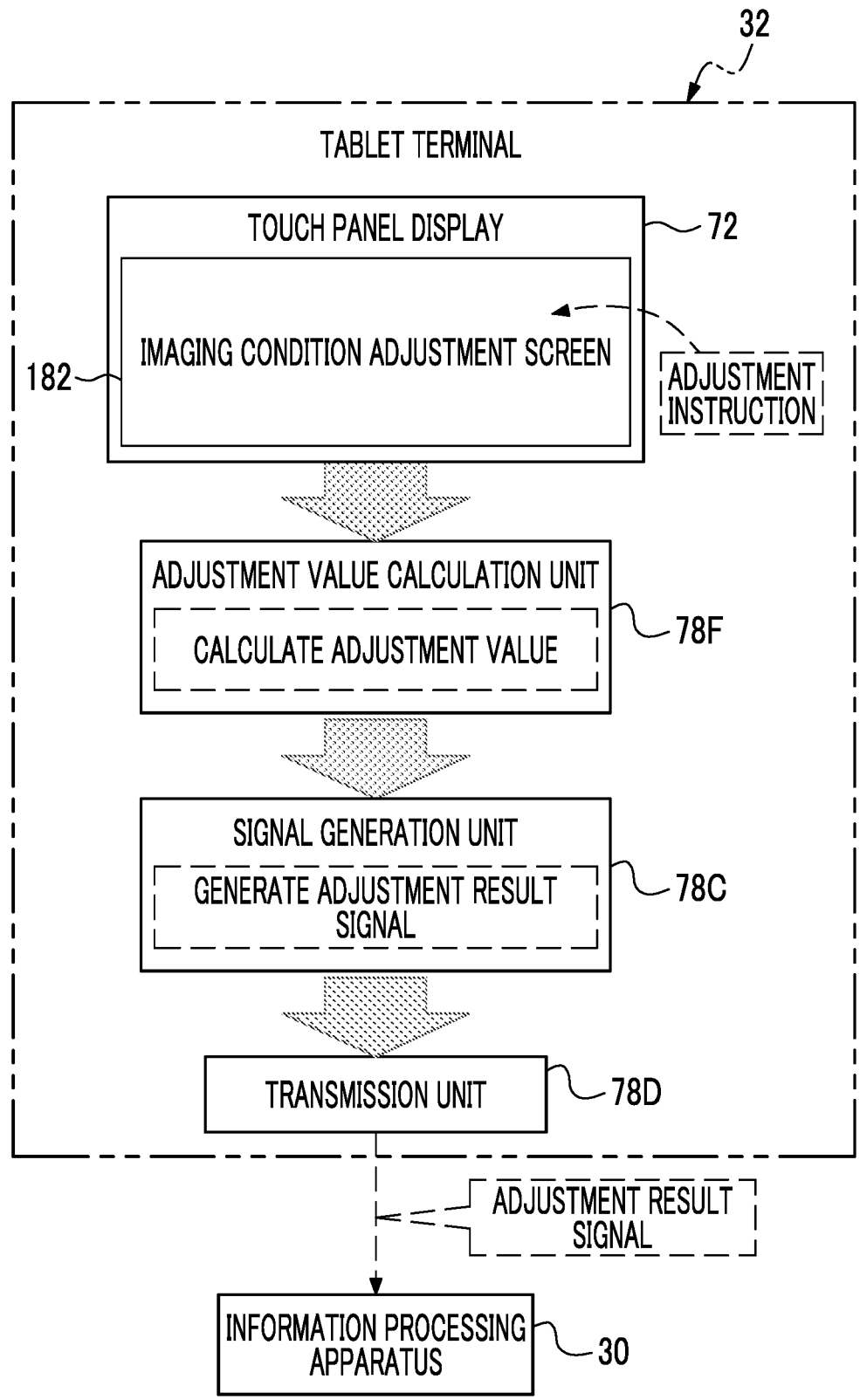
FIG. 34 is a conceptual diagram illustrating an example of a processing content until an adjustment result signal is obtained.

As an example, as shown in FIG. 34, in a case in which an adjustment instruction is given to the imaging condition adjustment screen 182 via the touch panel display 72 in the tablet terminal 32, the adjustment value calculation unit 78F calculates an adjustment value according to the adjustment instruction. Here, the adjustment instruction refers to an operation (for example, the tap) by the user 36 on the instruction reception region 190A in the movement guidance screen 190 illustrated in FIG. 26 as an example, an operation (for example, a pinch-in operation and/or a pinch-out operation) by the user 36 on the instruction reception region 192A or 194A in the zoom guidance screen illustrated in FIG. 30 as an example, and/or an operation (for example, a pinch-in operation and/or a pinch-out operation) by the user 36 on the instruction reception region 196A in the inclination adjustment guidance screen 196 illustrated in FIG. 33 as an example.

The signal generation unit 78C generates the adjustment result signal indicating the adjustment value calculated by the adjustment value calculation unit 78F. The transmission unit 78D transmits the adjustment result signal, which is generated by the signal generation unit 78C, to the information processing apparatus 30.

Figure 35:
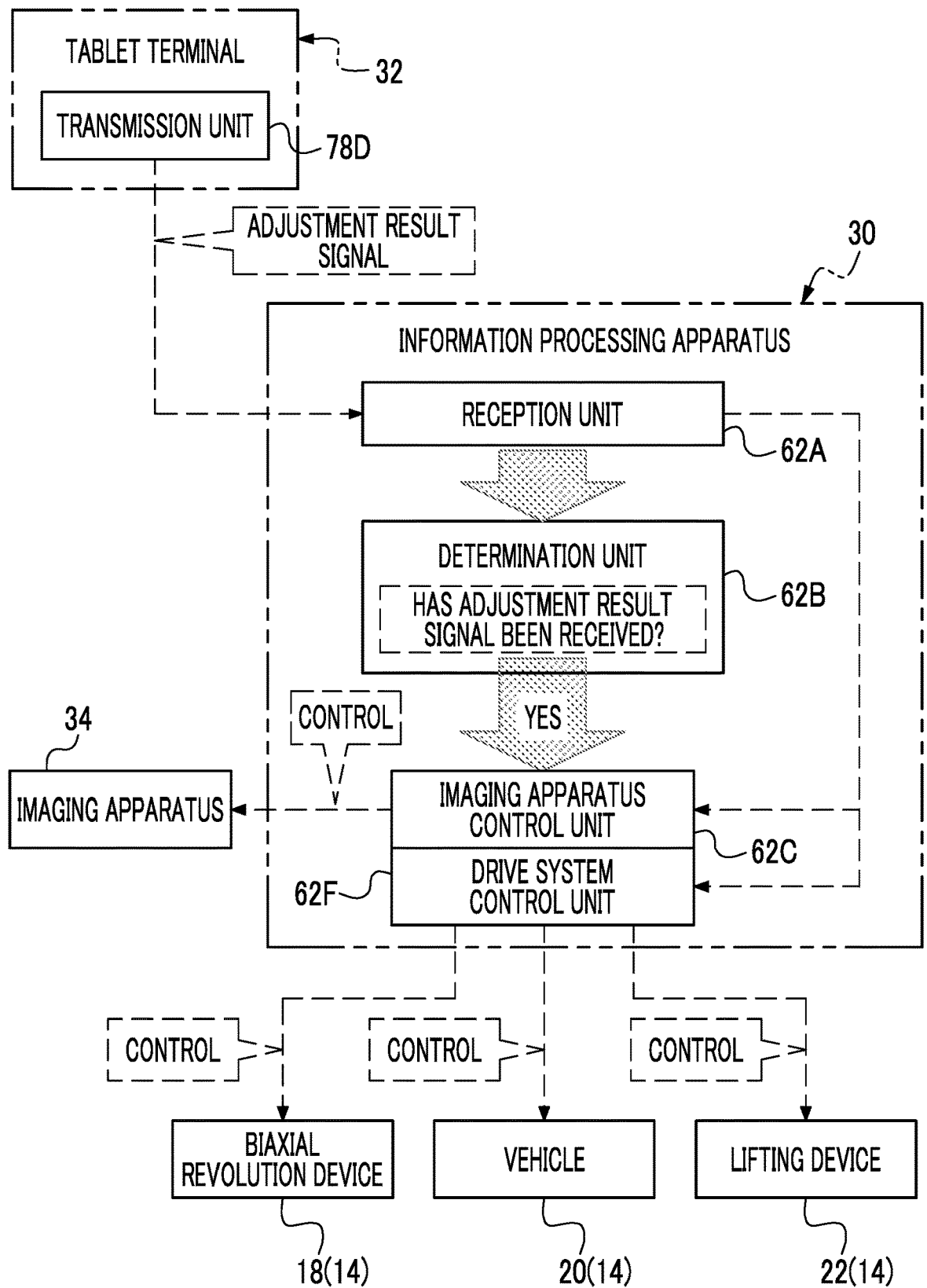
FIG. 35 is a conceptual diagram illustrating an example of a processing content in a case in which a drive system and the imaging apparatus are controlled in accordance with the adjustment result signal.

As an example, as illustrated in FIG. 35, in the information processing apparatus 30, the reception unit 62A receives the adjustment result signal transmitted from the transmission unit 78D of the tablet terminal 32. The determination unit 62B determines whether or not the adjustment result signal has been received by the reception unit 62A. In a case in which the determination unit 62B determines that the adjustment result signal has been received by the reception unit 62A, the imaging apparatus control unit 62C controls the imaging apparatus 34 in accordance with the adjustment result signal received by the reception unit 62A, and the drive system control unit 62F controls the drive system 14 in accordance with the adjustment result signal received by the reception unit 62A.

For example, in a case in which the adjustment value indicated by the adjustment result signal received by the reception unit 62A is the adjustment value determined according to the adjustment instruction for the instruction reception region 192A or 194A (refer to FIG. 30), the imaging apparatus control unit 62C moves the zoom lens 98C (refer to FIG. 4) along the optical axis OA so as to compensate for the insufficient zoom magnification. After moving the zoom lens 98C in this way, the zoom magnification is calculated again by the calculation unit 62E (refer to FIG. 23).

In addition, for example, in a case in which the adjustment value indicated by the adjustment result signal received by the reception unit 62A is the adjustment value determined according to the adjustment instruction for the instruction reception region 190A (refer to FIG. 26), the drive system control unit 62F causes the vehicle 20 to travel in the imaging range in the movement direction and the movement amount according to the adjustment value or operates the lifting device 22. After operating the vehicle 20 and/or the lifting device 22 in this way, the overlap ratio is calculated again by the calculation unit 62E (refer to FIG. 23).

In addition, for example, in a case in which the adjustment value indicated by the adjustment result signal received by the reception unit 62A is the adjustment value determined according to the adjustment instruction for the instruction reception region 196A (refer to FIG. 33), the drive system control unit 62F operates the biaxial revolution device 18 so as to eliminate the difference angle. After operating the biaxial revolution device 18 in this way, the inclined angle is calculated again by the calculation unit 62E (refer to FIG. 23).

Figure 36:
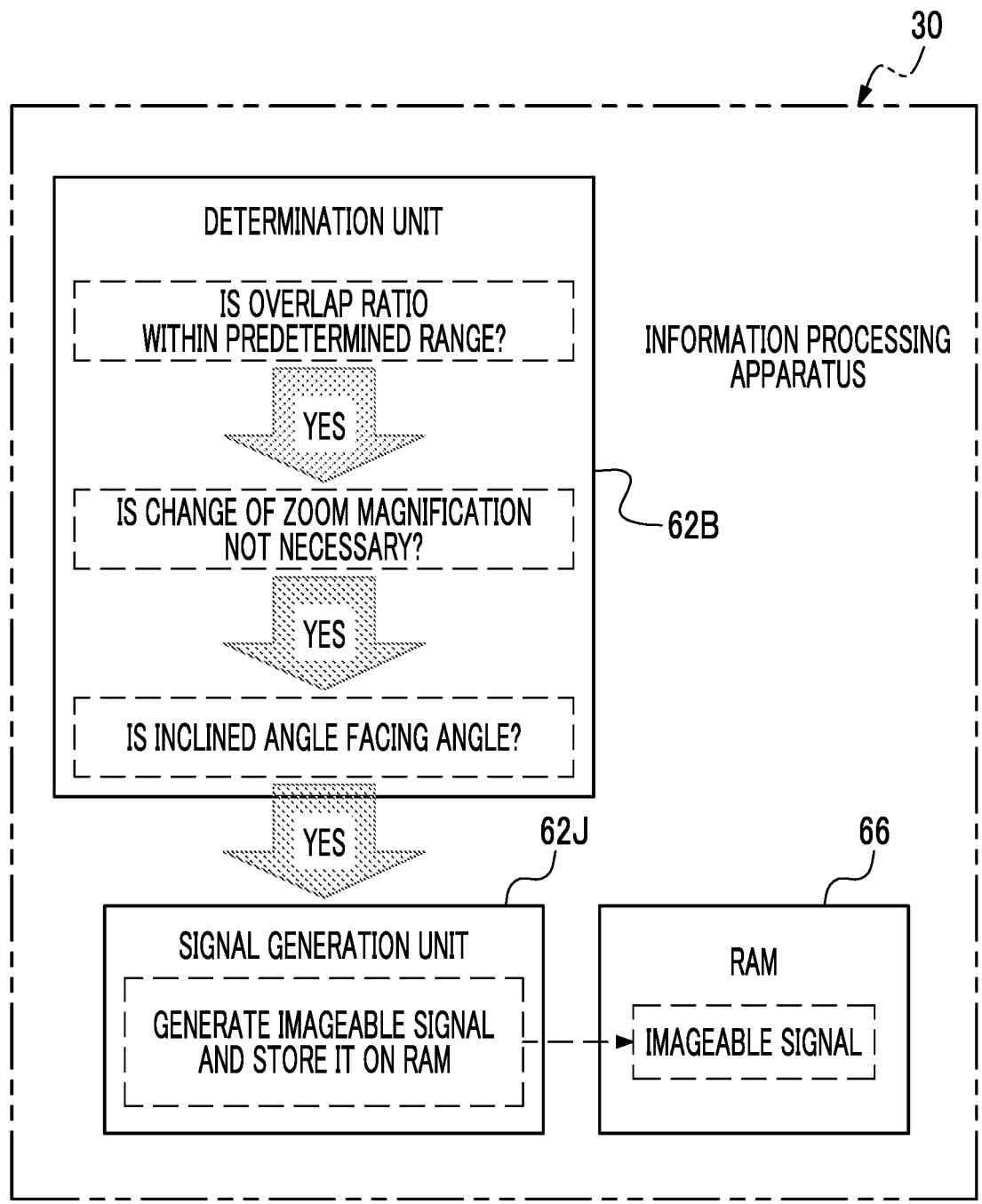
FIG. 36 is a conceptual diagram illustrating an example of a processing content in which an imageable signal is set.

As an example, as illustrated in FIG. 36, in the information processing apparatus 30, the determination unit 62B determines whether or not the overlap ratio calculated by the calculation unit 62E is within a predetermined range, the change of the zoom magnification calculated by the calculation unit 62E is not necessary (for example, the zoom magnification=1), and the inclined angle calculated by the calculation unit 62E is the facing angle. In a case in which the determination unit 62B determines that the overlap ratio calculated by the calculation unit 62E is within the predetermined range, the change of the zoom magnification calculated by the calculation unit 62E is not necessary, and the inclined angle calculated by the calculation unit 62E is the facing angle, the signal generation unit 62J sets an imageable signal indicating that it is determined that the main imaging is executable. That is, the signal generation unit 62J generates the imageable signal and stores the imageable signal in the RAM 66.

Figure 37:
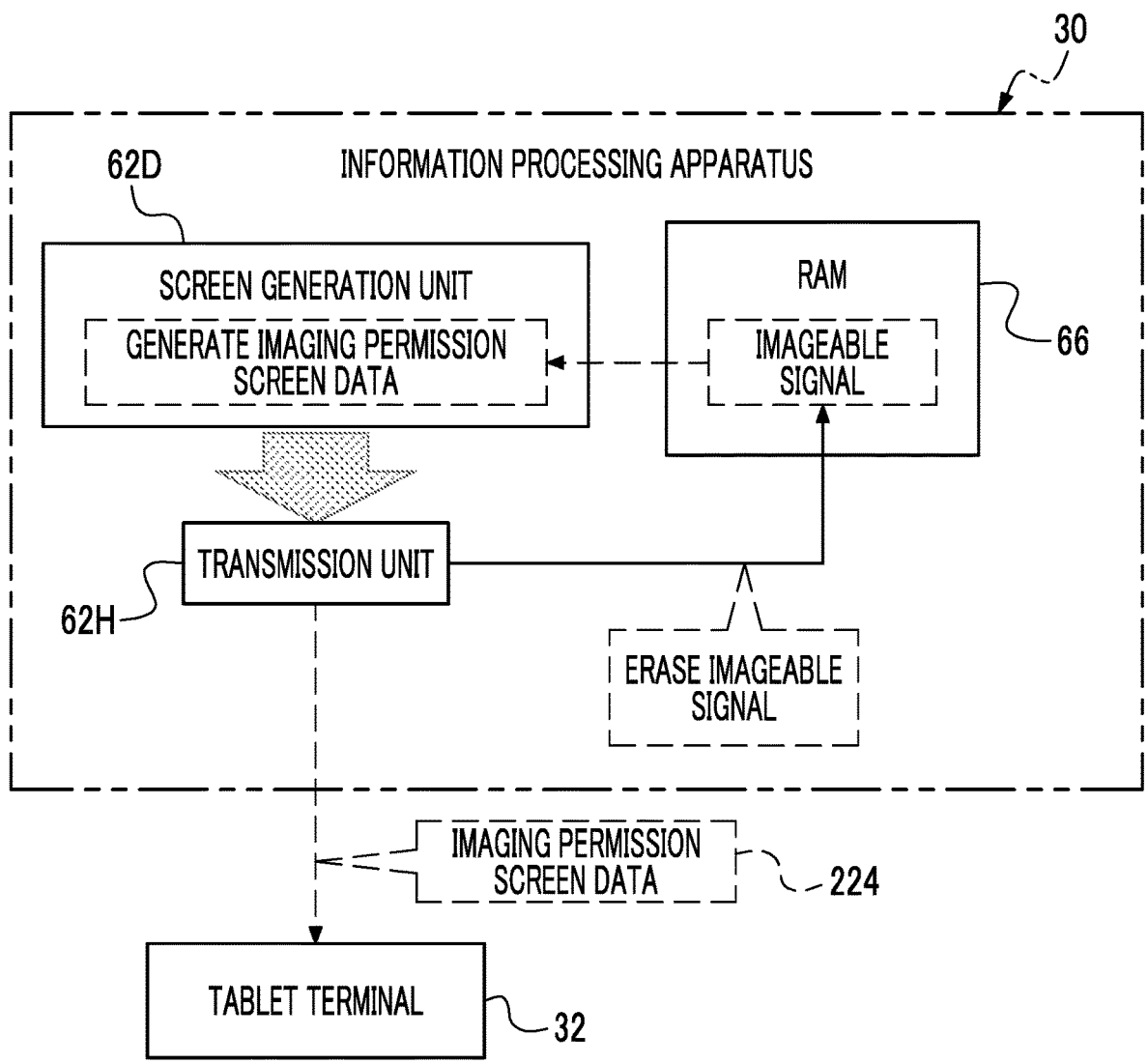
FIG. 37 is a conceptual diagram illustrating an example of a processing content related to imaging permission screen data.

As an example, as illustrated in FIG. 37, in the information processing apparatus 30, the screen generation unit 62D generates imaging permission screen data 224 in a case in which the imageable signal is set by the signal generation unit 62J, that is, in a case in which the imageable signal is stored in the RAM 66. The imaging permission screen data 224 is screen data (for example, screen data indicating the imaging permission screen 186) for displaying the imaging permission screen 186 (refer to FIGS. 12 and 38) on the touch panel display 72. The transmission unit 62H transmits the imaging permission screen data 224 generated by the screen generation unit 62D to the tablet terminal 32, and erases the imageable signal in the RAM 66. The imaging permission screen data 224 is an example of "data in which the screen includes an imaging instruction reception region of a display aspect for notifying that the main imaging is executable" according to the technology of the present disclosure.

Figure 38:
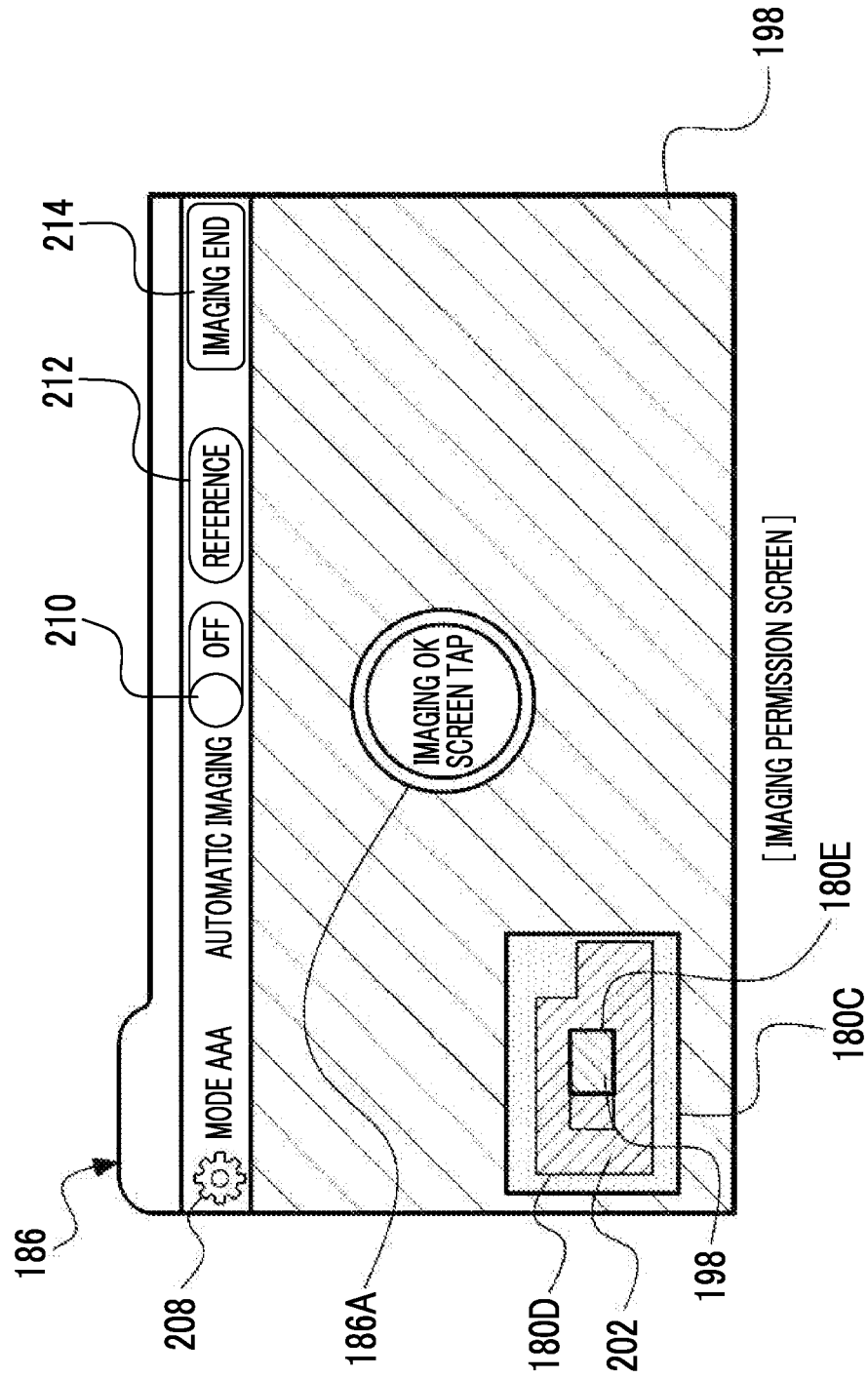
FIG. 38 is a schematic screen diagram illustrating an example of an imaging permission screen.

As an example, as illustrated in FIG. 38, the imaging instruction reception region 186A includes an imaging instruction reception region 186A as a region of a display aspect for notifying that the main imaging is executable. The imaging permission screen 186 is different from the imaging start screen 180 in that the imaging instruction reception region 186A is applied instead of the instruction reception region 180F. The imaging instruction reception region 186A is different from the instruction reception region 180F in that it includes a message indicating that the main imaging is executable (in the example illustrated in FIG. 38, a message of "Imaging OK"). The message indicating that the main imaging is executable is not essential, and the message indicating that the main imaging is executable may or may not be present.

Figure 39:
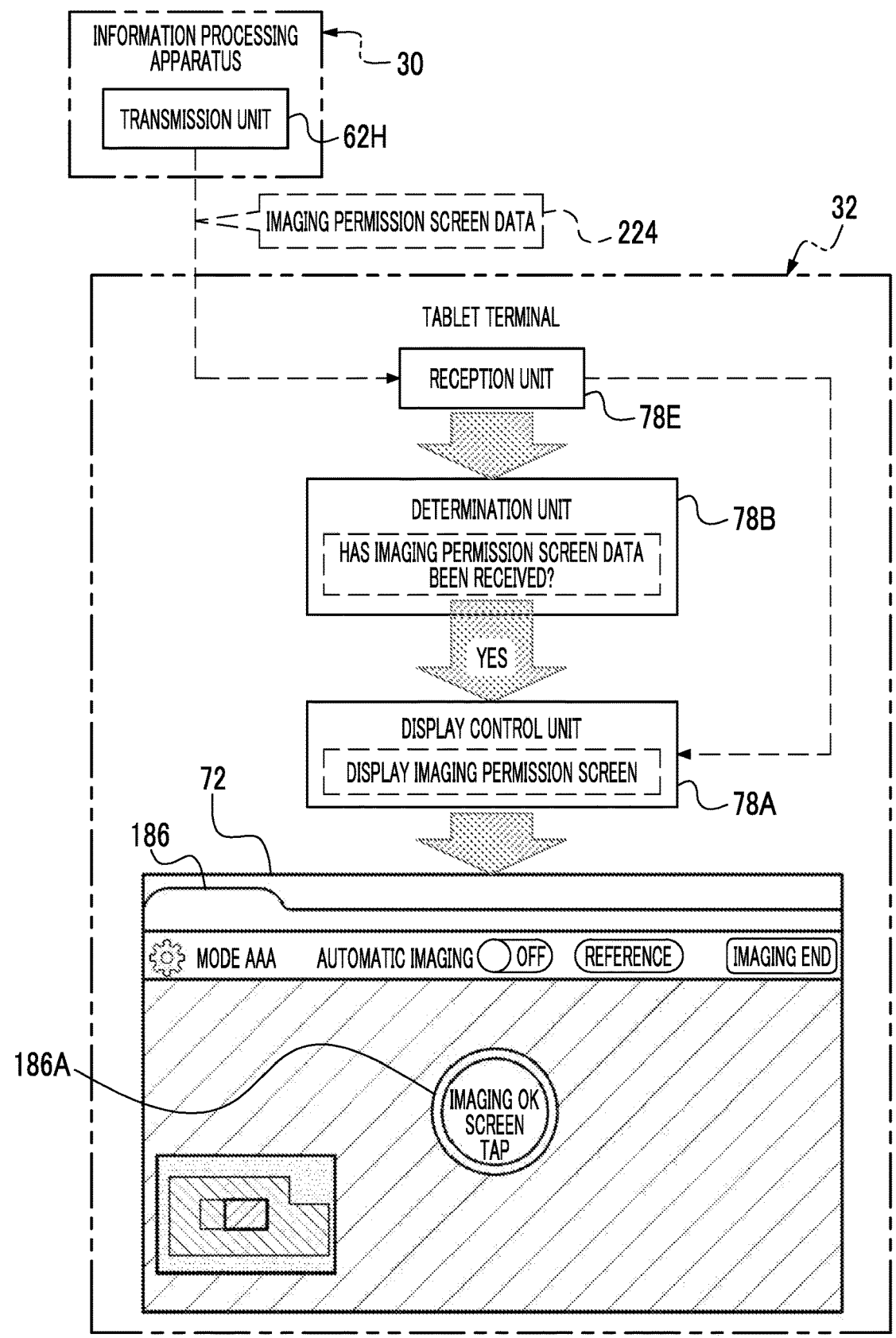
FIG. 39 is a conceptual diagram illustrating an example of a processing content for displaying the imaging permission screen on a touch panel display.

As an example, as illustrated in FIG. 39, in the tablet terminal 32, the reception unit 78E receives the imaging permission screen data 224 transmitted from the transmission unit 62H of the information processing apparatus 30. The determination unit 78B determines whether or not the imaging permission screen data 224 has been received by the reception unit 78E. In a case in which the determination unit 78B determines that the imaging permission screen data 224 has been received by the reception unit 78E, the display control unit 78A displays the imaging permission screen 186 indicated by the imaging permission screen data 224 received by the reception unit 78E on the touch panel display 72.

Figure 40:
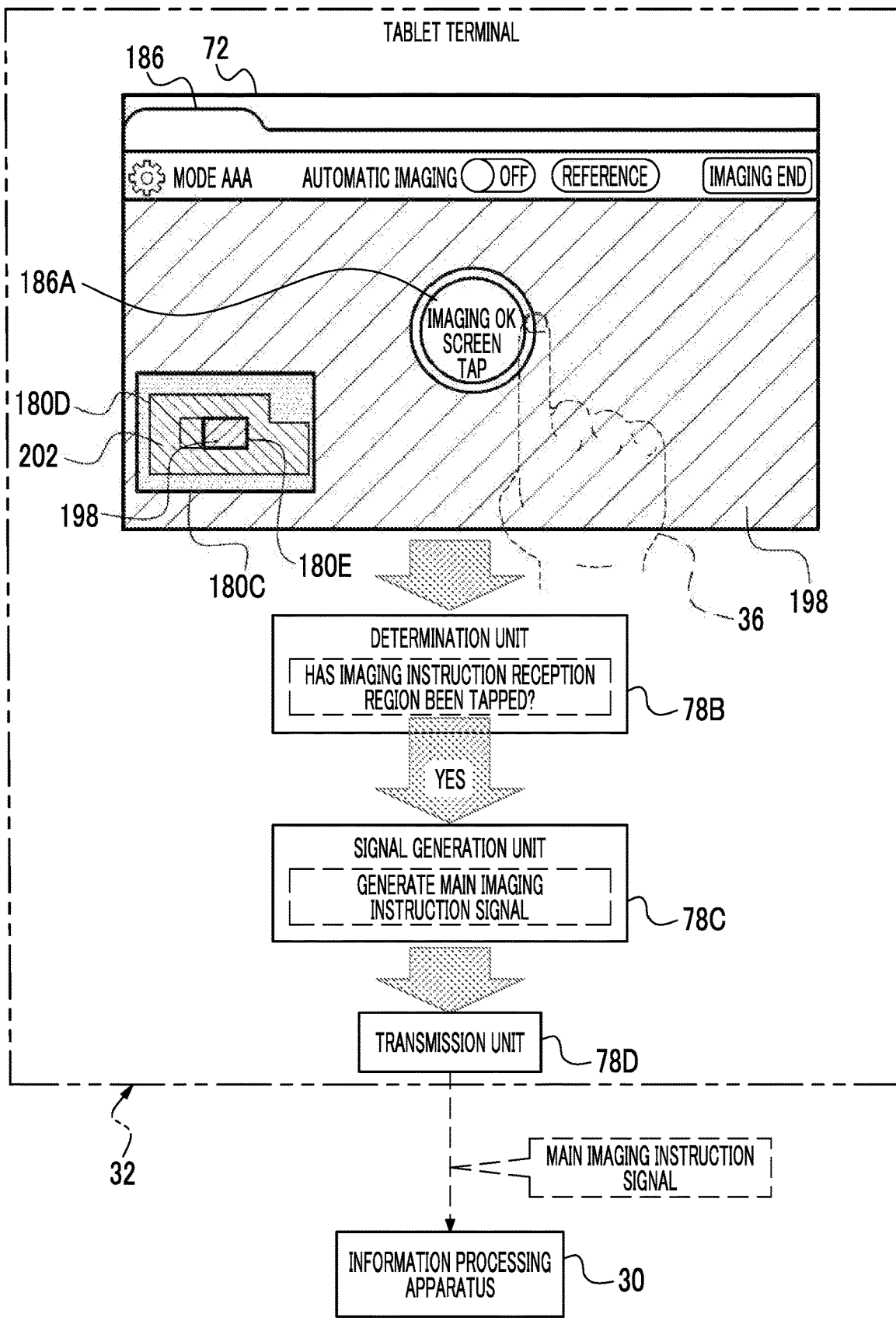
FIG. 40 is a conceptual diagram illustrating an example of a processing content until a main imaging instruction signal is obtained.

As an example, as illustrated in FIG. 40, in the tablet terminal 32, the determination unit 78B determines whether or not the imaging instruction reception region 186A within the imaging permission screen 186 displayed on the touch panel display 72 is tapped by the user 36. The tap by the user 36 on the imaging instruction reception region 186A is an example of an "imaging instruction" according to the technology of the present disclosure.

In a case in which an instruction from the user 36 is received by the imaging instruction reception region 186A, that is, in a case in which the determination unit 78B determines that the imaging instruction reception region 186A has been tapped by the user 36, the signal generation unit 78C generates the main imaging instruction signal. The main imaging instruction signal is a signal indicating an instruction to cause the imaging apparatus 34 to execute the main imaging on the inspection object 16 (refer to FIG. 1) indicated by the live view image 198. The transmission unit 78D transmits the main imaging instruction signal, which is generated by the signal generation unit 78C, to the information processing apparatus 30.

Figure 41:
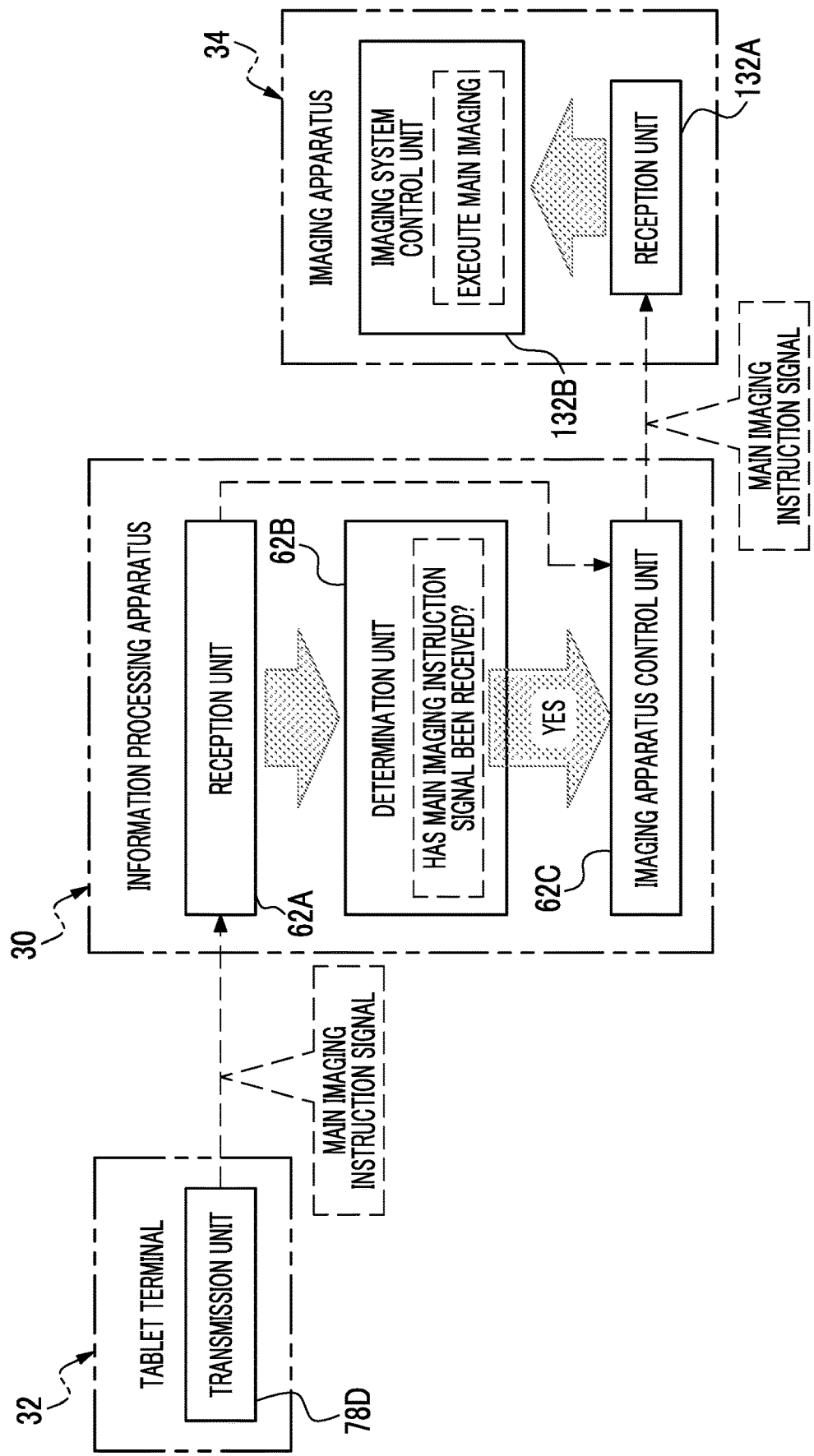
FIG. 41 is a conceptual diagram illustrating an example of a flow of the main imaging instruction signal.

As an example, as illustrated in FIG. 41, in the information processing apparatus 30, the reception unit 62A receives the main imaging instruction signal transmitted from the transmission unit 78D of the tablet terminal 32. The determination unit 62B determines whether or not the main imaging instruction signal has been received by the reception unit 62A. In a case in which the determination unit 62B determines that the main imaging instruction signal has been received by the reception unit 62A, the imaging apparatus control unit 62C transmits the main imaging instruction signal received by the reception unit 62A to the imaging apparatus 34. Here, the transmission of the main imaging instruction signal is an example of the "output" of the "main imaging instruction signal" according to the technology of the present disclosure.

In the imaging apparatus 34, the reception unit 132A receives the main imaging instruction signal which is transmitted from the imaging apparatus control unit 62C of the information processing apparatus 30. In a case in which the main imaging instruction signal is received by the reception unit 132A, the imaging system control unit 132B executes the main imaging.

Figure 42:
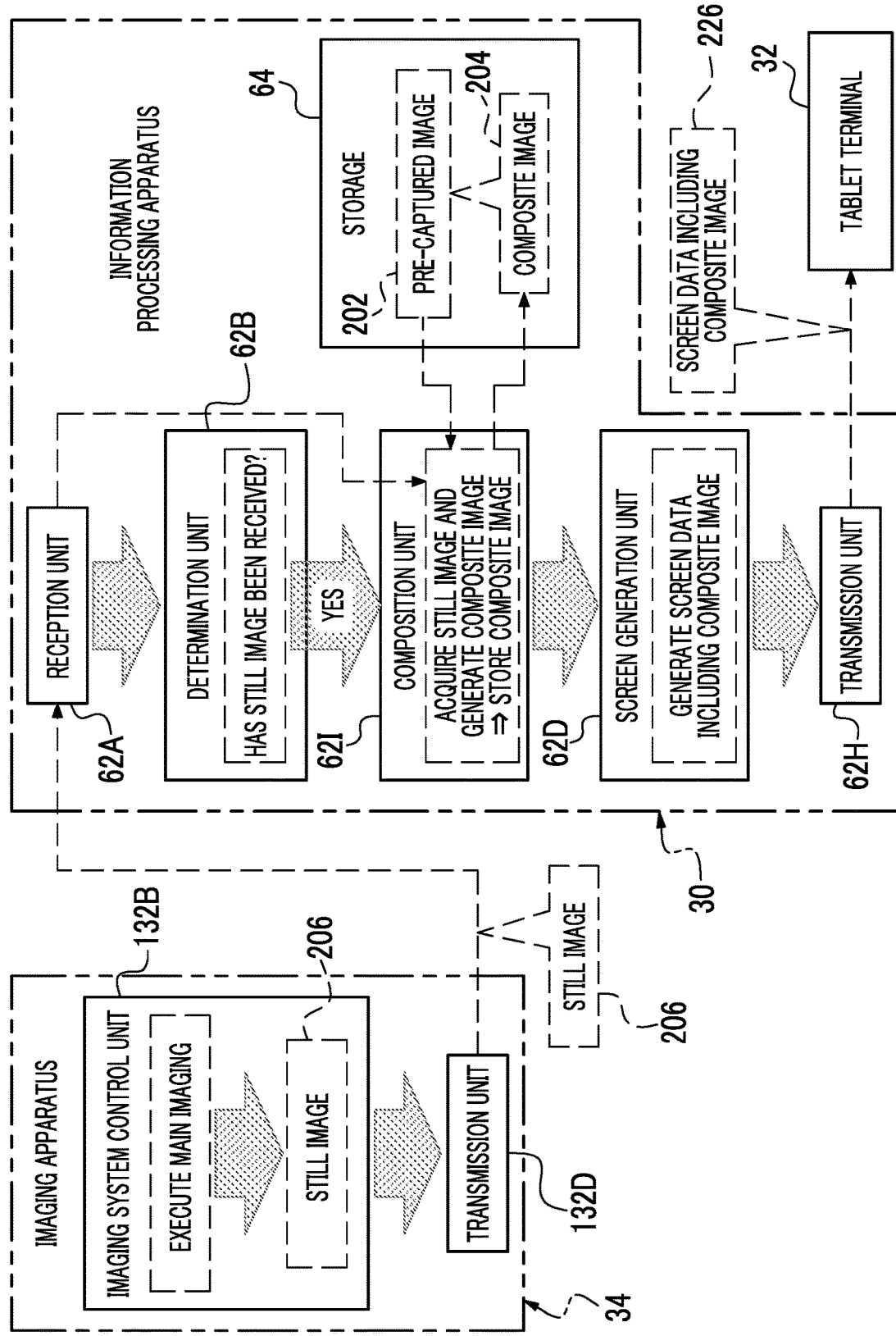
FIG. 42 is a conceptual diagram illustrating an example of a processing content until screen data including a composite image is obtained.

As an example, as illustrated in FIG. 42, in the imaging apparatus 34, the imaging system control unit 132B acquires a still image 206 as the captured image 127 (refer to FIG. 4) by executing the main imaging with the inspection object 16 (refer to FIG. 1) as a subject. The transmission unit 132D transmits the still image 206 acquired by the imaging system control unit 132B to the information processing apparatus 30.

In the information processing apparatus 30, the reception unit 62A receives the still image 206 which is transmitted from the transmission unit 132D of the imaging apparatus 34. The determination unit 62B determines whether or not the still image 206 has been received by the reception unit 62A. In a case in which the determination unit 62B determines that the still image 206 has been received by the reception unit 62A, the composition unit 62I acquires the still image 206 received by the reception unit 62A. In addition, the composition unit 62I acquires the pre-captured image 202 from the storage 64. The composition unit 62I overlaps the still image 206 with the pre-captured image 202 at an overlap ratio within the predetermined range described above and joins them into a panoramic image to generate the composite image 204.

The screen generation unit 62D generates screen data 226 including a composite image using the composite image 204 generated by the composition unit 62I. The screen data 226 including a composite image is screen data indicating a screen including a composite image. The screen including a composite image is, for example, screen data indicating a screen in which the pre-captured image 202 displayed in each wide view region 180D of the imaging start screen 180, the imaging condition adjustment screen 182, the composition confirmation screen 184, and imaging permission screen 186 is replaced with the latest composite image 204 generated by the composition unit 62I. The transmission unit 62H transmits the screen data 226 including a composite image to the tablet terminal 32.

Figure 43:
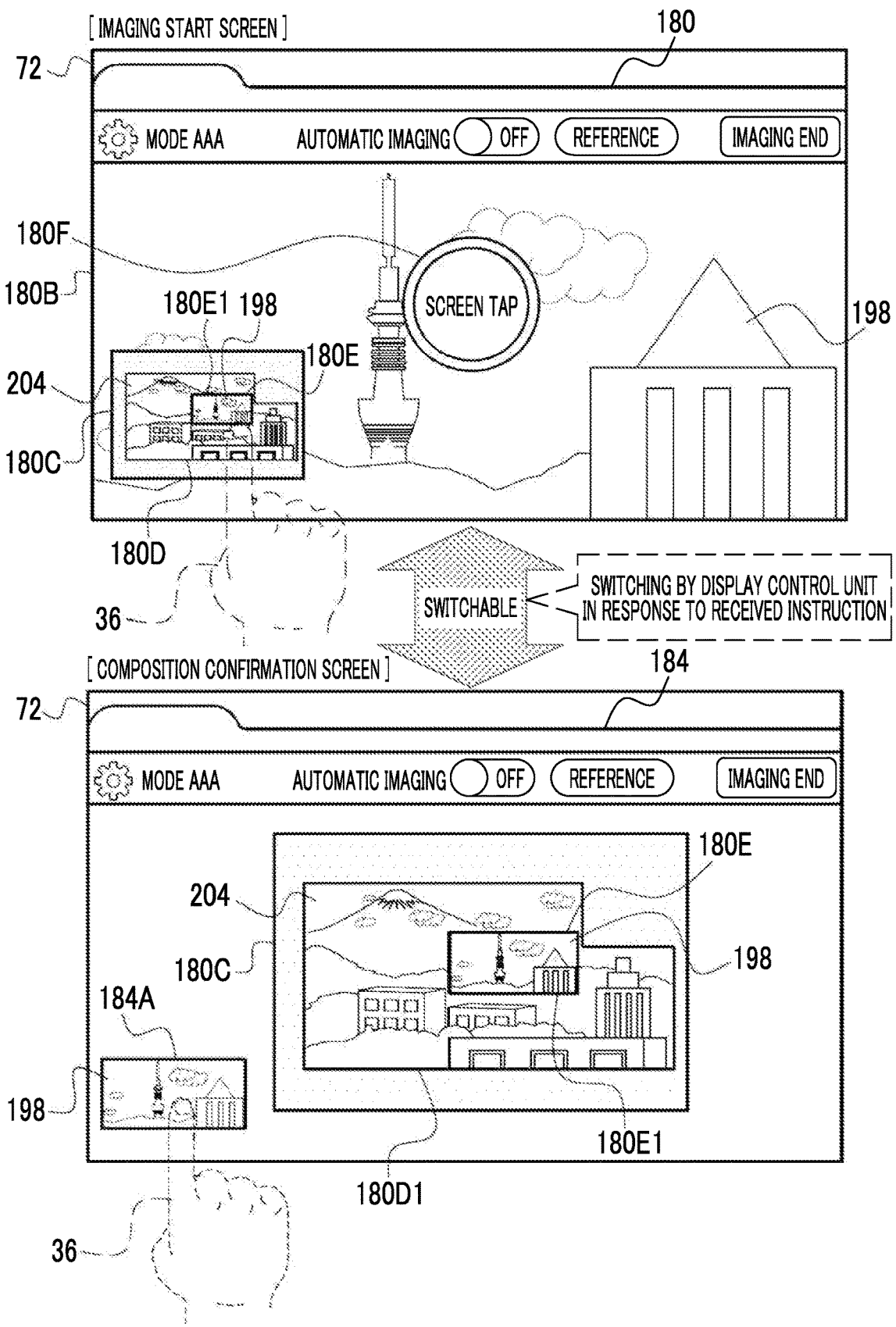
FIG. 43 is a conceptual diagram illustrating an example of an aspect in which the imaging start screen and a composition confirmation screen are switched.

As an example, as illustrated in FIG. 43, on the imaging start screen 180 generated as the screen data 226 including a composite image, the composite image 204 obtained by joining a plurality of still images 206 into a panoramic image is displayed in the wide view region 180D. In a state in which the imaging start screen 180 is displayed on the touch panel display 72, the display control unit 78A switches from the imaging start screen 180 to the composition confirmation screen 184 in response to the instruction received by the touch panel display 72. Here, examples of the instruction received by the touch panel display 72 include, for example, the tap on the wide view region 180D by the user 36. In addition, the instruction is not limited to the tap on the wide view region 180D, and may be a tap on the guide view region 180C or may be a tap on the guide region 180E. In addition, the tap is merely an example, and a long press may be performed, or a flick or a swipe may be performed instead of the tap.

A reduced live view region 184A is displayed at a lower left portion of the front view of the composition confirmation screen 184, and a composite image confirmation view region 180D1 is displayed at a central portion of the screen. The reduced live view region 184A is a screen obtained by reducing the live view region 180B, and in the reduced live view region 184A, the entire live view region 180B is displayed in a state of being reduced to a size that fits an outer frame of the reduced live view region 184A.

The composite image confirmation view region 180D1 is displayed in a superimposed manner over the enlarged guide view region 180C. The composite image confirmation view region 180D1 is a region in which the wide view region 180D is enlarged, and the composite image 204 is also enlarged and displayed in the composite image confirmation view region 180D1 at the same magnification ratio as the magnification ratio of the wide view region 180D. That is, the composite image confirmation view region 180D1 is a region in which the wide view region 180D is enlarged together with the composite image 204. In a case in which the reduced live view region 184A is tapped on the composition confirmation screen 184, the display control unit 78A switches the screen displayed on the touch panel display 72 from the composition confirmation screen 184 to the imaging start screen 180.

In a case in which the screens can be switched, the processor 78 of the tablet terminal 32 requests the information processing apparatus 30 to switch the screens (for example, switching from the imaging start screen 180 to the composition confirmation screen 184), and the processor 62 of the information processing apparatus 30 may generate the composition confirmation screen data indicating the screen after the switching (for example, the composition confirmation screen 184) and transmit it to the tablet terminal 32. Then, the processor 62 of the tablet terminal 32 may display the composition confirmation screen 184 indicated by the composition confirmation screen data transmitted from the information processing apparatus 30, on the touch panel display 72.

Next, an action of the information processing system 12 will be explained with reference to FIGS. 44A to 46.

Figure 44A:
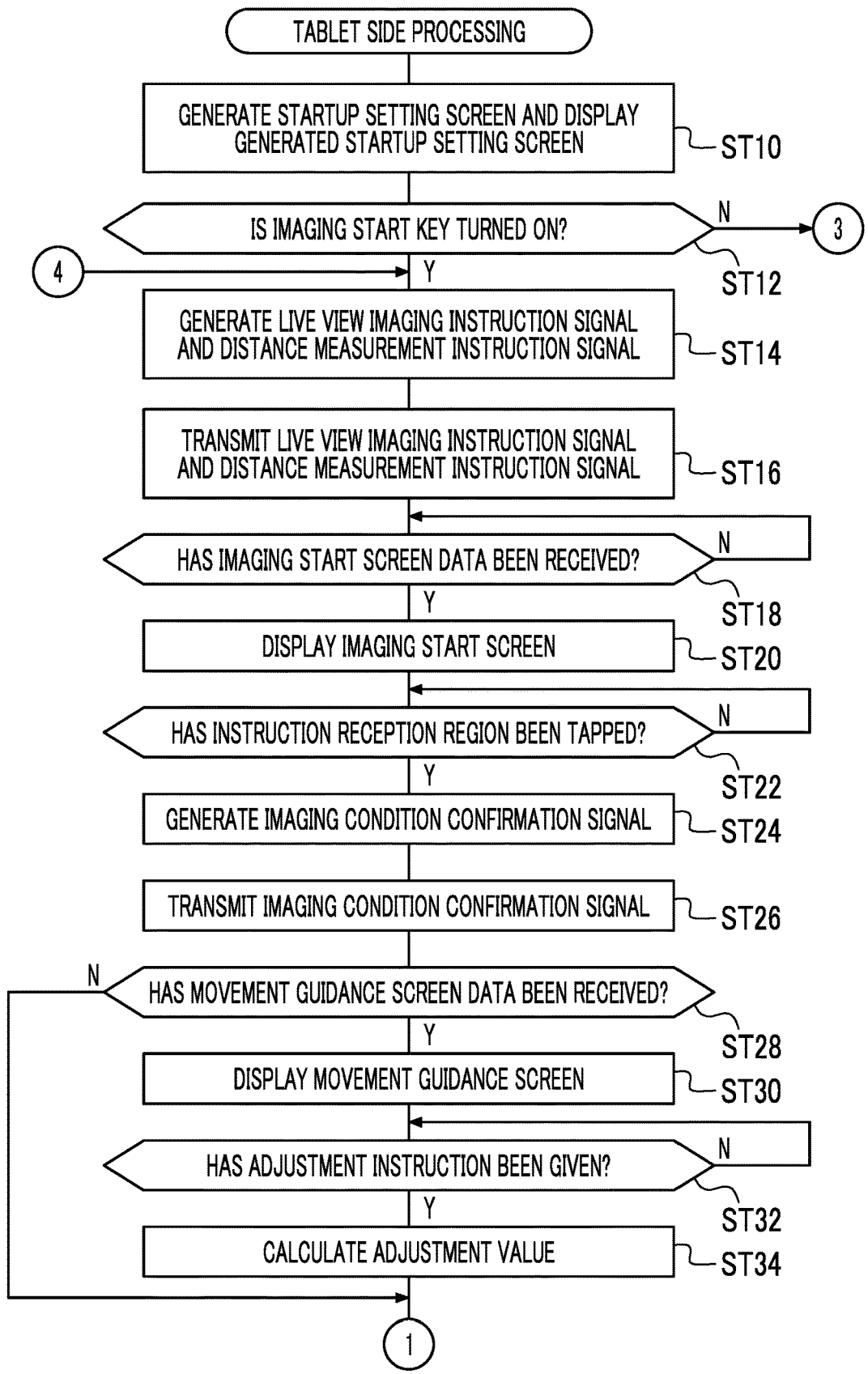
FIG. 44A is a flowchart illustrating an example of a flow of tablet side processing.
Figure 44B:
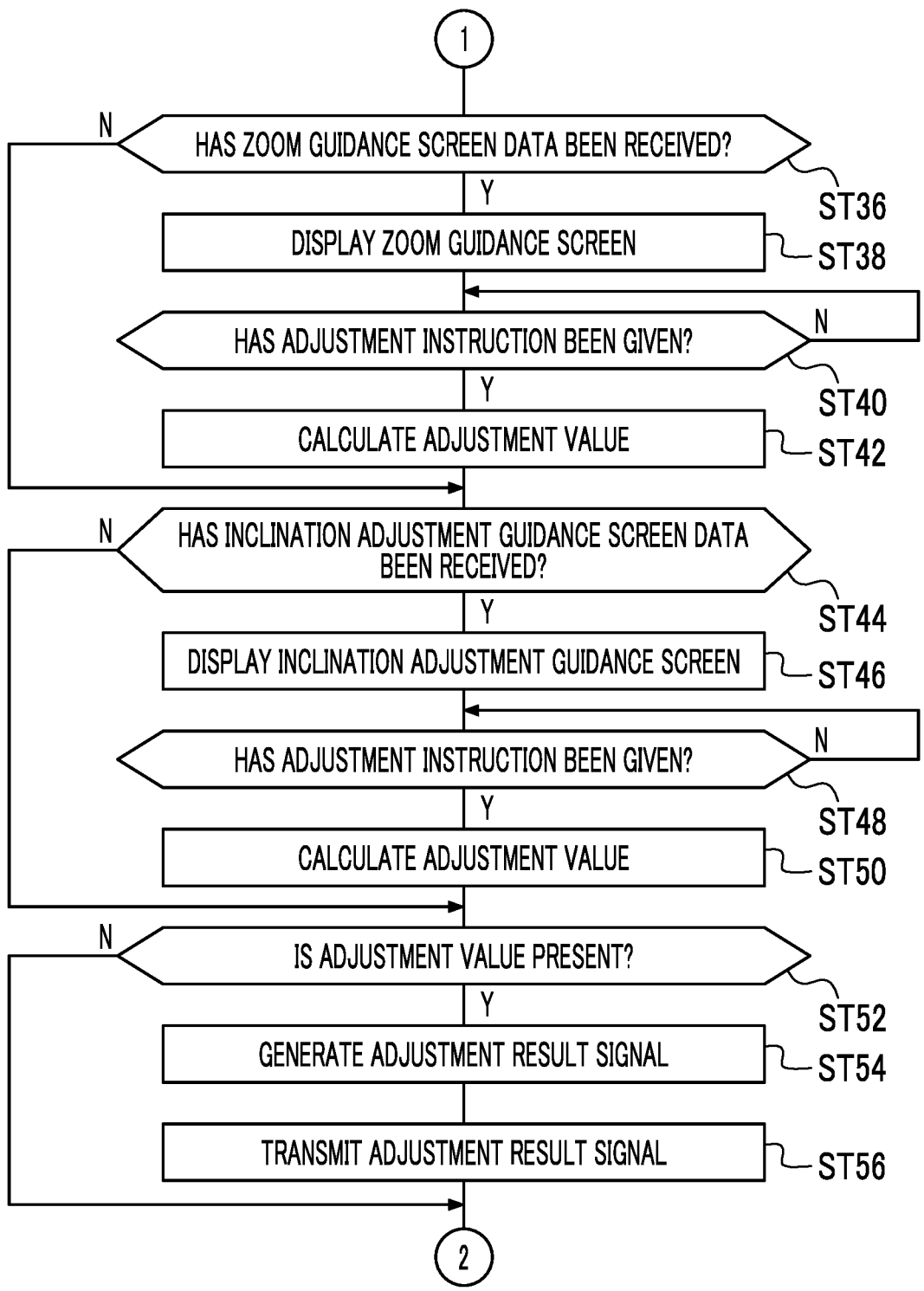
FIG. 44B is the continuation of the flowchart illustrated in FIG. 44A.
Figure 44C:
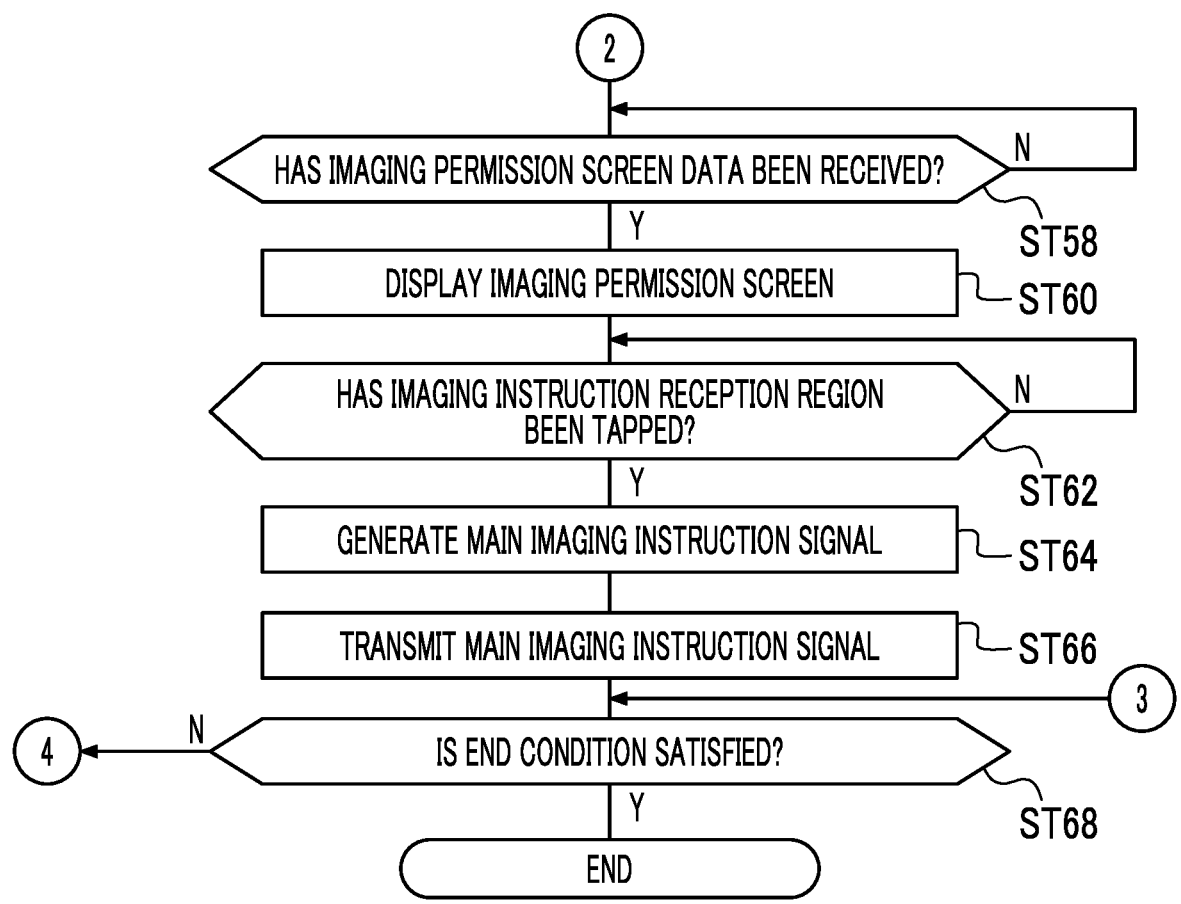
FIG. 44C is the continuation of the flowchart illustrated in FIGS. 44A and 44B.

First, the tablet side processing performed by the processor 78 of the tablet terminal 32 will be explained with reference to FIGS. 44A to 44C. In FIGS. 44A to 44C, an example of a flow of the tablet side processing performed by the processor 78 is illustrated.

In the tablet side processing illustrated in FIG. 44A, first, in Step ST10, the display control unit 78A generates a startup setting screen 178 and displays the generated startup setting screen 178 on the touch panel display 72 (refer to FIG. 13). After the processing of Step ST10 is executed, the tablet side processing proceeds to Step ST12.

In Step ST12, the determination unit 78B determines whether or not the imaging start key 178D in the startup setting screen 178 is turned on (refer to FIG. 13). In Step ST12, in a case in which the imaging start key 178D is not turned on, the determination is a negative determination, and the tablet side processing proceeds to Step ST68 illustrated in FIG. 44C. In Step ST12, in a case in which the imaging start key 178D is turned on, the determination is an affirmative determination, and the tablet side processing proceeds to Step ST14.

In Step ST14, the signal generation unit 78C generates the live view imaging instruction signal and the distance measurement instruction signal. After the processing of Step ST14 is executed, the tablet side processing proceeds to Step ST16.

In Step ST16, the transmission unit 78D transmits the live view imaging instruction signal and the distance measurement instruction signal generated in Step ST14 to the information processing apparatus 30 (refer to FIGS. 15 and 17). After the processing of Step ST16 is executed, the tablet side processing proceeds to Step ST18.

Figure 45A:
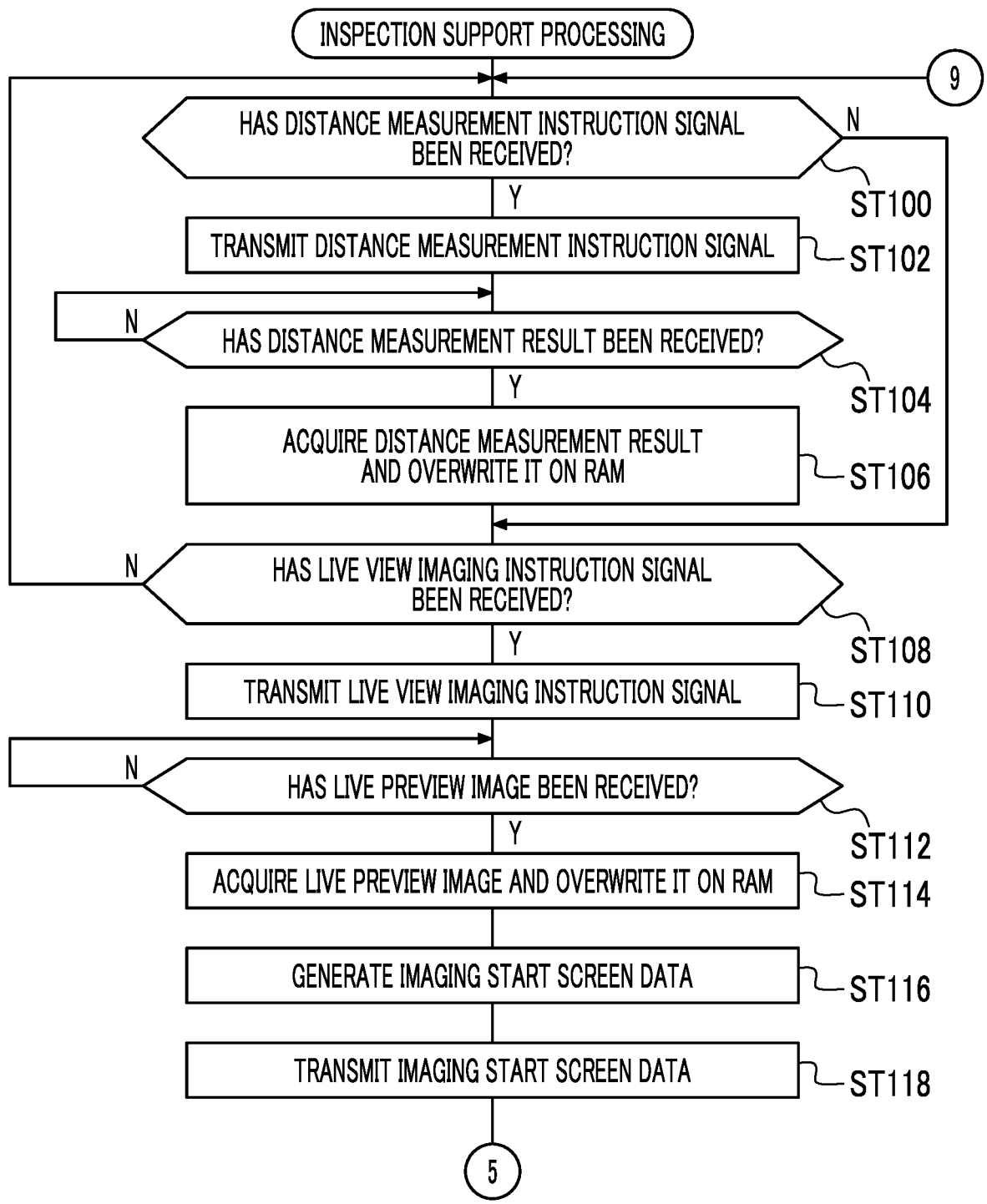
FIG. 45A is a flowchart illustrating an example of a flow of inspection support processing.

On condition that the processing of Step ST16 is executed, the processing of Step ST118 is executed in the inspection support processing illustrated in FIG. 45A. By executing the processing of Step ST118, the imaging start screen data 200 (refer to FIG. 18) is transmitted to the tablet terminal 32 from the information processing apparatus 30.

In Step ST18, the determination unit 78B determines whether or not the imaging start screen data 200 has been received by the reception unit 78E (refer to FIG. 21). In Step ST18, in a case in which the imaging start screen data 200 has not been received by the reception unit 78E, the determination is a negative determination, and the determination in Step ST18 is performed again. In Step ST18, in a case in which the imaging start screen data 200 has been received by the reception unit 78E, the determination is an affirmative determination, and the tablet side processing proceeds to Step ST20.

In Step ST20, the display control unit 78A displays the imaging start screen 180 indicated by the imaging start screen data 200 received by the reception unit 78E, on the touch panel display 72 (refer to FIG. 21). After the processing of Step ST20 is executed, the tablet side processing proceeds to Step ST22.

In Step ST22, the determination unit 78B determines whether or not the instruction reception region 180F in the imaging start screen 180, which is displayed on the touch panel display 72, has been tapped (refer to FIG. 22). In Step ST22, in a case in which the instruction reception region 180F has not been tapped, the determination is a negative determination, and the determination of Step ST22 is performed again. In Step ST22, in a case in which the instruction reception region 180F has been tapped, the determination is an affirmative determination, and the tablet side processing proceeds to Step ST24.

In Step ST24, the signal generation unit 78C generates the imaging condition confirmation signal (refer to FIG. 22). After the processing of Step ST24 is executed, the tablet side processing proceeds to Step ST26.

In Step ST26, the transmission unit 78D transmits the imaging condition confirmation signal generated in Step ST24 to the information processing apparatus 30 (refer to FIG. 22). After the processing of Step ST26 is executed, the tablet side processing proceeds to Step ST28.

Figure 45B:
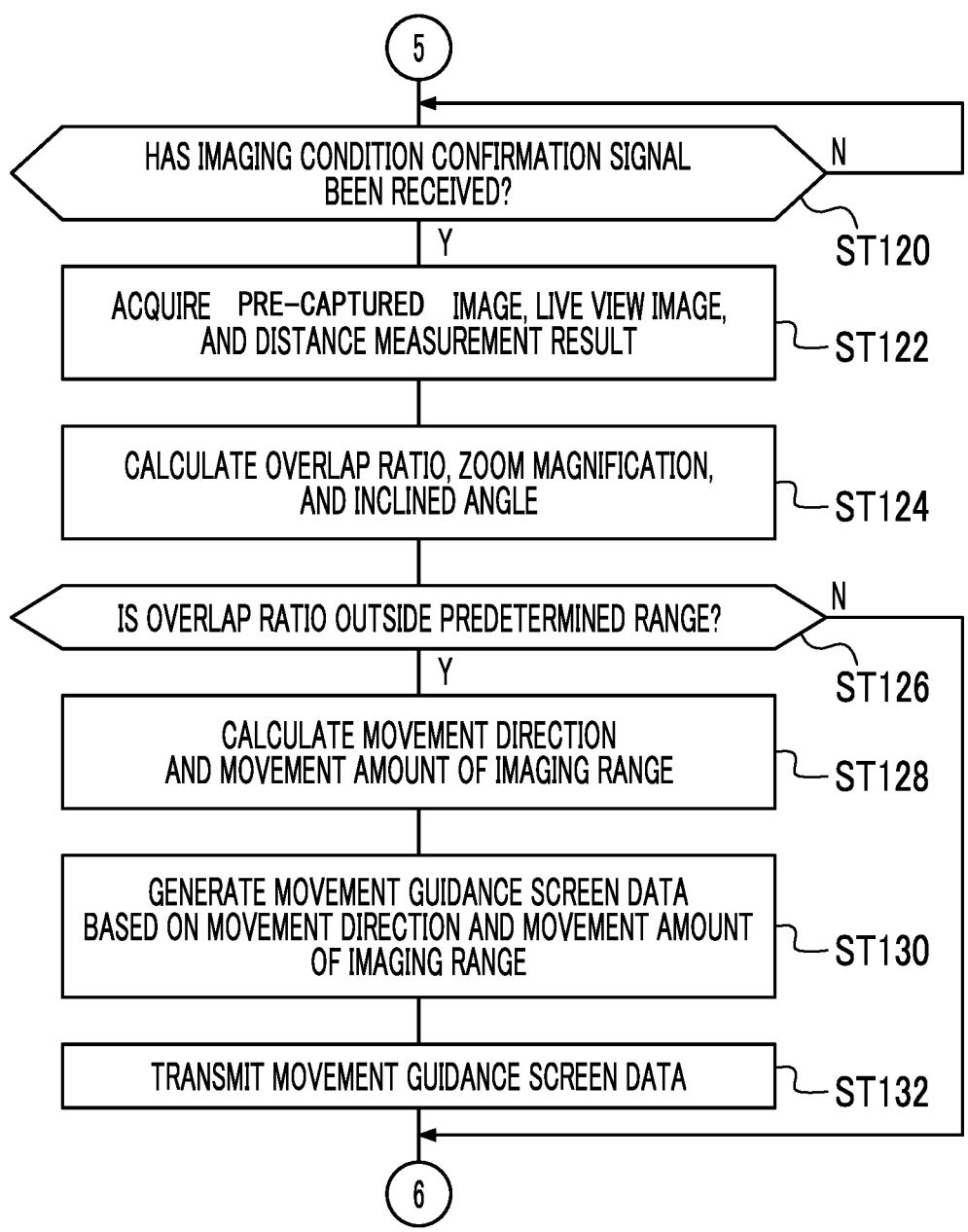
FIG. 45B is the continuation of the flowchart illustrated in FIG. 45A.
Figure 45C:
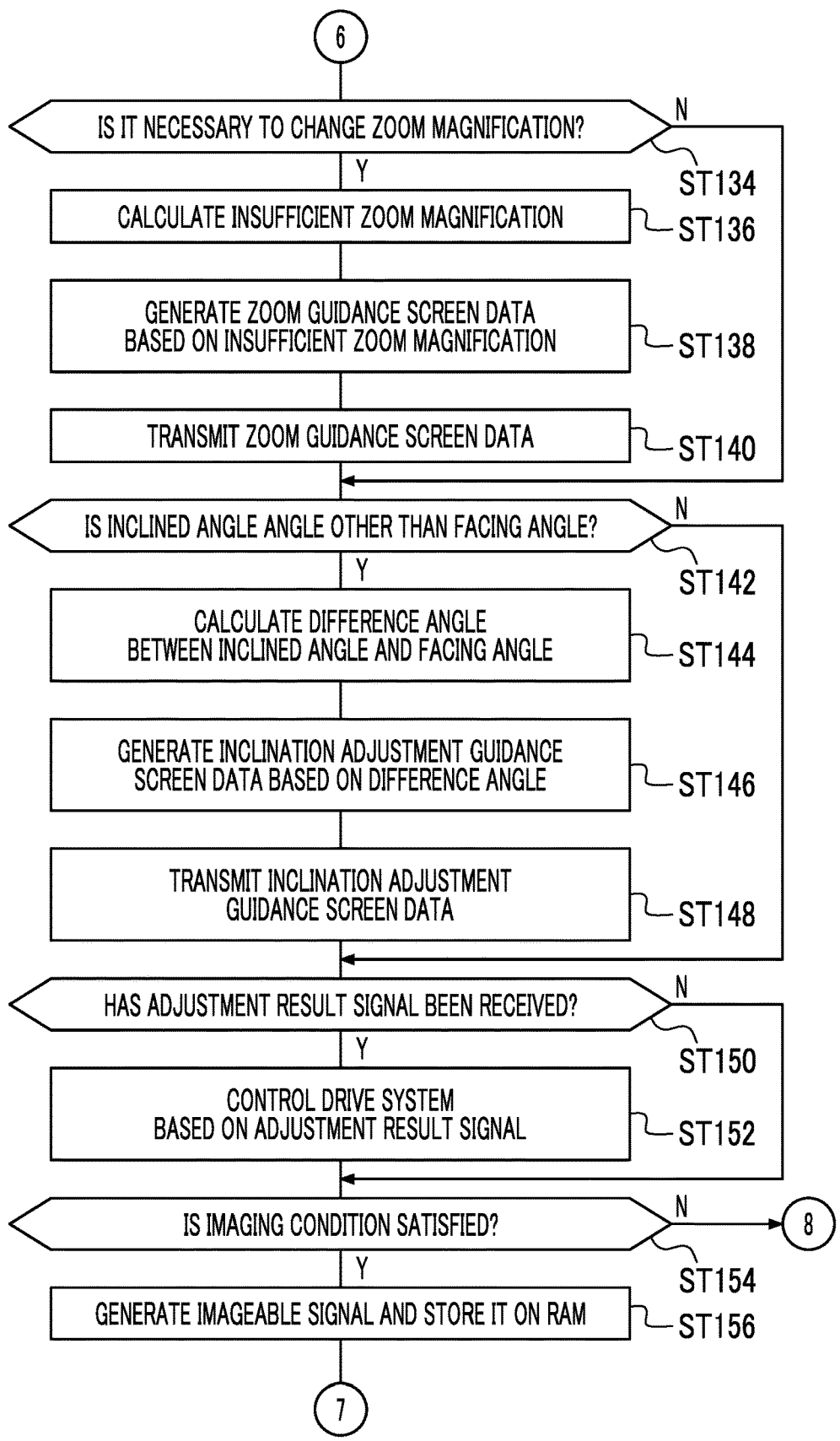
FIG. 45C is the continuation of the flowchart illustrated in FIG. 45B.

On condition that the processing of Step ST26 is executed, the processing of Step ST132, the processing of Step ST140, and/or the processing of Step ST148 are executed in the inspection support processing illustrated in FIGS. 45B and 45C. By executing the processing of Step ST132, the movement guidance screen data 218 (refer to FIG. 24) is transmitted to the tablet terminal 32 from the information processing apparatus 30. By executing the processing of Step ST140, the zoom guidance screen data 220 (refer to FIG. 27) is transmitted to the tablet terminal 32 from the information processing apparatus 30. By executing the processing of Step ST148, the inclination adjustment guidance screen data 222 (refer to FIG. 31) is transmitted to the tablet terminal 32 from the information processing apparatus 30.

In Step ST28, the determination unit 78B determines whether or not the movement guidance screen data 218 has been received by the reception unit 78E (refer to FIG. 26). In Step ST28, in a case in which the movement guidance screen data 218 has not been received by the reception unit 78E, the determination is a negative determination, and the tablet side processing proceeds to Step ST36 illustrated in FIG. 44B. In Step ST28, in a case in which the movement guidance screen data 218 has been received by the reception unit 78E, the determination is an affirmative determination, and the tablet side processing proceeds to Step ST30.

In Step ST30, the display control unit 78A displays the movement guidance screen 190 indicated by the movement guidance screen data 218 received by the reception unit 78E, on the touch panel display 72 (refer to FIG. 26). After the processing of Step ST30 is executed, the tablet side processing proceeds to Step ST32.

In Step ST32, the determination unit 78B determines whether or not the adjustment instruction has been given to the movement guidance screen 190 (refer to FIG. 26) displayed on the touch panel display 72. Here, the adjustment instruction refers to, for example, a tap on the marks 190A1 to 190A (refer to FIG. 26) of the instruction reception region 190A. In Step ST32, in a case in which the adjustment instruction has not been given to the movement guidance screen 190, the determination is a negative determination, and the determination of Step ST32 is performed again. In Step ST32, in a case in which the adjustment instruction has been given to the movement guidance screen 190, the determination is an affirmative determination, and the tablet side processing proceeds to Step ST34.

In Step ST34, the adjustment value calculation unit 78F calculates the adjustment value according to the adjustment instruction given to the movement guidance screen 190 (refer to FIG. 26) (refer to FIG. 34). After the processing of Step ST34 is executed, the tablet side processing proceeds to Step ST36 illustrated in FIG. 44B.

In Step ST36 illustrated in FIG. 44B, the determination unit 78B determines whether or not the zoom guidance screen data 220 has been received by the reception unit 78E (refer to FIG. 30). In Step ST36, in a case in which the zoom guidance screen data 220 has not been received by the reception unit 78E, the determination is a negative determination, and the tablet side processing proceeds to Step ST44. In Step ST36, in a case in which the zoom guidance screen data 220 has been received by the reception unit 78E, the determination is an affirmative determination, and the tablet side processing proceeds to Step ST38.

In Step ST38, the display control unit 78A displays the zoom guidance screen indicated by the zoom guidance screen data 220 received by the reception unit 78E, on the touch panel display 72 (refer to FIG. 30). After the processing of Step ST38 is executed, the tablet side processing proceeds to Step ST40.

In Step ST40, the determination unit 78B determines whether or not the adjustment instruction has been given to the zoom guidance screen (refer to FIG. 30) displayed on the touch panel display 72. Here, the adjustment instruction refers to, for example, a pinch-out operation and/or a pinch-in operation with respect to the instruction reception region 192A or 194A. In Step ST40, in a case in which the adjustment instruction has not been given to the zoom guidance screen, the determination is a negative determination, and the determination of Step ST40 is performed again. In Step ST40, in a case in which the adjustment instruction has been given to the zoom guidance screen, the determination is an affirmative determination, and the tablet side processing proceeds to Step ST42.

In Step ST42, the adjustment value calculation unit 78F calculates the adjustment value according to the adjustment instruction given to the zoom guidance screen (refer to FIG. 30) (refer to FIG. 34). After the processing of Step ST42 is executed, the tablet side processing proceeds to Step ST44.

In Step ST44, the determination unit 78B determines whether or not the inclination adjustment guidance screen data 222 has been received by the reception unit 78E (refer to FIG. 33). In Step ST44, in a case in which the inclination adjustment guidance screen data 222 has not been received by the reception unit 78E, the determination is a negative determination, and the tablet side processing proceeds to Step ST52. In Step ST44, in a case in which the inclination adjustment guidance screen data 222 has been received by the reception unit 78E, the determination is an affirmative determination, and the tablet side processing proceeds to Step ST46.

In Step ST46, the display control unit 78A displays the inclination adjustment guidance screen 196 indicated by the inclination adjustment guidance screen data 222 received by the reception unit 78E, on the touch panel display 72 (refer to FIG. 33). After the processing of Step ST46 is executed, the tablet side processing proceeds to Step ST48.

In Step ST48, the determination unit 78B determines whether or not the adjustment instruction has been given to the inclination adjustment guidance screen 196 (refer to FIG. 33) displayed on the touch panel display 72. Here, the adjustment instruction refers to, for example, a pinch-out operation and/or a pinch-in operation with respect to the instruction reception region 196A (refer to FIG. 33). In Step ST48, in a case in which the adjustment instruction has not been given to the inclination adjustment guidance screen 196, the determination is a negative determination, and the determination of Step ST48 is performed again. In Step ST48, in a case in which the adjustment instruction has been given to the inclination adjustment guidance screen 196, the determination is an affirmative determination, and the tablet side processing proceeds to Step ST50.

In Step ST50, the adjustment value calculation unit 78F calculates the adjustment value according to the adjustment instruction given to the inclination adjustment guidance screen 196 (refer to FIG. 33) (refer to FIG. 34). After the processing of Step ST50 is executed, the tablet side processing proceeds to Step ST52.

In Step ST52, the determination unit 78B determines whether or not the adjustment value has been calculated in at least one processing of the processing of Step ST34, the processing of Step ST42, or the processing of Step ST50. In Step ST52, in a case in which the adjustment value has not been calculated in at least one processing of the processing of Step ST34, the processing of Step ST42, or the processing of Step ST50, the determination is a negative determination, and the tablet side processing proceeds to Step ST58 illustrated in FIG. 44C. In Step ST52, in a case in which the adjustment value has not been calculated in at least one processing of the processing of Step ST34, the processing of Step ST42, or the processing of Step ST50, the determination is an affirmative determination, and the tablet side processing proceeds to Step ST54.

In Step ST54, the signal generation unit 78C generates an adjustment result signal (refer to FIG. 34). After the processing of Step ST54 is executed, the tablet side processing proceeds to Step ST56.

In Step ST56, the transmission unit 78D transmits the adjustment result signal generated in Step ST54 to the information processing apparatus 30 (refer to FIG. 34). After the processing of Step ST56 is executed, the tablet side processing proceeds to Step ST58 illustrated in FIG. 44C.

Figure 45D:
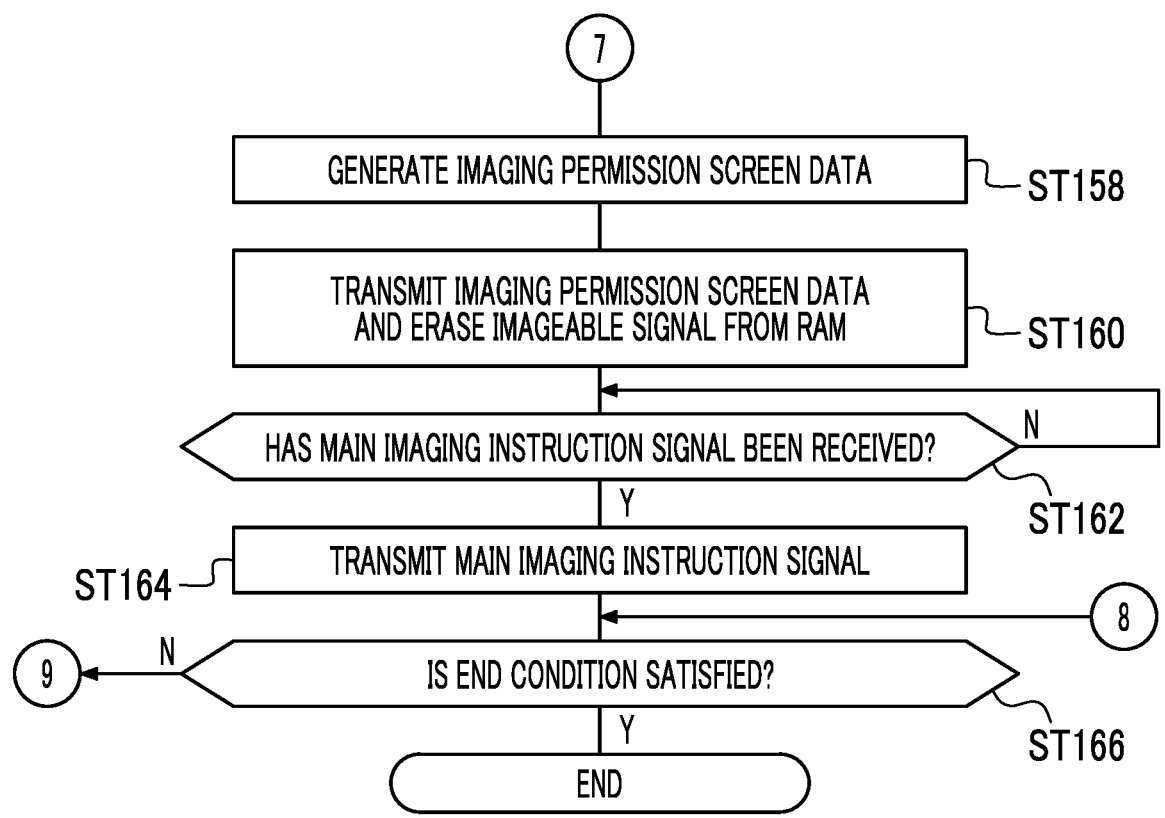
FIG. 45D is the continuation of the flowchart illustrated in FIG. 45C.

On condition that the processing of Step ST56 is executed, the imaging permission screen data 224 (refer to FIG. 37) is transmitted to the tablet terminal 32 from the information processing apparatus 30 in the inspection support processing illustrated in FIG. 45D by executing the processing of Step ST160.

In Step ST58 illustrated in FIG. 44C, the determination unit 78B determines whether or not the imaging permission screen data 224 transmitted from the information processing apparatus 30 has been received by the reception unit 78E (refer to FIG. 39). In Step ST58, in a case in which the imaging permission screen data 224 has not been received by the reception unit 78E, the determination is a negative determination, and the determination of Step ST58 is performed again. In Step ST58, in a case in which the imaging permission screen data 224 has been received by the reception unit 78E, the determination is an affirmative determination, and the tablet side processing proceeds to Step ST60.

In Step ST60, the display control unit 78A displays the imaging permission screen 186 indicated by the imaging permission screen data 224 received by the reception unit 78E, on the touch panel display 72 (refer to FIG. 39). After the processing of Step ST60 is executed, the tablet side processing proceeds to Step ST62.

In Step ST62, the determination unit 78B determines whether or not the imaging instruction reception region 186A in the imaging permission screen 186, which is displayed on the touch panel display 72, has been tapped (refer to FIG. 40). In Step ST62, in a case in which the imaging instruction reception region 186A has not been tapped, the determination is a negative determination, and the determination of Step ST62 is performed again. In Step ST62, in a case in which the imaging instruction reception region 186A has been tapped, the determination is an affirmative determination, and the tablet side processing proceeds to Step ST64.

In Step ST64, the signal generation unit 78C generates the main imaging instruction signal (refer to FIG. 40). After the processing of Step ST64 is executed, the tablet side processing proceeds to Step ST66.

In Step ST66, the transmission unit 78D transmits the main imaging instruction signal generated in Step ST64 to the information processing apparatus 30 (refer to FIG. 40). After the processing of Step ST66 is executed, the tablet side processing proceeds to Step ST68.

In Step ST68, the determination unit 78B determines whether or not a condition for ending the tablet side processing (hereinafter, referred to as "tablet side processing end condition") is satisfied. A first example of the tablet side processing end condition includes a condition that an instruction to end the tablet side processing is received by the touch panel display 72. A second example of the tablet side processing end condition includes a condition that a predetermined time (for example, 15 minutes) has elapsed without executing the processing of Step ST66 after the execution of the tablet side processing is started.

In Step ST68, in a case in which the tablet side processing end condition is not satisfied, the determination is a negative determination, and the tablet side processing proceeds to Step ST14 shown in FIG. 44A. In Step ST68, in a case in which the tablet side processing end condition is satisfied, the determination is an affirmative determination, and the tablet side processing ends.

Next, the inspection support processing performed by the processor 62 of the information processing apparatus 30 will be explained with reference to FIGS. 45A to 45D. In FIGS. 45A to 45D, an example of a flow of inspection support processing performed by the processor 62 is illustrated.

In the inspection support processing illustrated in FIG. 45A, first, in Step ST100, the determination unit 62B determines whether or not the distance measurement instruction signal transmitted from the tablet terminal 32 has been received by the reception unit 62A by executing the processing of Step ST16 illustrated in FIG. 44A (refer to FIG. 15). In Step ST100, in a case in which the distance measurement instruction signal has not been received by the reception unit 62A, the determination is a negative determination, and the inspection support processing proceeds to Step ST108. In Step ST100, in a case in which the distance measurement instruction signal has been received by the reception unit 62A, the determination is an affirmative determination, and the inspection support processing proceeds to Step ST102.

In Step ST102, the imaging apparatus control unit 62C transmits the distance measurement instruction signal received by the reception unit 62A to the imaging apparatus 34 (refer to FIG. 15). After the processing of Step ST102 is executed, the inspection support processing proceeds to Step ST104.

Figure 46:
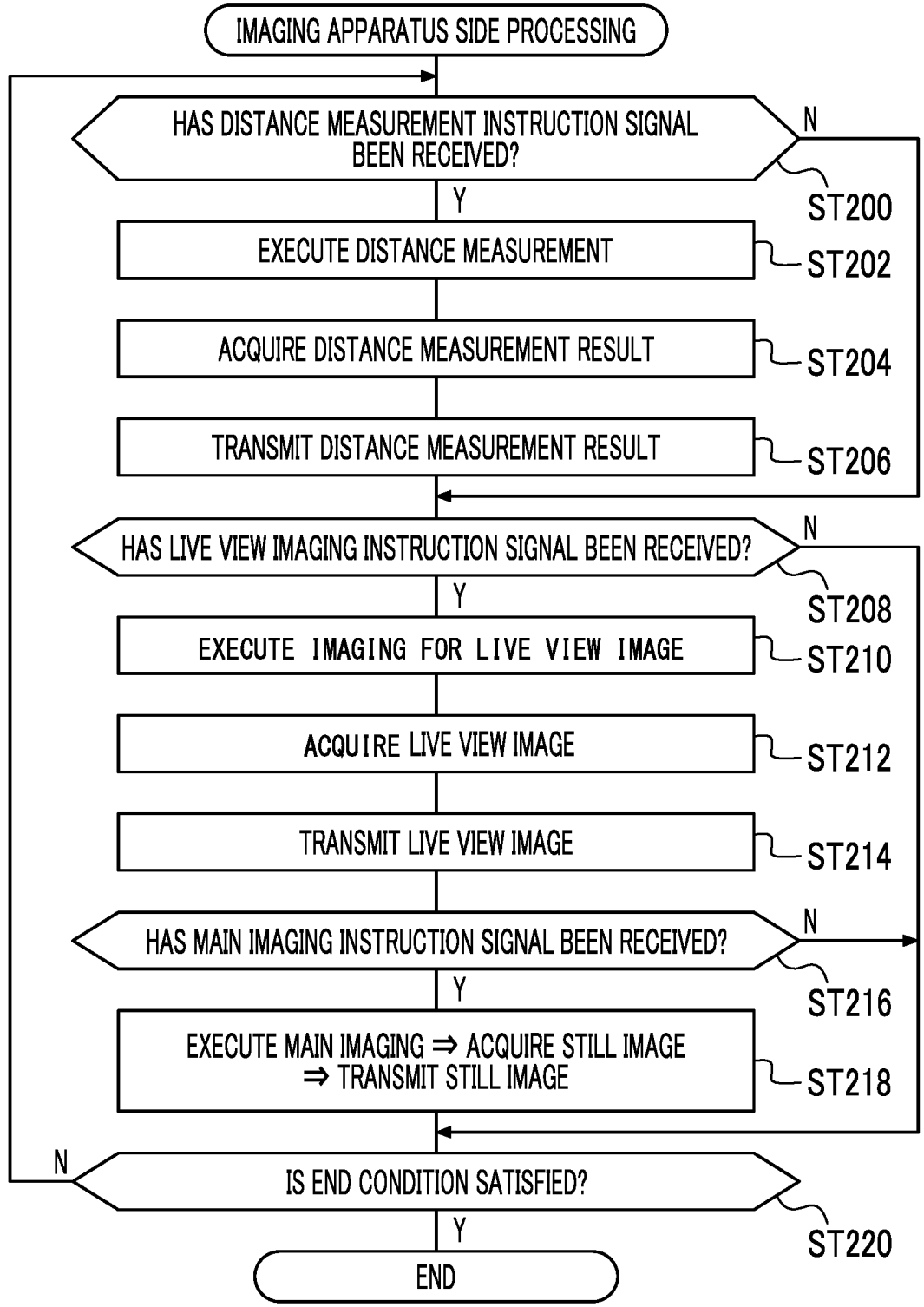
FIG. 46 is a flowchart illustrating an example of a flow of imaging apparatus side processing.

On condition that the processing of Step ST102 is executed, the distance measurement result 150 is transmitted to the information processing apparatus 30 from the imaging apparatus 34 in the imaging apparatus side processing illustrated in FIG. 46 by executing the processing of Step ST206 (refer to FIGS. 5 and 16).

In Step ST104, the determination unit 62B determines whether or not the distance measurement result 150 transmitted from the imaging apparatus 34 has been received by the reception unit 62A (refer to FIG. 16). In Step ST104, in a case in which the distance measurement result 150 has not been received by the reception unit 62A, the determination is a negative determination, and the determination of Step ST104 is performed again. In Step ST104, in a case in which the distance measurement result 150 has been received by the reception unit 62A, the determination is an affirmative determination, and the inspection support processing proceeds to Step ST106.

In Step ST106, the acquisition unit 62G acquires the distance measurement result 150 received by the reception unit 62A, and overwrites and stores the acquired distance measurement result 150 in the RAM 66 (refer to FIG. 16). After the processing of Step ST106 is executed, the inspection support processing proceeds to Step ST108.

In Step ST108, the determination unit 62B determines whether or not the live view imaging instruction signal transmitted from the tablet terminal 32 has been received by the reception unit 62A by executing the processing of Step ST16 illustrated in FIG. 44A (refer to FIG. 17). In Step ST108, in a case in which the live view imaging instruction signal has not been received by the reception unit 62A, the determination is a negative determination, and the inspection support processing proceeds to Step ST100. In Step ST108, in a case in which the live view imaging instruction signal has been received by the reception unit 62A, the determination is an affirmative determination, and the inspection support processing proceeds to Step ST110.

In Step ST110, the imaging apparatus control unit 62C transmits the live view imaging instruction signal received by the reception unit 62A to the imaging apparatus 34 (refer to FIG. 17). After the processing of Step ST110 is executed, the inspection support processing proceeds to Step ST112.

On condition that the processing of Step ST110 is executed, the live view image 198 is transmitted to the information processing apparatus 30 from the imaging apparatus 34 in the imaging apparatus side processing illustrated in FIG. 46 by executing the processing of Step ST214 (refer to FIG. 18).

In Step ST112, the determination unit 62B determines whether or not the live view image 198 transmitted from the imaging apparatus 34 has been received by the reception unit 62A (refer to FIG. 18). In Step ST112, in a case in which the live view image 198 has not been received by the reception unit 62A, the determination is a negative determination, and the determination of Step ST112 is performed again. In Step ST112, in a case in which the live view image 198 has been received by the reception unit 62A, the determination is an affirmative determination, and the inspection support processing proceeds to Step ST114.

In Step ST114, the acquisition unit 62G acquires the live view image 198 received by the reception unit 62A, and overwrites and stores the acquired live view image 198 in the RAM 66 (refer to FIG. 18). After the processing of Step ST114 is executed, the inspection support processing proceeds to Step ST116.

In Step ST116, the screen generation unit 62D generates the imaging start screen data 200 (refer to FIG. 18). After the processing of Step ST116 is executed, the inspection support processing proceeds to Step ST118.

In Step ST118, the transmission unit 62H transmits the imaging start screen data 200 generated in Step ST116 to the tablet terminal 32 (refer to FIG. 18). After the processing of Step ST118 is executed, the inspection support processing proceeds to Step ST120 illustrated in FIG. 45B.

In Step ST120 illustrated in FIG. 45B, the determination unit 62B determines whether or not the imaging condition confirmation signal transmitted from the tablet terminal 32 has been received by the reception unit 62A by executing the processing of Step ST26 illustrated in FIG. 44A (refer to FIG. 23). In Step ST120, in a case in which the imaging condition confirmation signal has not been received by the reception unit 62A, the determination is a negative determination, and the determination of Step ST120 is performed again. In Step ST120, in a case in which the imaging condition confirmation signal has been received by the reception unit 62A, the determination is an affirmative determination, and the inspection support processing proceeds to Step ST122.

In Step ST122, the acquisition unit 62G acquires the pre-captured image 202 from the storage 64 and acquires the live view image 198 and the distance measurement result 150 from the RAM 66 (refer to FIG. 23). After the processing of Step ST122 is executed, the inspection support processing proceeds to Step ST124.

In Step ST124, the calculation unit 62E calculates the overlap ratio, the zoom magnification, and the inclined angle using the pre-captured image 202, the live view image 198, and the distance measurement result 150, which are acquired in Step ST122 (refer to FIG. 23). After the processing of Step ST124 is executed, the inspection support processing proceeds to Step ST126.

In Step ST126, the determination unit 62B determines whether or not the overlap ratio calculated in Step ST124 is outside the predetermined range (refer to FIG. 24). In Step ST126, in a case in which the overlap ratio is within the predetermined range, the determination is a negative determination, and the inspection support processing proceeds to Step ST134 illustrated in FIG. 45C. In Step ST126, in a case in which the overlap ratio is outside the predetermined range, the determination is an affirmative determination, and the inspection support processing proceeds to Step ST128.

In Step ST128, the calculation unit 62E calculates the movement direction and the movement amount that can keep the overlap ratio within the predetermined range as the movement direction and the movement amount of the imaging range by the imaging apparatus 34 (refer to FIG. 24). After the processing of Step ST128 is executed, the inspection support processing proceeds to Step ST130.

In Step ST130, the screen generation unit 62D generates the movement guidance screen data 218 based on the movement direction and the movement amount calculated in Step ST128 (refer to FIG. 24). After the processing of Step ST130 is executed, the inspection support processing proceeds to Step ST132.

In Step ST132, the transmission unit 62H transmits the movement guidance screen data 218 generated in Step ST130 to the tablet terminal 32 (refer to FIG. 24). After the processing of Step ST132 is executed, the inspection support processing proceeds to Step ST134 illustrated in FIG. 45C.

In Step ST134 illustrated in FIG. 45C, the determination unit 62B determines whether or not it is necessary to change the zoom magnification of the imaging apparatus 34 with reference to the zoom magnification calculated in Step ST124 (refer to FIG. 27). In Step ST134, in a case in which the change of the zoom magnification is not necessary, the determination is a negative determination, and the inspection support processing proceeds to Step ST142. In Step ST134, in a case in which the change of the zoom magnification is necessary, the determination is an affirmative determination, and the inspection support processing proceeds to Step ST136.

In Step ST136, the calculation unit 62E calculates the insufficient zoom magnification (refer to FIG. 27). After the processing of Step ST136 is executed, the inspection support processing proceeds to Step ST138.

In Step ST138, the screen generation unit 62D generates the zoom guidance screen data 220 based on the insufficient zoom magnification calculated in Step ST136 (refer to FIG. 27). After the processing of Step ST138 is executed, the inspection support processing proceeds to Step ST140.

In Step ST140, the transmission unit 62H transmits the zoom guidance screen data 220 generated in Step ST138 to the tablet terminal 32 (refer to FIG. 27). After the processing of Step ST140 is executed, the inspection support processing proceeds to Step ST142.

In Step ST142, the determination unit 62B determines whether or not the inclined angle calculated in Step ST124 is an angle other than the facing angle (refer to FIG. 31). In Step ST142, in a case in which the inclined angle is the facing angle, the determination is a negative determination, and the inspection support processing proceeds to Step ST150. In Step ST142, in a case in which the inclined angle is an angle other than the facing angle, the determination is an affirmative determination, and the inspection support processing proceeds to Step ST144.

In Step ST144, the calculation unit 62E calculates a difference angle, which is an angle of difference between the inclined angle and the facing angle calculated in Step ST124 (refer to FIG. 31). After the processing of Step ST144 is executed, the inspection support processing proceeds to Step ST146.

In Step ST146, the screen generation unit 62D generates the inclination adjustment guidance screen data 222 based on the difference angle calculated in Step ST144 (refer to FIG. 31). After the processing of Step ST146 is executed, the inspection support processing proceeds to Step ST148.

In Step ST148, the transmission unit 62H transmits the inclination adjustment guidance screen data 222 generated in Step ST146 to the tablet terminal 32 (refer to FIG. 31). After the processing of Step ST148 is executed, the inspection support processing proceeds to Step ST150.

In Step ST150, the determination unit 62B determines whether or not the adjustment result signal transmitted from the tablet terminal 32 has been received by the reception unit 62A by executing the processing of Step ST56 illustrated in FIG. 44B (refer to FIG. 35). In Step ST150, in a case in which the adjustment result signal has not been received by the reception unit 62A, the determination is a negative determination, and the inspection support processing proceeds to Step ST154. In Step ST150, in a case in which the adjustment result signal has been received by the reception unit 62A, the determination is an affirmative determination, and the inspection support processing proceeds to Step ST152.

In Step ST152, the drive system control unit 62F controls the drive system 14 in accordance with the adjustment result signal received by the reception unit 62A, and the imaging apparatus control unit 62C executes the optical zoom by moving the zoom lens 98C (refer to FIG. 4) of the imaging apparatus 34 in accordance with the adjustment result signal received by the reception unit 62A along the optical axis OA (refer to FIG. 35). After the processing of Step ST152 is executed, the inspection support processing proceeds to Step ST154.

In Step ST154, the determination unit 62B determines whether or not the imaging condition necessary for executing the main imaging for creating the composite image 204 is satisfied. Here, examples of the imaging condition necessary for executing the main imaging for creating the composite image 204 include a condition that the overlap ratio is within the predetermined range, the change of the zoom magnification is not necessary, and the inclined angle is the facing angle positive (refer to FIG. 36). In Step ST154, in a case in which the imaging condition necessary for executing the main imaging for creating the composite image 204 is not satisfied, the determination is a negative determination, and the inspection support processing proceeds to Step ST166 illustrated in FIG. 45D. In Step ST154, in a case in which the imaging condition necessary for executing the main imaging for creating the composite image 204 is satisfied, the determination is an affirmative determination, and the inspection support processing proceeds to Step ST156.

In Step ST156, the signal generation unit 62J generates the imageable signal and stores the generated imageable signal in the RAM 66 (refer to FIG. 36). After the processing of Step ST156 is executed, the inspection support processing proceeds to Step ST158 illustrated in FIG. 45D.

In Step ST158 illustrated in FIG. 45D, the screen generation unit 62D generates the imaging permission screen data 224 (refer to FIG. 37). That is, the screen generation unit 62D generates the imaging permission screen data 224 on condition that the imageable signal is stored in the RAM 66. After the processing of Step ST158 is executed, the inspection support processing proceeds to Step ST160.

In Step ST160, the transmission unit 62H transmits the imaging permission screen data 224 generated in Step ST158 to the tablet terminal 32 and erases the imageable signal from the RAM 66 (refer to FIG. 37). After the processing of Step ST160 is executed, the inspection support processing proceeds to Step ST162.

In Step ST162, the determination unit 62B determines whether or not the main imaging instruction signal transmitted from the tablet terminal 32 has been received by the reception unit 62A by executing the processing of Step ST66 illustrated in FIG. 44C (refer to FIG. 41). In Step ST162, in a case in which the main imaging instruction signal has not been received by the reception unit 62A, the determination is a negative determination, and the determination of Step ST162 is performed again. In Step ST162, in a case in which the main imaging instruction signal has been received by the reception unit 62A, the determination is an affirmative determination, and the inspection support processing proceeds to Step ST164.

In Step ST164, the imaging apparatus control unit 62C transmits the main imaging instruction signal received by the reception unit 62A to the imaging apparatus 34 (refer to FIG. 41). After the processing of Step ST164 is executed, the inspection support processing proceeds to Step ST166.

In Step ST166, the determination unit 62B determines whether or not a condition for ending the inspection support processing (hereinafter, referred to as "inspection support processing end condition") is satisfied. A first example of the inspection support processing end condition includes a condition that an instruction to end the inspection support processing is given to the information processing apparatus 30. A second example of the inspection support processing end condition includes a condition that the predetermined time (for example, 15 minutes) has elapsed without executing the processing of Step ST164 after the execution of the inspection support processing is started.

In Step ST166, in a case in which the inspection support processing end condition is not satisfied, the determination is a negative determination, and the inspection support processing proceeds to Step ST100 illustrated in FIG. 45A. In Step ST166, in a case in which the inspection support processing end condition is satisfied, the determination is an affirmative determination, and the inspection support processing ends.

Next, the imaging apparatus side processing performed by the processor 132 of the imaging apparatus 34 will be explained with reference to FIG. 46. In FIG. 46, an example of a flow of the imaging apparatus side processing performed by the processor 132 is illustrated.

In the imaging apparatus side processing illustrated in FIG. 46, first, in Step ST200, the distance measurement system control unit 132C determines whether or not the distance measurement instruction signal transmitted from the information processing apparatus 30 has been received by the reception unit 132A by executing the processing of Step ST102 illustrated in FIG. 45A. In Step ST200, in a case in which the distance measurement instruction signal has not been received by the reception unit 132A, the determination is a negative determination, and the imaging apparatus side processing proceeds to Step ST208. In Step ST200, in a case in which the distance measurement instruction signal has been received by the reception unit 132A, the determination is an affirmative determination, and the imaging apparatus side processing proceeds to Step ST202.

In Step ST202, the distance measurement system control unit 132C causes the 3D sensor 38 (refer to FIGS. 1 and 5) to execute distance measurement (refer to FIGS. 15 and 16). After the processing of Step ST202 is executed, the imaging apparatus side processing proceeds to Step ST204.

In Step ST204, the distance measurement system control unit 132C acquires the distance measurement result 150 from the 3D sensor 38 (refer to FIG. 16). After the processing of Step ST204 is executed, the imaging apparatus side processing proceeds to Step ST206.

In Step ST206, the transmission unit 132D transmits the distance measurement result 150 acquired in Step ST204 to the information processing apparatus 30 (refer to FIG. 16). After the processing of Step ST206 is executed, the imaging apparatus side processing proceeds to Step ST208.

In Step ST208, the imaging system control unit 132B determines whether or not the live view imaging instruction signal transmitted by executing the processing of Step ST110 illustrated in FIG. 45A has been received by the reception unit 132A. In Step ST208, in a case in which the live view imaging instruction signal has not been received by the reception unit 132A, the determination is a negative determination, and the imaging apparatus side processing proceeds to Step ST220. In Step ST208, in a case in which the live view imaging instruction signal has been received by the reception unit 132A, the determination is an affirmative determination, and the imaging apparatus side processing proceeds to Step ST210.

In Step ST210, the imaging system control unit 132B executes imaging for a live view image (refer to FIGS. 17 and 18). After the processing of Step ST210 is executed, the imaging apparatus side processing proceeds to Step ST212.

In Step ST212, the imaging system control unit 132B acquires the live view image 198 (refer to FIG. 18). After the processing of Step ST212 is executed, the imaging apparatus side processing proceeds to Step ST214.

In Step ST214, the transmission unit 132D transmits the live view image 198 acquired in Step ST212 to the information processing apparatus 30 (refer to FIG. 18). After the processing of Step ST214 is executed, the imaging apparatus side processing proceeds to Step ST216.

In Step ST216, the imaging system control unit 132B determines whether or not the main imaging instruction signal transmitted from the information processing apparatus 30 by executing the processing of Step ST164 illustrated in FIG. 45D has been received by the reception unit 132A. In Step ST216, in a case in which the main imaging instruction signal has not been received by the reception unit 132A, the determination is a negative determination, and the imaging apparatus side processing proceeds to Step ST220. In Step ST216, in a case in which the main imaging instruction signal has been received by the reception unit 132A, the determination is an affirmative determination, and the imaging apparatus side processing proceeds to Step ST218.

In Step ST218, the imaging system control unit 132B acquires the still image 206 by executing the main imaging. Then, the transmission unit 132D transmits the still image 206 acquired by the imaging system control unit 132B to the information processing apparatus 30. After the processing of Step ST218 is executed, the imaging apparatus side processing proceeds to Step ST220.

The still image 206, which is transmitted to the information processing apparatus 30 by performing the processing Step ST218 is composed with the pre-captured image 202 by the composition unit 62I of the information processing apparatus 30 to join them into a panoramic image, and the composite image 204 is generated (refer to FIG. 42). In addition, in the information processing apparatus 30, screen data 226 including a composite image is transmitted to the tablet terminal 32 by the screen generation unit 62D based on the composite image 204 obtained by the composition unit 62I (refer to FIG. 42). In the tablet terminal 32, the touch panel display 72 displays the screen containing a composite image indicated by the screen data 226 including a composite image. The composite image 204 is displayed on the screen containing a composite image (refer to FIG. 43). The composite image 204 is enlarged or reduced according to an instruction given to the touch panel display 72 (refer to FIG. 43).

In Step ST220, the imaging system control unit 132B determines whether or not a condition for ending the imaging apparatus side processing (hereinafter, referred to as "imaging apparatus side processing end condition") is satisfied. A first example of the imaging apparatus side processing end condition includes a condition that an instruction to end the imaging apparatus side processing is given to the imaging apparatus 34. A second example of the imaging apparatus side processing end condition includes a condition that the predetermined time (for example, 15 minutes) has elapsed without executing the processing of Step ST218 after the execution of the imaging apparatus side processing is started.

In Step ST220, in a case in which the imaging apparatus side processing end condition is not satisfied, the determination is a negative determination, and the imaging apparatus side processing proceeds to Step ST200. In Step ST200, in a case in which the imaging apparatus side processing end condition is satisfied, the determination is an affirmative determination, and the imaging apparatus side processing ends.

As explained above, in the information processing apparatus 30, the imageable signal is set based on the captured image 127 and the distance measurement result 150. The imageable signal is a signal indicating that the main imaging by the imaging apparatus 34 is determined to be executable. In the information processing apparatus 30, in a case in which the imageable signal is set, the imaging permission screen data 224 indicating the imaging permission screen 186 including the imaging instruction reception region 186A is transmitted to the tablet terminal 32. Then, in a case in which the imaging instruction reception region 186A included in the imaging permission screen 186 displayed on the touch panel display 72 of the tablet terminal 32 is tapped, the main imaging instruction signal indicating the instruction to make the imaging apparatus 34 to execute the main imaging with respect to the imaging scene illustrated by the live view image 198 is transmitted to the imaging apparatus 34. In the imaging apparatus 34, the main imaging is executed on condition that the main imaging instruction signal is received. Therefore, with the present configuration, as compared with a case in which the user 36 is notified of a timing determined without using either the captured image 127 or the distance measurement result 150 as an imaging timing, the imaging apparatus 34 can execute the main imaging at a good timing.

In addition, in the information processing apparatus 30, the composite image 204 is generated. The composite image 204 is an image illustrating an imaging scene wider than the imaging scene illustrated by the live view image 198. Therefore, with the present configuration, the user 36 can visually recognize a scene wider than the imaging scene illustrated by the live view image 198.

In addition, in the information processing apparatus 30, an image obtained by joining a plurality of still images 206 into a panoramic image is generated as a composite image 204. Therefore, with the present configuration, as compared with a case in which the plurality of still images 206 are sequentially displayed frame by frame, the user 36 can easily visually recognize the area where the main imaging is executed.

In addition, in the information processing apparatus 30, data indicating a screen including the composite image confirmation view region 180D1 in which the wide view region 180D is enlarged together with the composite image 204 is transmitted to the tablet terminal 32 as screen data 226 including a composite image, and the composition confirmation screen 184 is displayed on the touch panel display 72 of the tablet terminal 32 as a screen including the composite image confirmation view region 180D1. Therefore, with the present configuration, it is possible to improve the visibility of the composite image 204 as compared with a case in which the composite image 204 is not enlarged.

In addition, in the information processing apparatus 30, a distance measurement instruction signal is transmitted to the imaging apparatus 34 as a signal indicating an instruction to the imaging apparatus 34 to acquire the distance measurement result and a signal indicating an instruction to the imaging apparatus 34 to measure a distance between the inspection object 16 and the imaging apparatus 34. The imaging apparatus 34 executes distance measurement in a case in which the distance measurement instruction signal is received. Therefore, with the present configuration, it is possible to cause the imaging apparatus 34 to acquire the distance measurement result without the user 36 directly touching the imaging apparatus 34 and operating the imaging apparatus 34. In addition, it is possible to cause the imaging apparatus 34 to measure the distance between the inspection object 16 and the imaging apparatus 34 without the user 36 directly touching the imaging apparatus 34 and operating the imaging apparatus 34.

In addition, in the information processing apparatus 30, the main imaging instruction signal is transmitted to the imaging apparatus 34 on condition that the imageable signal is generated. Accordingly, the imaging apparatus 34 executes the main imaging. The imageable signal is generated on condition that the inclined angle calculated by the calculation unit 62E is the facing angle. Therefore, with the present configuration, it is possible to obtain the still image 206 having a smaller inclination than in a case in which the imageable signal is generated in a case in which the inclined angle is an angle other than the facing angle.

In addition, in the information processing apparatus 30, the main imaging instruction signal is transmitted to the imaging apparatus 34 on condition that the imageable signal is generated. Accordingly, the imaging apparatus 34 executes the main imaging. The imageable signal is generated on condition that the overlap ratio calculated by the calculation unit 62E is within the predetermined range. Therefore, with the present configuration, the occurrence of a missing part (for example, a blank region) in the composite image 204 can be suppressed as compared with a case in which the overlap ratio is not considered at all in generating the composite image 204 in which the plurality of still images 206 are joining into a panoramic image.

In addition, in the information processing apparatus 30, the determination unit 62B acquires information indicating whether or not the inclined angle is the facing angle as the information based on the distance measurement result 150 (refer to FIGS. 31 and 36). Therefore, with the present configuration, it is possible to obtain the information indicating whether or not the inclined angle is the facing angle without the user 36 directly touching the imaging apparatus 34 and operating the imaging apparatus 34.

In addition, in the information processing apparatus 30, the imaging system control unit 132B acquires the distance image 148 as information based on the distance between the inspection object 16 and the imaging apparatus 34 (refer to FIGS. 5 and 16). Therefore, it is possible to obtain the distance image 148 without the user 36 directly touching the imaging apparatus 34 and operating the imaging apparatus 34.

Figure 47:
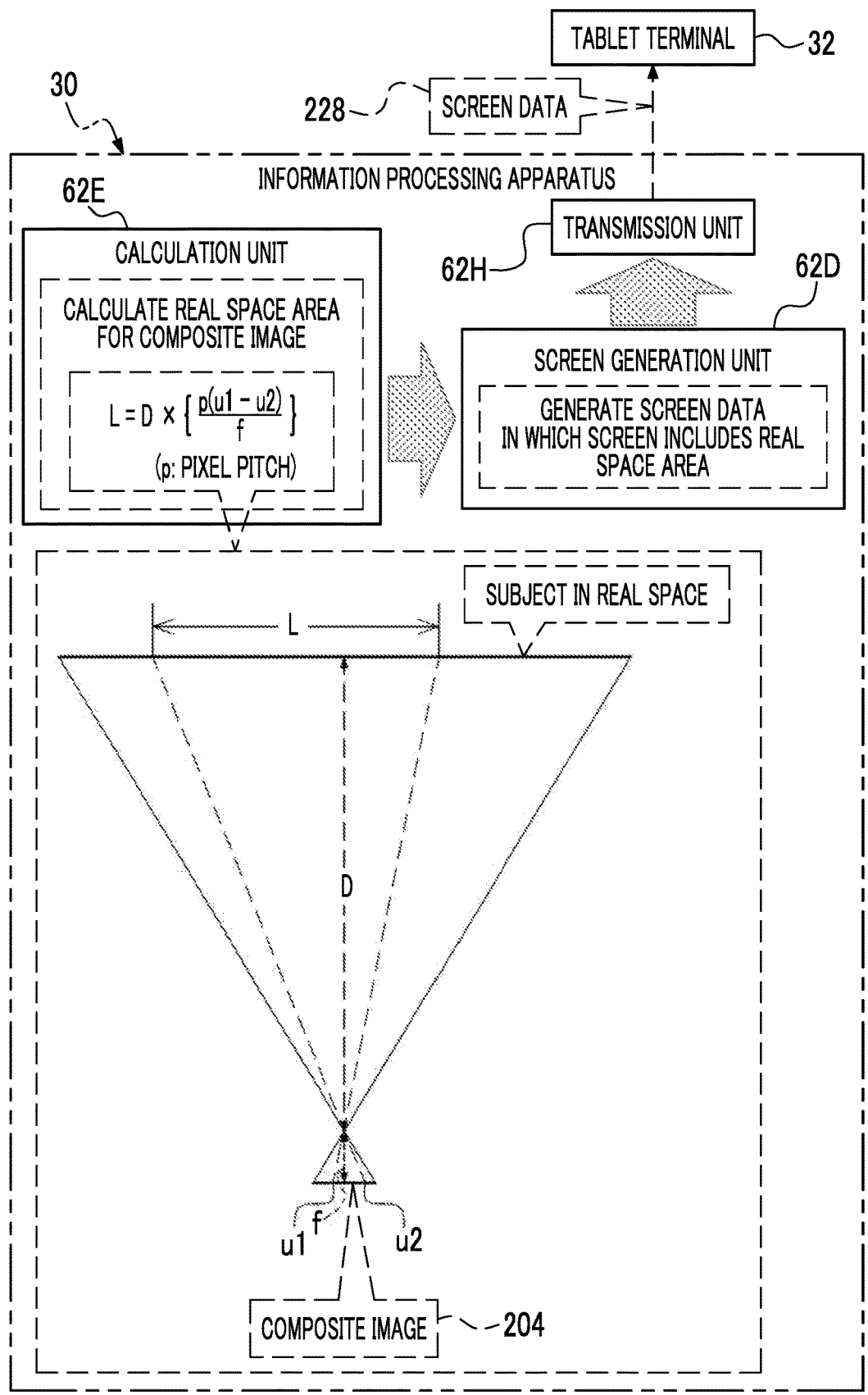
FIG. 47 is a conceptual diagram illustrating an example of a processing content until screen data in which a real space area is included in a screen is obtained.

In the above-described embodiment, although the real space area of the imaging region indicated by the composite image 204 (hereinafter, also simply referred to as "real space area") is not calculated, the real space area may be calculated by the calculation unit 62E as illustrated in FIG. 47 as an example. In this case, for example, the calculation unit 62E calculates a length L of the area in the real space included in the subject (for example, the inspection object 16) using the following Formula (1), and calculates a real space area using the calculated L. In Formula (1), L is a length of the area in real space included in the subject (for example, the inspection object 16), u1 and u2 are addresses of designated pixels in the composite image 204, D is a distance measured by the 3D sensor 38, p is a pitch between the photosensitive pixels included in the photoelectric conversion element 96, and f is a focal length of the imaging lens 98.

$$L = D \times \left\{ \frac{p(u1 - u2)}{f} \right\} \quad (1)$$

Figure 48:
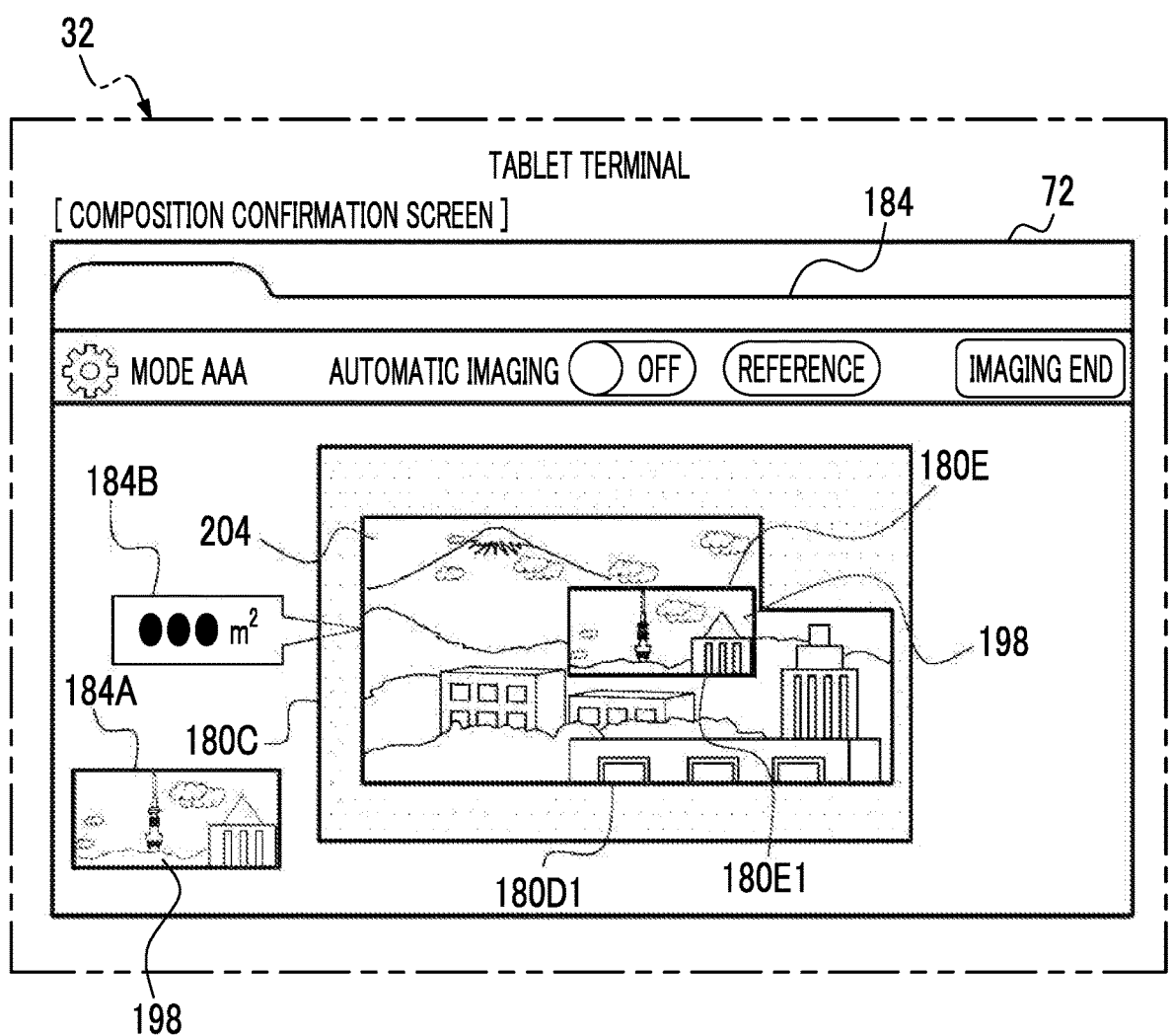
FIG. 48 is a schematic screen diagram illustrating an example of the composition confirmation screen on which the real space area is displayed.

The screen generation unit 62D generates screen data 228 indicating a screen including the real space area calculated by the calculation unit 62E. The transmission unit 62H transmits the screen data 228, which is generated by the screen generation unit 62D, to the tablet terminal 32. The screen data 228 is, for example, screen data indicating a screen including a real space area in at least one screen of the imaging start screen 180, the imaging condition adjustment screen 182, the composition confirmation screen 184, or the imaging permission screen 186 illustrated in FIG. 12. On the touch panel display 72 of the tablet terminal 32, the screen indicated by the screen data 228 is displayed. In the example illustrated in FIG. 48, the composition confirmation screen 184 including the display region 184B is illustrated as an example of the screen indicated by the screen data 228. The display region 184B is displayed in a popped-up state from the composite image confirmation view region 180D1. The real space area calculated by the calculation unit 62E is displayed in the display region 184B. Therefore, the real space area of the imaging region indicated by the composite image 204 can be grasped visually.

In the example illustrated in FIG. 47, although the screen data 228 indicating the screen including the real space area is transmitted from the information processing apparatus 30 to the tablet terminal 32, the technology of the present disclosure is not limited to this. The processor 62 of the information processing apparatus 30 may transmit the distance measurement result data for displaying the information based on the distance measurement result 150 on the touch panel display 72, to the tablet terminal 32.

In this case, for example, the screen generation unit 62D generates screen data indicating the screen including the distance measurement result data as the screen data 228, and the transmission unit 62H transmits the screen data 228 generated by the screen generation unit 62D to the tablet terminal 32.

Here, a first example of the distance measurement result data includes the distance image 148. In addition, a second example of the distance measurement result data includes a distance from the imaging apparatus 34 to a specific position (for example, a position designated by the user 36) in the inspection object 16. In addition, a third example of the distance measurement result data includes facing information indicating a determination result of whether or not the inclined angle is the facing angle. In addition, a fourth example of the distance measurement result data includes a focus area frame which is a frame indicating a focus area specified based on the distance measurement result 150.

Figure 49:
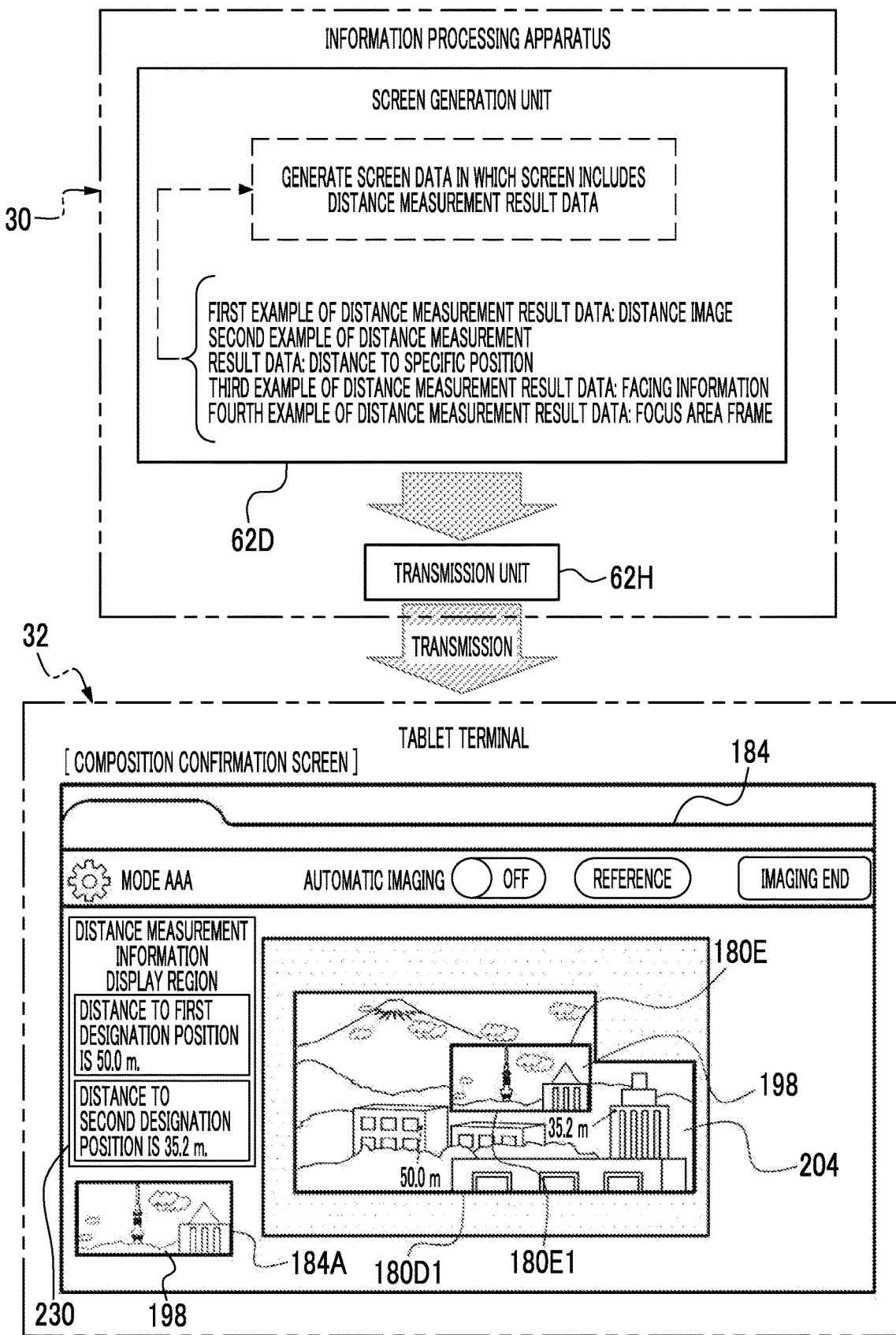
FIG. 49 is a conceptual diagram illustrating an example of a processing content until screen data in which distance measurement result data is included in the screen is obtained.
Figure 50:
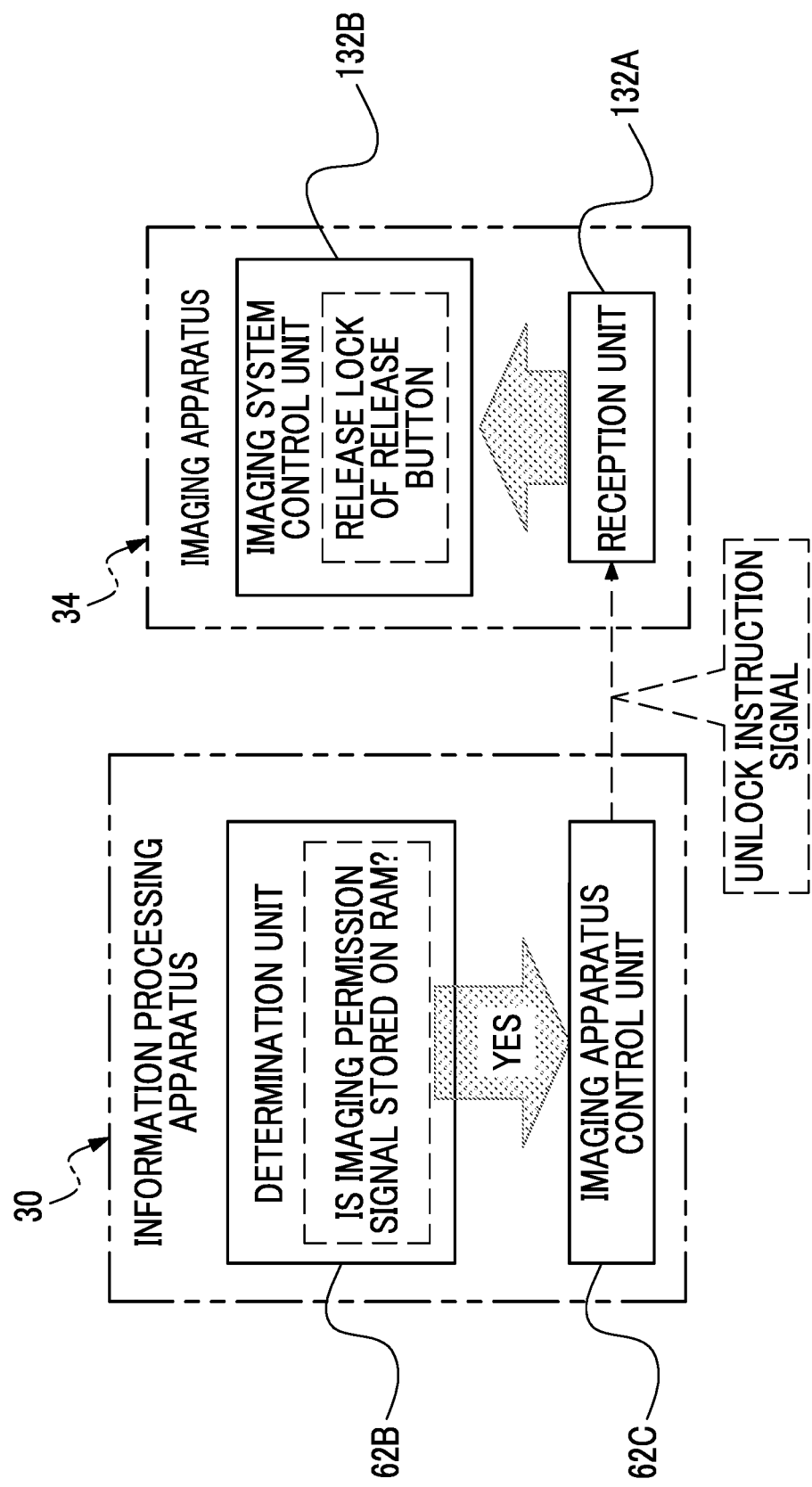
FIG. 50 is a conceptual diagram illustrating an example of a processing content performed for releasing a lock state of a release button.
Figure 51:
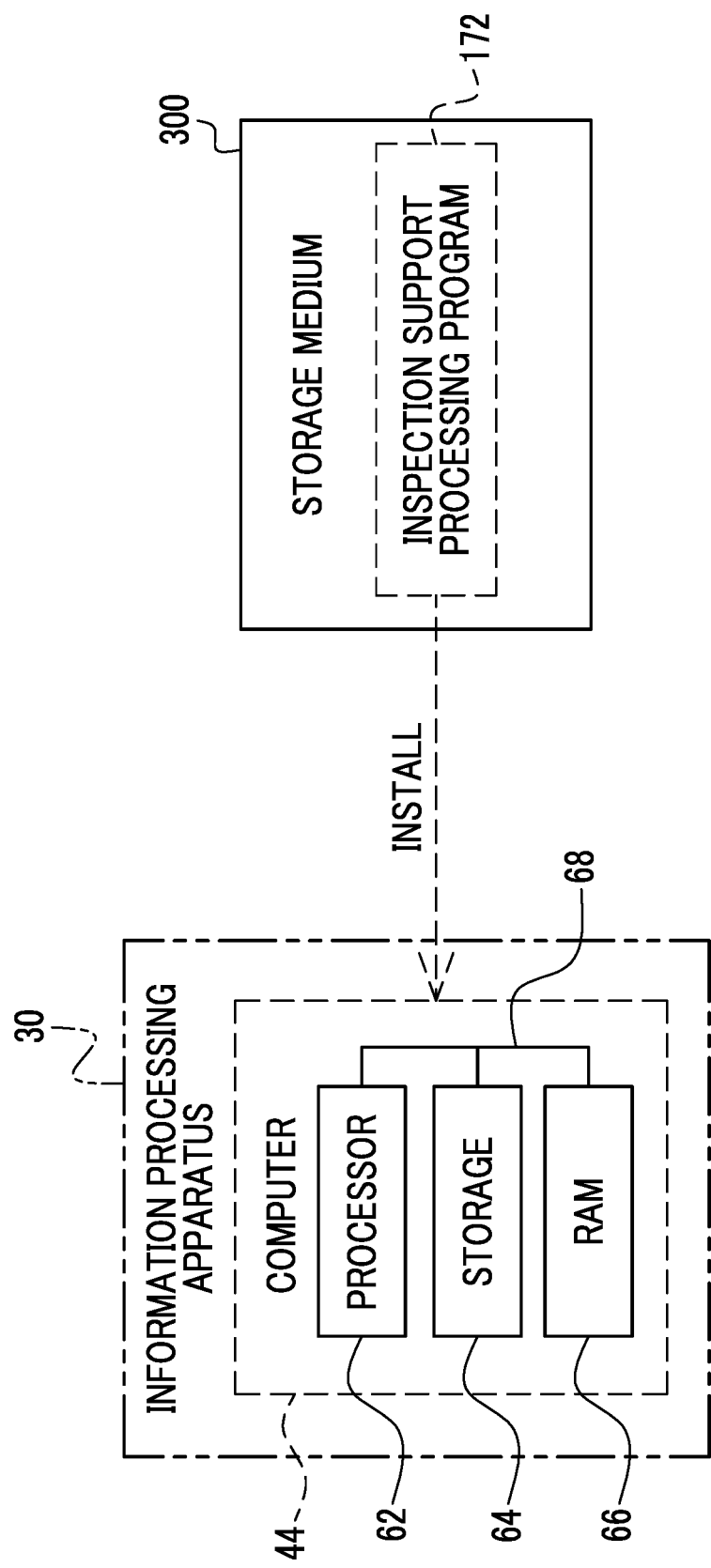
FIG. 51 is a conceptual diagram illustrating an example of an aspect in which an inspection support processing program stored in a storage medium is installed in a computer of an information processing apparatus 30.

FIG. 49 illustrates an example of an aspect in which the composition confirmation screen 184 is displayed on the touch panel display 72 as the screen indicated by the screen data 228 generated based on the distance measurement result data by the screen generation unit 62D. In the example illustrated in FIG. 49, the composition confirmation screen 184 has the distance measurement information display region 230. In the distance measurement information display region 230, information indicating a distance to a position designated by the user 36 is displayed in a message format. Accordingly, this allows the user 36 to visually recognize the distance to the position designated by the user 36. In addition, numerical values indicating a distance from the imaging apparatus 34 to a position designated by the user 36 in the composite image 204 displayed in the composite image confirmation view region 180D1 (50.0 m and 35.2 m in the example illustrated in FIG. 49) are displayed.

In the example illustrated in FIG. 49, although the message and the numerical value related to the distance are displayed on the touch panel display 72, the present disclosure is not limited to this, and the distance image 148, the facing information, and/or the focus area frame may also be displayed on the touch panel display 72. In addition, in this case, the facing information may be displayed in the distance measurement information display region 230 in a message format.

In the above-described embodiment, although the main imaging is started by tapping the imaging instruction reception region 186A, the technology of the present disclosure is not limited to this, and the main imaging may be started by operating the release button 146 (refer to FIG. 4).

In the above-described embodiment, although an example of the embodiment in which the inspection support processing is performed by the information processing apparatus 30 has been explained, the technology of the present disclosure is not limited to this. For example, the inspection support processing may be performed by the tablet terminal 32 and/or the imaging apparatus 34. In this case, the tablet terminal 32 may directly communicate with the drive system 14 and the imaging apparatus 34 without going through the information processing apparatus 30. In addition, a plurality of apparatuses (for example, the information processing apparatus 30 and the tablet terminal 32) may perform the inspection support processing in a distributed manner.

In the above-described embodiment, although an example of the embodiment in which various screens (for example, various screens illustrated in FIG. 12) are displayed on the touch panel display 72 of the tablet terminal 32 has been explained, the technology of the present disclosure is not limited to this, and various screens may be displayed on the display 48 of the information processing apparatus 30. In this case, the tablet side processing may be performed by the information processing apparatus 30.

In the above-described embodiment, although an example of the embodiment in which the instruction for the main imaging is received by the imaging instruction reception region 186A has been explained, the technology of the present disclosure is not limited to this, and the instruction for the main imaging may also be received by the release button 146. In this case, for example, the release button 146 is locked in advance so that the lock state of the release button 146 is released at a timing at which the imaging instruction reception region 186A is displayed. In order to release the lock state of the release button 146 at the timing at which the imaging instruction reception region 186A is displayed, in the information processing apparatus 30, the determination unit 62B determines whether or not an imaging permission signal has been stored in the RAM 66. In a case in which the determination unit 62B determines that the imaging permission signal has been stored in the RAM 66, the imaging apparatus control unit 62C transmits an unlock instruction signal for releasing the lock state of the release button 146 to the imaging apparatus 34. In the imaging apparatus 34, in a case in which the unlock instruction signal is received by the reception unit 132A, the imaging system control unit 132B releases the lock state of the release button 146. Accordingly, it is possible to prevent the release button 146 from being erroneously operated at a timing at which it is better not to operate the release button 146, and to operate the release button 146 at a timing at which it is permissible to operate the release button 146.

In the above-described embodiment, although the adjustment value according to the adjustment instruction given to the imaging condition adjustment screen 182 via the touch panel display 72 is calculated by the adjustment value calculation unit 78F, the technology of the present disclosure is not limited to this, and the adjustment value may be calculated directly from the misregistration amount of the imaging range, the insufficient zoom magnification, and the difference angle without using the adjustment instruction. In this case, for example, the adjustment value may be calculated from a calculation expression in which the misregistration amount, the insufficient zoom magnification, and/or the difference angle are set as independent variables, and the adjustment value is a dependent variable, or the adjustment value may be derived from a table in which the misregistration amount, the insufficient zoom magnification, and/or the difference angle are set as input and the adjustment value is set as output. Then, in the manner explained in the above-described embodiment, the imageable signal may be set on condition that the misregistration amount, the insufficient zoom magnification, and the difference angle are adjusted according to the adjustment value, by the processor 62. Even if the imageable signal is set in this way, the imaging instruction reception region 186A is displayed on the imaging permission screen 186 as in the above-described embodiment.

In the above-described embodiment, although an example of the embodiment in which the distance measurement is executed by the 3D sensor 38 has been explained, the technology of the present disclosure is not limited to this, and imaging and distance measurement may be selectively executed by an image sensor comprising an image plane phase difference type photoelectric conversion element instead of the 3D sensor 38 or with the 3D sensor 38. In this case, for example, instead of the image sensor 94, an image sensor comprising an image plane phase difference type photoelectric conversion element in which a pair of photodiodes are provided for one pixel (hereinafter, also referred to as "image plane phase difference type image sensor") may be used.

Each of the photosensitive pixels included in the photoelectric conversion element of the image plane phase difference type image sensor includes a pair of independent photodiodes. A first luminous flux obtained by performing pupil division of a luminous flux indicating a subject transmitted through the imaging lens 98 (hereinafter, also referred to as a "subject luminous flux") is incident on one photodiode of the pair of photodiodes, and a second luminous flux obtained by performing the pupil division of the subject luminous flux is incident on the other photodiode of the pair of photodiodes.

All the photosensitive pixels included in the photoelectric conversion element of the image plane phase difference type image sensor have a function of outputting data related to the imaging and the phase difference. For example, in a case in which imaging is performed in an imaging mode, the photoelectric conversion element of the image plane phase difference type image sensor outputs non-phase difference pixel data by combining the pair of photodiodes into one pixel. For example, in a case in which distance measurement is performed in a distance measurement mode, the photoelectric conversion element of the image plane phase difference type image sensor outputs phase difference pixel data from each of the pair of photodiodes.

In the photoelectric conversion element of the image plane phase difference type image sensor, the photosensitive pixels can selectively output the non-phase difference pixel data and the phase difference pixel data. The non-phase difference pixel data is pixel data obtained by performing photoelectric conversion by the entire region of the photosensitive pixels, and the phase difference pixel data is pixel data obtained by performing photoelectric conversion by a partial region of the photosensitive pixels. Here, the "entire region of the pixel" is a light-receiving region in which the pair of photodiodes are combined. In addition, the "partial region of the pixel" is a light-receiving region of the one photodiode of the pair of photodiodes or a light-receiving region of the other photodiode of the pair of photodiodes.

The captured image 127 is generated based on the non-phase difference pixel data. The distance from the imaging apparatus 34 to the inspection object 16 is calculated based on the phase difference pixel data. That is, a distance to a real space point corresponding to each pixel is calculated based on the phase difference (that is, the misregistration amount and the misregistration direction) between the image based on a signal output from the one photodiode of the pair of photodiodes and an image based on a signal output from the other photodiode of the pair of photodiodes. The distance image 148 is generated based on the distance calculated for each pixel.

The technology of the present disclosure is not limited to the feature that all the photosensitive pixels included in the photoelectric conversion element of the image plane phase difference type image sensor have the function of outputting data related to the imaging and the phase difference. That is, the photoelectric conversion element may include photosensitive pixels that do not have the function of outputting data related to the imaging and the phase difference. In addition, the photoelectric conversion element of the image sensor is not limited to the photoelectric conversion element of the image plane phase difference type in which a pair of photodiodes are provided in one pixel, and the photoelectric conversion element may be a photoelectric conversion element including a photosensitive pixel for imaging for acquiring the non-phase difference pixel data and a photosensitive pixel for phase difference detection for acquiring phase difference pixel data. In this case, the phase difference pixel is provided with a light shielding member to receive light on one of a first pupil portion region or a second pupil portion region.

In the above-described embodiment, although an example of the embodiment in which the inspection support processing program 172 is stored in the storage 64 has been explained, the technology of the present disclosure is not limited to this. For example, the inspection support processing program 172 may be stored in the portable storage medium 300 such as an SSD or a USB memory. The storage medium 300 is a non-transitory storage medium. The inspection support processing program 172 stored in the storage medium 300 is installed in the computer 44 of the information processing apparatus 30. The processor 62 performs the inspection support processing in accordance with the inspection support processing program 172.

In addition, the inspection support processing program 172 may be stored in the storage device such as another computer or server device connected to the information processing apparatus 30 through a network, and the inspection support processing program 172 may be downloaded and installed in the computer 44 in response to a request from the information processing apparatus 30.

It is not necessary to store all of the inspection support processing program 172 in the storage device such as another computer or server device connected to the information processing apparatus 30 or in the storage 64, but a part of the inspection support processing program 172 may be stored.

In addition, although the computer 44 is built in the information processing apparatus 30 illustrated in FIG. 2, the technology of the present disclosure is not limited to this, and for example, the computer 44 may be provided outside the information processing apparatus 30.

In the above-described embodiment, the computer 44 has been exemplified, but the technology of the present disclosure is not limited to this, and a device including an ASIC, an FPGA, and/or a PLD may be applied instead of the computer 44. In addition, instead of the computer 44, a combination of the hardware configuration and the software configuration may be used.

As a hardware resource for performing the inspection support processing explained in the above-described embodiment, the following various processors can be used. Examples of the processors include a CPU that is a general-use processor executing software, that is, a program to function as a hardware resource that performs the inspection support processing. In addition, examples of the processor include a dedicated electric circuit which is a processor having a circuit configuration designed to be dedicated to performing specific processing, such as an FPGA, a PLD, or an ASIC. Each processor has a built-in or connected memory, and each processor uses the memory to perform inspection support processing.

The hardware resource for performing the inspection support processing may be configured with one of various processors or may be configured with a combination of two or more processors (for example, a combination of a plurality of FPGAs or a combination of a CPU and an FPGA) of the same type or different types. In addition, the hardware resource for executing the inspection support processing may be one processor.

As an example of configuring with one processor, first, one processor is configured with a combination of one or more CPUs and software, and there is an embodiment in which this processor functions as a hardware resource for executing the inspection support processing. Second, as represented by SoC or the like, there is an embodiment in which a processor that implements all functions of a system including a plurality of hardware resources for performing the inspection support processing with one IC chip is used. In this way, the inspection support processing is implemented using one or more of the above-described various processors as hardware resources.

Further, as the hardware structure of these various processors, more specifically, an electric circuit in which circuit elements such as semiconductor elements are combined can be used. In addition, the above-described inspection support processing is merely an example. Therefore, needless to say, unnecessary steps may be deleted, new steps may be added, or the processing order may be changed without departing from the spirit and scope of the present disclosure.

The above-described contents and the illustrated contents are the detailed explanations of the parts according to the technology of the present disclosure, and are merely examples of the technology of the present disclosure. For example, the above explanations related to configurations, functions, actions, and effects are explanations related to examples of configurations, functions, actions, and effects of the parts according to the technology of the present disclosure. Thus, it is needless to say that unnecessary portions may be deleted, new elements may be added, or replaced with respect to the above-described contents and the illustrated contents without departing from the spirit and scope of the technology of the present disclosure. In order to avoid complication and easily understand the part according to the technology of the present disclosure, in the above-described contents and the illustrated contents, the explanation of common general technical knowledge, which is not necessarily particularly required for implementing the technology of the present disclosure, is omitted.

In the present specification, "A and/or B" is synonymous with "at least one of A or B". That is, "A and/or B" may refer to A alone, B alone, or a combination of A and B. In addition, in the present specification, in a case in which the connection of three or more matters is expressed by "and/or", the same concept as "A and/or B" is applied.

In addition, all literatures, patent applications, and technical standards disclosed in the present specification are incorporated in the present specification by reference to the same extent as in a case in which each of the literatures, patent applications, and technical standards is specifically and individually indicated to be incorporated by reference.

What is claimed is:

1. An information processing apparatus comprising:
a processor; and
a memory connected to or built in the processor,
wherein the processor
acquires a live view image obtained by imaging an imaging scene by an imaging apparatus having a distance measurement function and a pre-captured image based on a main-captured image obtained by executing main imaging by the imaging apparatus,
sets an imageable signal indicating that the main imaging is determined to be executable based on at least one of a distance measurement result obtained by the distance measurement function, or a captured image including the live view image among captured images obtained by imaging with the imaging apparatus or a captured image including still image obtained by imaging the imaging scene by the imaging apparatus at a timing corresponding to a timing of obtaining the live view image among captured images obtained by imaging with the imaging apparatus, and
outputs screen data for displaying a screen including a live view region and a guide view region on a first display,
the live view image is displayed in the live view region,
the guide view region includes a wide view region and a guide region,
the pre-captured image is displayed in the wide view region,
guide information that is capable of specifying an image region corresponding to the live view image displayed in the live view region within the wide view region is displayed in the guide region, and
the processor
outputs the screen data as data in which the screen includes an imaging instruction reception region of a display aspect for notifying that the main imaging is executable, in a case in which the imageable signal is set, and
outputs a main imaging instruction signal indicating an instruction to cause the imaging apparatus to execute the main imaging for the imaging scene indicated by the live view image, in a case in which an imaging instruction is received by the imaging instruction reception region.

2. The information processing apparatus according to claim 1,
wherein the pre-captured image is an image indicating a scene wider than the imaging scene indicated by the live view image displayed in the live view region.

3. The information processing apparatus according to claim 2,
wherein the pre-captured image is a composite image obtained by joining a plurality of the main-captured images into a panoramic image.

4. The information processing apparatus according to claim 3,
wherein the screen includes a composite image confirmation view region in which the wide view region is enlarged together with the composite image.

5. The information processing apparatus according to claim 4,
wherein the screen includes a real space area of an imaging region indicated by the composite image.

6. The information processing apparatus according to claim 1,
wherein the processor outputs a distance measurement result acquisition instruction signal indicating an instruction to cause the imaging apparatus to acquire the distance measurement result.

7. The information processing apparatus according to claim 6,
wherein the distance measurement result acquisition instruction signal includes a signal indicating an instruction to cause the imaging apparatus to measure a distance between a first imaging target, which is imaged by the imaging apparatus, and the imaging apparatus as one of the distance measurement results.

8. The information processing apparatus according to claim 1,
wherein the imageable signal is generated on condition that an angle formed by a first imaging target surface imaged by the imaging apparatus and a predetermined surface included in the imaging apparatus is a facing angle at which the first imaging target surface and the imaging apparatus face each other.

9. The information processing apparatus according to claim 8,
wherein the imaging apparatus has an image sensor, and the predetermined surface is a surface corresponding to an imaging surface of the image sensor.

10. The information processing apparatus according to claim 1,
wherein the imageable signal is generated on condition that an overlap ratio between the pre-captured image and the main-captured image or the live view image is within a predetermined range.

11. The information processing apparatus according to claim 1,
wherein the processor acquires information based on the distance measurement result.

12. The information processing apparatus according to claim 11,
wherein the information based on the distance measurement result includes information indicating whether or not a second imaging target surface imaged by the imaging apparatus and the imaging apparatus face each other.

13. The information processing apparatus according to claim 11,
wherein the information based on the distance measurement result includes information based on a distance between a second imaging target surface imaged by the imaging apparatus and the imaging apparatus.

14. The information processing apparatus according to claim 11,
wherein the processor outputs distance measurement result data for causing a second display to display the information based on the distance measurement result.

15. The information processing apparatus according to claim 14,
wherein the information based on the distance measurement result is displayed on the second display in a message format.

16. The information processing apparatus according to claim 1,
wherein the imaging apparatus has a release button in a lock state, and
the processor outputs an unlock instruction signal for causing the imaging apparatus to release the lock state, in a case in which the imageable signal is set.

17. An information processing system comprising:
the information processing apparatus according to claim 1; and
a reception device that receives an instruction given to the processor.

18. The information processing system according to claim 17, further comprising the imaging apparatus.

19. An information processing method comprising:
acquiring a live view image obtained by imaging an imaging scene by an imaging apparatus having a distance measurement function and a pre-captured image based on a main-captured image obtained by executing main imaging by the imaging apparatus;
setting an imageable signal indicating that the main imaging is determined to be executable based on at least one of a distance measurement result obtained by the distance measurement function, or a captured image including the live view image among captured images obtained by imaging with the imaging apparatus or a captured image including still image obtained by imaging the imaging scene by the imaging apparatus at a timing corresponding to a timing of obtaining the live view image among captured images obtained by imaging with the imaging apparatus; and
outputting screen data for displaying a screen including a live view region and a guide view region on a first display,
wherein the live view image is displayed in the live view region,
the guide view region includes a wide view region and a guide region,
the pre-captured image is displayed in the wide view region,
guide information that is capable of specifying an image region corresponding to the live view image displayed in the live view region within the wide view region is displayed in the guide region, and
the information processing method further comprises
outputting the screen data as data in which the screen includes an imaging instruction reception region of a display aspect for notifying that the main imaging is executable, in a case in which the imageable signal is set, and outputting a main imaging instruction signal indicating an instruction to cause the imaging apparatus to execute the main imaging for the imaging scene indicated by the live view image, in a case in which an imaging instruction is received by the imaging instruction reception region.

20. A non-transitory computer-readable storage medium storing a program executable by a computer to perform a process comprising:

acquiring a live view image obtained by imaging an imaging scene by an imaging apparatus having a distance measurement function and a pre-captured image based on a main-captured image obtained by executing main imaging by the imaging apparatus;

setting an imageable signal indicating that the main imaging is determined to be executable based on at least one of a distance measurement result obtained by the distance measurement function, or a captured image including the live view image among captured images obtained by imaging with the imaging apparatus or a captured image including still image obtained by imaging the imaging scene by the imaging apparatus at a timing corresponding to a timing of obtaining the live view image among captured images obtained by imaging with the imaging apparatus; and outputting screen data for displaying a screen including a live view region and a guide view region on a first display, wherein the live view image is displayed in the live view region, the guide view region includes a wide view region and a guide region, the pre-captured image is displayed in the wide view region, guide information that is capable of specifying an image region corresponding to the live view image displayed in the live view region within the wide view region is displayed in the guide region, and the process further comprises outputting the screen data as data in which the screen includes an imaging instruction reception region of a display aspect for notifying that the main imaging is executable, in a case in which the imageable signal is set, and outputting a main imaging instruction signal indicating an instruction to cause the imaging apparatus to execute the main imaging for the imaging scene indicated by the live view image, in a case in which an imaging instruction is received by the imaging instruction reception region.

* * * * *